United States Patent [19]

Bijnagte

[11] Patent Number: 5,235,680

[45] Date of Patent: Aug. 10, 1993

[54] APPARATUS AND METHOD FOR COMMUNICATING TEXTUAL AND IMAGE INFORMATION BETWEEN A HOST COMPUTER AND A REMOTE DISPLAY TERMINAL

[75] Inventor: Leendert M. Bijnagte, Minneapolis, Minn.

[73] Assignee: Moore Business Forms, Inc., Grand Island, N.Y.

[21] Appl. No.: 759,959

[22] Filed: Sep. 17, 1991

Related U.S. Application Data

[63] Continuation of Ser. No. 80,275, Jul. 31, 1987, abandoned.

[51] Int. Cl.⁵ .................. G06F 15/00; G06K 15/00; H04N 7/18; H04M 11/00
[52] U.S. Cl. .................................... 395/161; 395/147; 358/102; 358/146; 379/96; 379/100; 364/514
[58] Field of Search ................ 395/147, 161; 358/102, 358/146; 379/96, 98, 100, 351; 370/99

[56] References Cited

U.S. PATENT DOCUMENTS

| | | | |
|---|---|---|---|
| 3,591,711 | 7/1971 | De Groat | 379/100 X |
| 4,424,572 | 1/1984 | Lorig et al. | 364/900 |
| 4,429,385 | 1/1984 | Cichelli et al. | 358/146 X |
| 4,467,355 | 8/1984 | Matsuda | 358/146 X |
| 4,485,454 | 11/1984 | Kimoto | 364/900 |
| 4,553,206 | 11/1985 | Smutek et al. | 364/300 |
| 4,561,020 | 12/1985 | Matsuda | 358/146 X |
| 4,574,362 | 3/1986 | Spindel et al. | 364/900 |
| 4,587,633 | 5/1986 | Wang et al. | 364/900 |
| 4,606,002 | 8/1986 | Waisman et al. | 364/200 |
| 4,635,136 | 1/1987 | Ciampa et al. | 358/102 X |
| 4,636,848 | 1/1987 | Yamamoto | 358/102 |
| 4,648,061 | 3/1987 | Foster | 364/900 |
| 4,694,352 | 9/1987 | Ina et al. | 379/100 X |
| 4,697,264 | 9/1987 | Galensky et al. | 370/99 X |
| 4,715,044 | 12/1987 | Gartner | 379/93 X |
| 4,757,499 | 7/1988 | Gorshe | 370/99 |
| 4,764,870 | 8/1988 | Haskin | 364/415 |
| 4,816,911 | 3/1989 | Kirsch et al. | 358/280 X |
| 4,817,050 | 3/1989 | Komatsu et al. | 358/280 X |

OTHER PUBLICATIONS

Black, U. D., "Data Communications, Networks, and Distributed Processing", Reston Publishing Company, 1983, pp. 178-183, 248-251.

APS Text Search and Retrieval—Classroom Manual, Planning Research Corporation/Chemical Abstract Services, Nov. 14, 1986, pp. 1-16, 1-17.

Yamada, D., "Southwestern Michigan's Knapp Introduces Unique Real Estate System" in Data Management, Aug. 1984, pp. 46, 54.

"Three Bedrooms, Two Baths, One Mac", MacWorld, Aug. 1985, pp. 116-120.

"Procedures for the Use of the Communication Control Characters of American National Standard Code for (List continued on next page.)

Primary Examiner—Dale M. Shaw
Assistant Examiner—Kee M. Tung
Attorney, Agent, or Firm—Nixon & Vanderhye

[57] ABSTRACT

A system and method for storing, retrieving displaying, printing and otherwise manipulating color images stored in a central "host" computer from a realtor's remote data terminal includes a host computer which stores and maintains a database containing listings of real estate properties on the market. The host computer also optionally can store image information relating to specific properties. Images can be loaded from remote terminals over telephone lines to the host system on an interactive basis. Images can then be retrieved from the host system, also on an interactive basis, for display, printing, or storage on a storage medium associated with the remote display terminals. Images may also be deleted on an interactive basis from a remote terminal. A specific communications protocol conveys image data between the host computer and remote data terminals. This protocol includes specific "time-out" limitations, CRC error checking schemes, and a specific "handshaking" signalling sequence that must be observed before the host system will permit manipulation of image files.

30 Claims, 30 Drawing Sheets

OTHER PUBLICATIONS

Information Interchange in Specified Data Communication Links" *American National Standards Institute, Inc.,* (ANSI X3.28-1976), New York, New York, 10018, 1976.

Photo–Store User's Guide, Moore Data Management Services Div., Moore Business Forms, Inc., Minneapolis, Minn. 55416, Sep. 1986.

Photo–Term User's Guide, Real–Trieve's Photo–Trieve Function, Moore Data Management Services Div., Moore Business Forms, Inc. Minneapolis, Minn. 55416 1986 (Revised Oct. 1986).

"PCs Prove To Be The Real Estate Thing", Eric Freedman, *PC Magazine,* Mar. 15, 1985, p. 60.

"Link Layer", 6.2 Asynchronous Error–Detection Link Protocol, AT&T Technologies, Inc., Preliminary Draft, Aug. 9, 1985, pp. 26–37.

MISWeek, "AT&T Joins Realtors in Home Sales", vol. 5, No. 26, Jun. 27, 1984.

*Management Information Systems Week,* "Boris Adds Imaging Options To System", Steve Polilli, newspaper clipping, Jan. 2, 1985, p. 25.

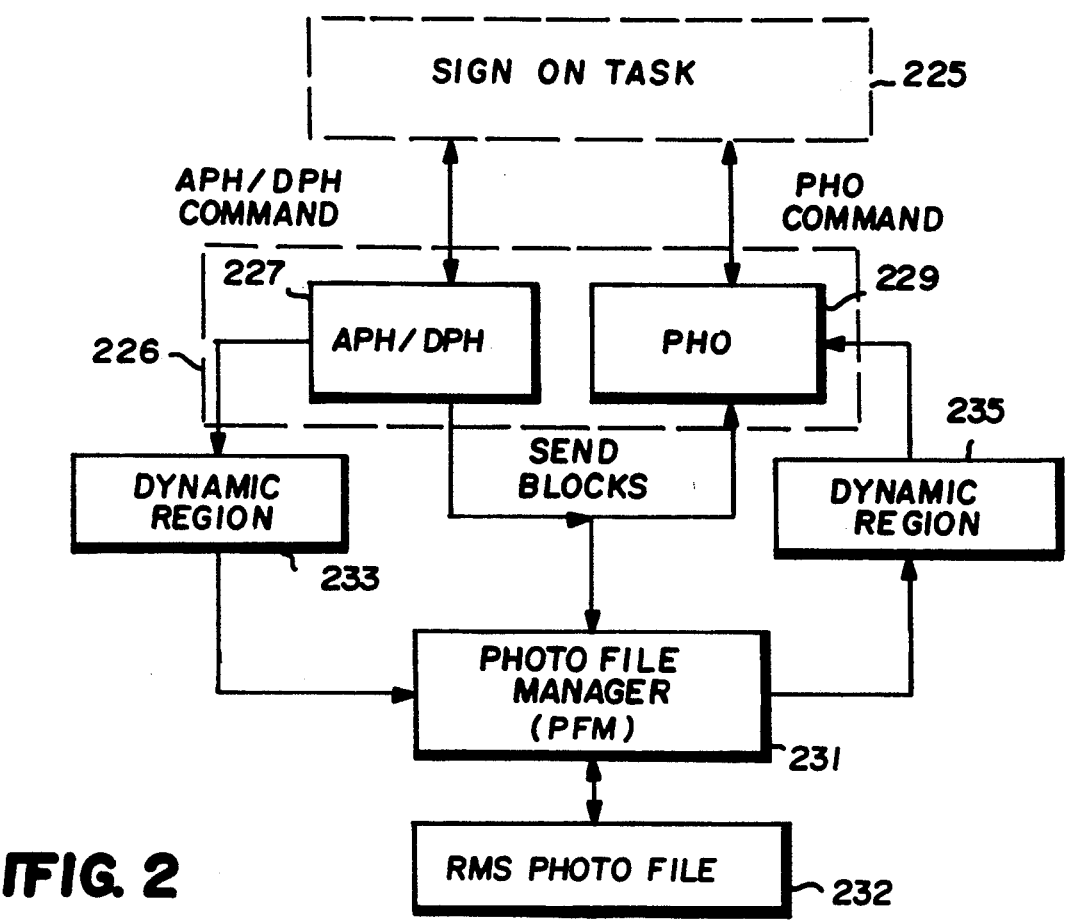
FIG. 2
FIG. 4
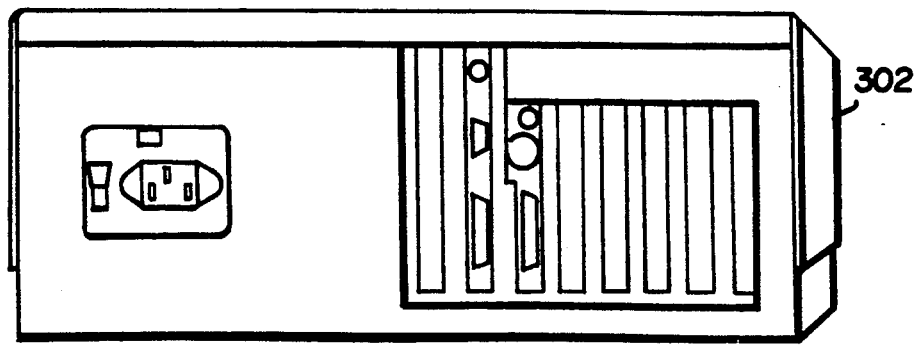

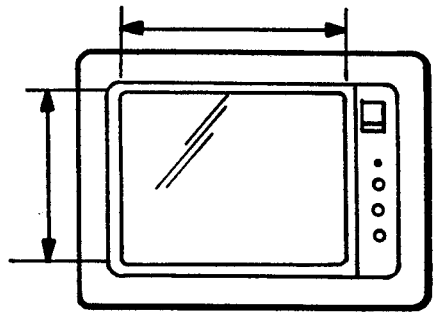
FIG. 5a
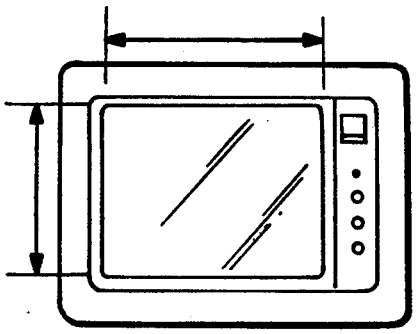
FIG. 5b
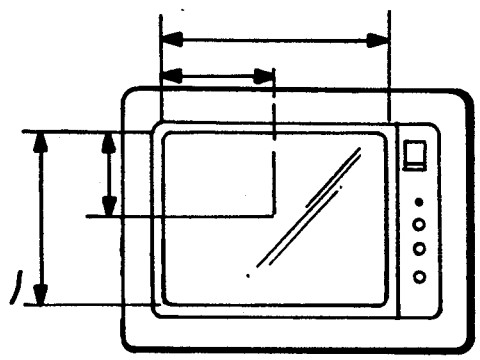
FIG. 5c
FIG. 7
| FMT # | LIST # (9 CHAR) | PHOTO # | SEGMENT # |
|---|---|---|---|
| TIME STAMP 16 BYTES | | TERM ID 2 BYTES | |
| PHOTO DATA UP TO 2048 BYTES | | | |

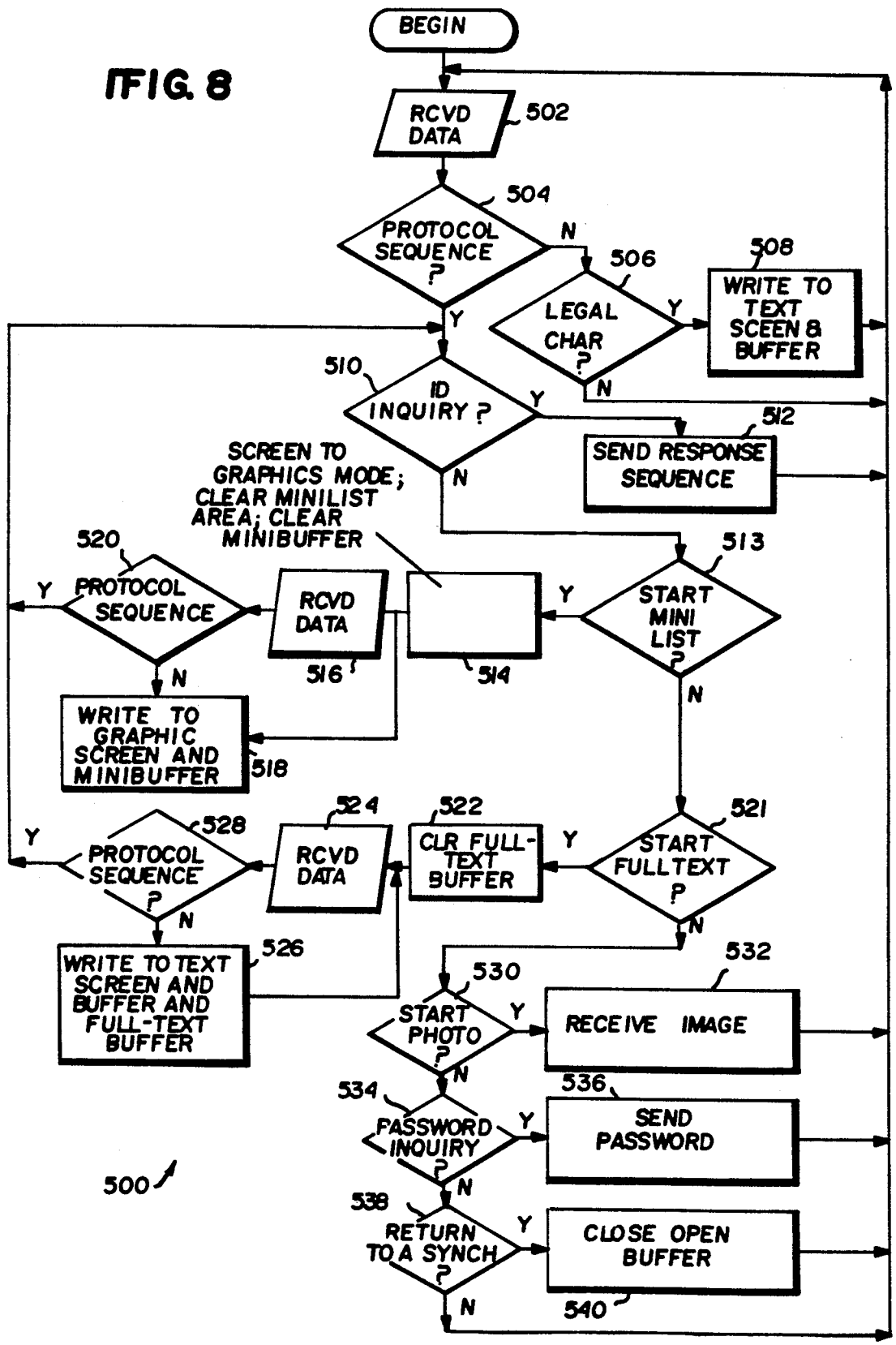

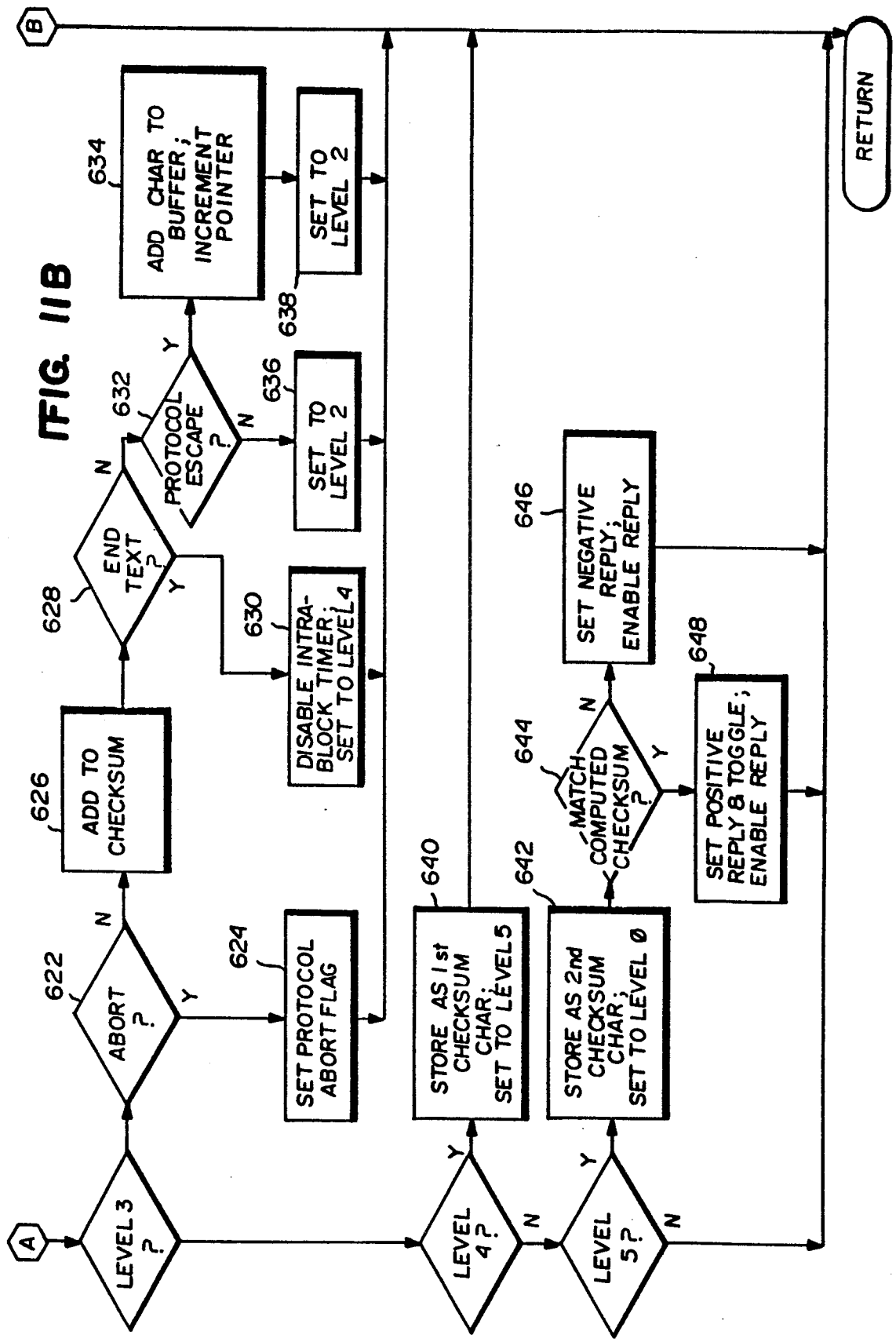

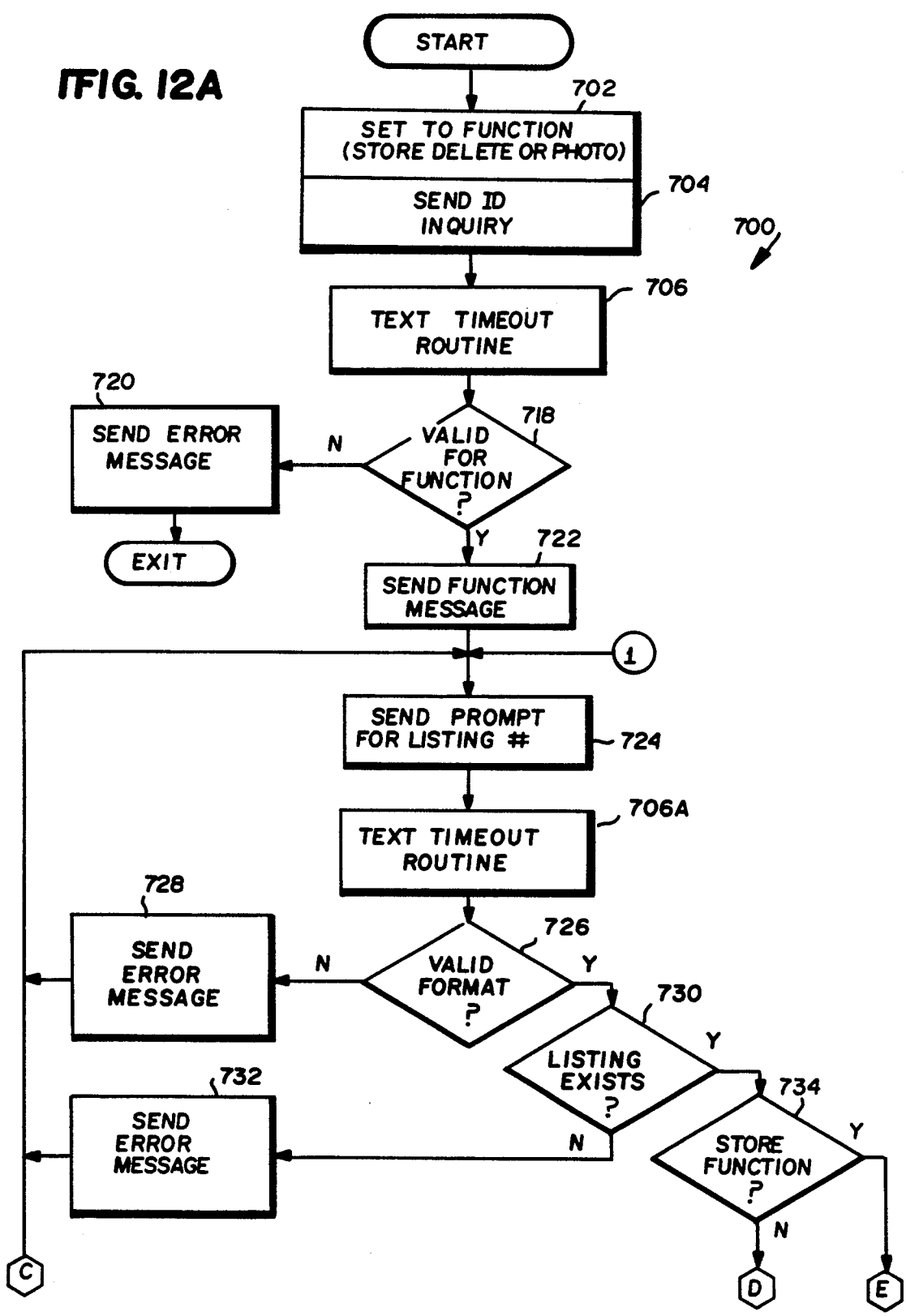

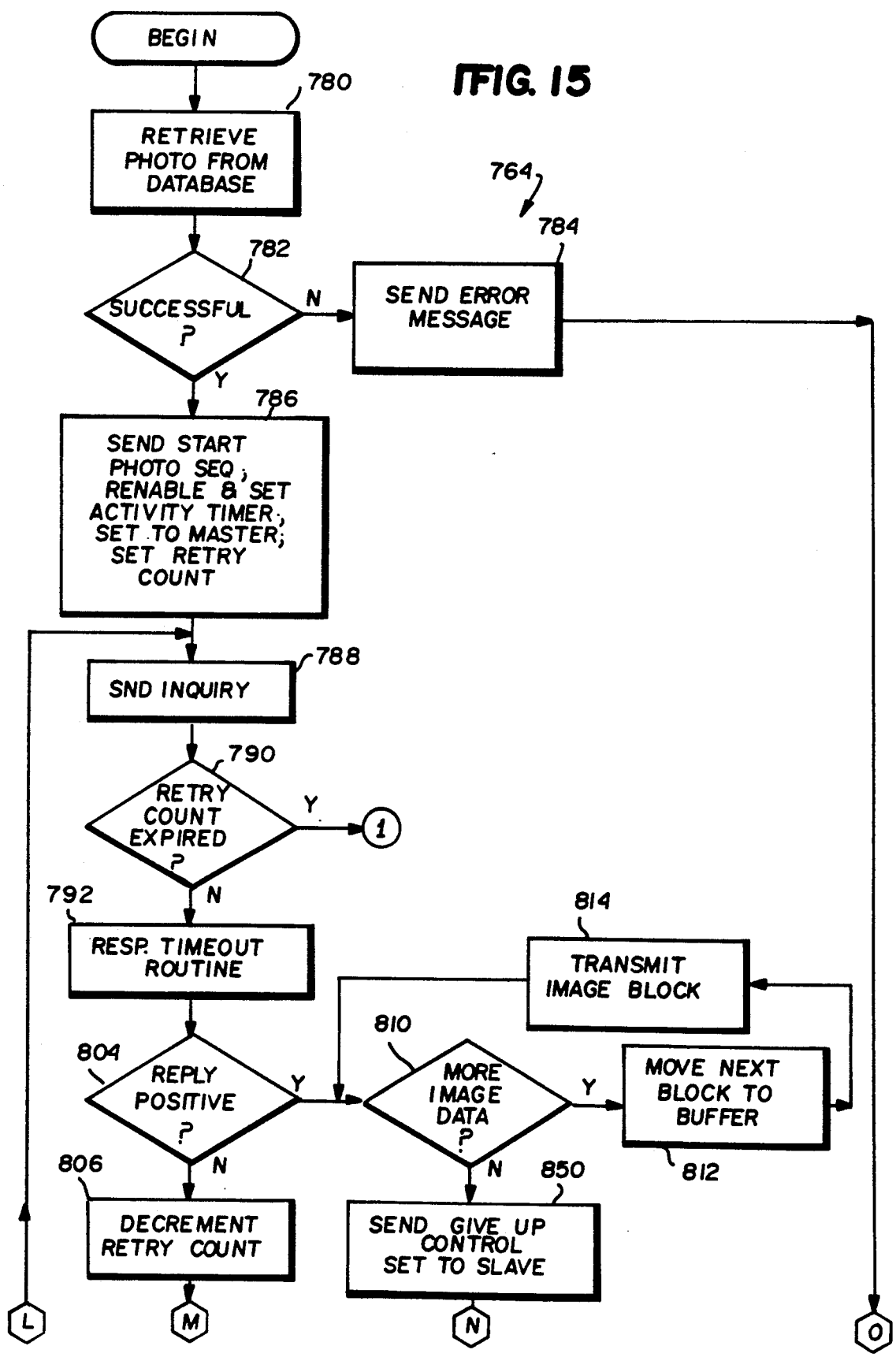

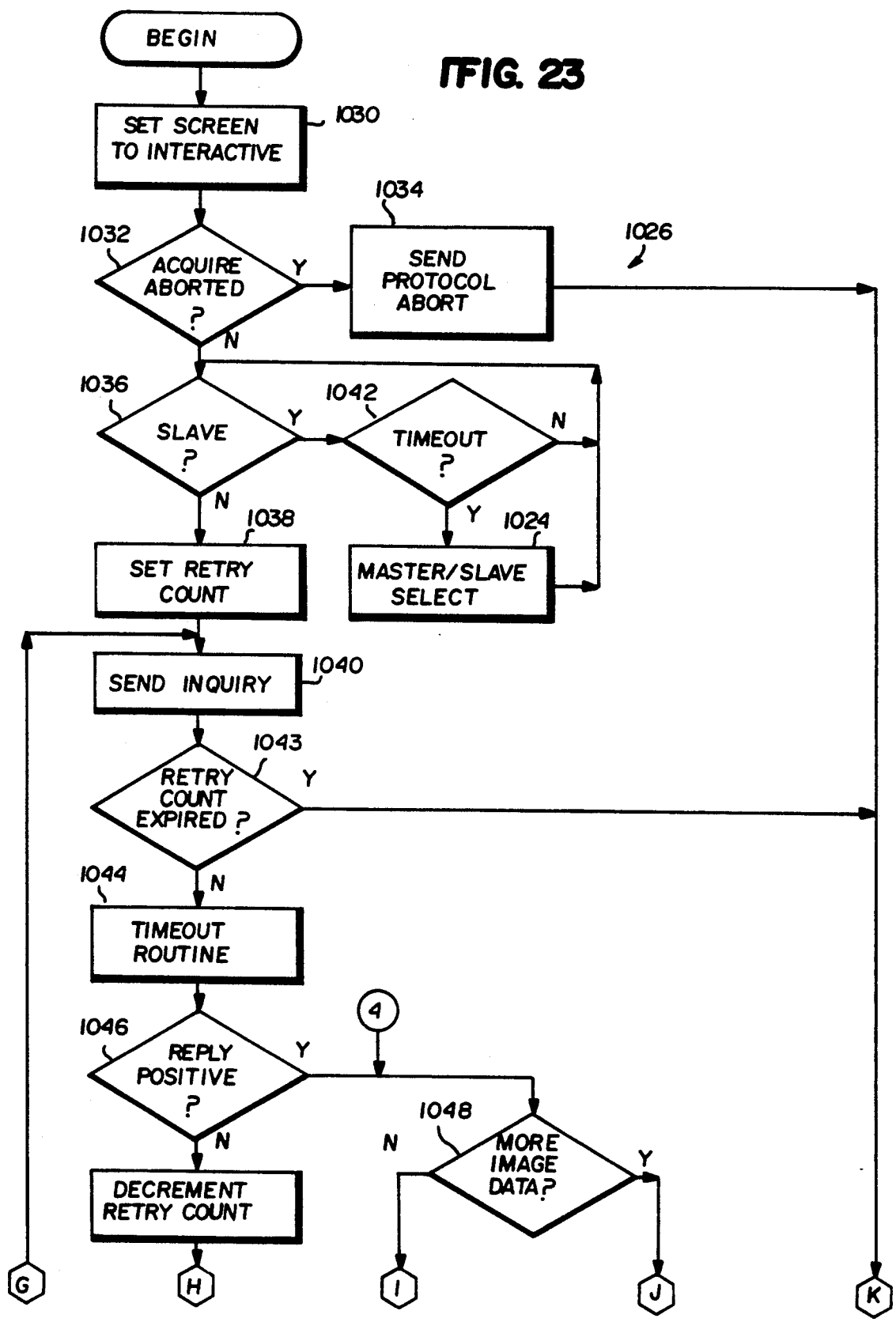

APPARATUS AND METHOD FOR COMMUNICATING TEXTUAL AND IMAGE INFORMATION BETWEEN A HOST COMPUTER AND A REMOTE DISPLAY TERMINAL

This is a continuation of application Ser. No. 07/080,275, filed 31 July, 1987, now abandoned.

FIELD OF THE INVENTION

The present invention relates to communication of text and image data between a host computer and a remote display terminal. More particularly, the invention relates to a system and method for storing, manipulating, retrieving and displaying images and text associated with real estate properties being offered for sale, and to a protocol for communicating real estate listing text and images of properties for sale between a host computer and a remote data terminal.

The ability of real estate agents and brokers to instantly access information relating to properties on the market often makes the difference between making or losing a sale. Typically, real estate agents rely upon printed listings and computer-stored information that can be displayed on a computer display screen or printed on a computer printer. However, agents cannot easily match the needs and desires of a prospective customer with specific properties without actually touring the properties with the customer—a process which is extremely time consuming and can often turn out to be a waste of time.

Textual listing information such as that provided by the multiple listing service ("MLS") is usually very helpful in identifying properties that may be of interest to specific customers but often fails to provide sufficient information to exclude properties that customers would immediately reject from their consideration upon merely viewing the property from the exterior. Sometimes, published photographs (typically only black and white) are available which show some of the features of properties. Unfortunately, such photographs are generally poorly composed, are of relatively low quality, are poorly reproduced, and are not always widely or rapidly distributed to realtors.

Automated real estate systems which allow realtors to access image as well as textual information are generally known. For example, Microsoft Corp., I/NET, Inc., Board of Realty Information Systems ("BORIS), and AT&T all have developed automated real estate listing services which provide images as well as text. The following is a by no means exhaustive listing of representative publications which are generally relevant in showing the state of the art of such imaging systems:

"Three Bedrooms, Two Baths, One Mac", Heid, J., *Macworld*, Vol. 2, No. 8, Aug. 1985, pp. 116–120.

"Southwestern Michigan's Knapp Introduces Unique Real Estate System", Anon, *Data Management*, Vol. 22, No. 8, Aug. 1984, pp. 46, 54.

"PCs Prove to be the Real Estate Thing", Freedman, E., PC (*Independent Guide to IBM Personal Computers*), Vol. 4, No. 5, Mar. 5, 1985, p. 60.

"Boris Adds Imaging Options to System", Polilli, S. *MIS Week*, Vol. 6, No. 1, Jan. 2, 1985, p. 25.

"AT&T Joins Realtors in Home Sales", Greenstein, I. *MIS Week*, Vol. 5, No. 26, Jun. 27, 1984, pp. 1, 30.

However, many further improvements in such systems are still possible.

For example, most prior systems only operate in a "local" mode—meaning that display terminals capable of displaying images must be installed within close proximity to the central "host" computer which stores and manipulates the image and text information. Typically, however, realty offices are unwilling to undertake the expense of purchasing and maintaining a large minicomputer and associated database, relying instead on inexpensive data terminals or microcomputers (e.g., IBM PC compatibles) connected to a large central computer via modems and conventional telephone lines. Transmission of color images of acceptable quality from a host computer to a data terminal over a telephone line is difficult, especially in view of the noise inherent on conventional telephone lines, banddwidth limitations, telephone line equipment responses to transmitted data, of telephone lines, and other factors. Yet, limiting imaging capabilities to only those display terminals installed in the same facility as the host computer prevents the vast majority of realtors from using those capabilities.

In addition, there has heretofore been no capability to digitize images on a remote display terminal and transmit the resulting digital signal information on a real time, interactive basis to the host computer. The ability to add images of properties to the host computer database in real time on an interactive basis from remote display terminals would make the images available immediately after they are converted to digital form. In today's fast-moving and competitive real estate market, an agent must have immediate access to all available information about new property listings in order to serve his or her clients effectively. Providing remote terminals with the capability of adding images to the host database encourages the use of the system's imaging capability, but also creates additional problems relating to database integrity (e.g., accidental storing of images in connection with incorrect property listings, and servicing conflicting user requests regarding images for the same listing) which must be solved.

The present invention provides a highly advantageous system and method for storing, manipulating color images stored in a central "host" computer from a realtor's remote data terminal. Briefly, the host computer stores and maintains a database containing listings of real estate properties on the market. The host computer also optionally can store image information relating to specific properties. Images can be loaded from remote terminals over telephone lines to the host system on an interactive basis. Images can then be retrieved from the host system, also on an interactive basis, for display, printing, or storage on a storage medium associated with the remote display terminals. Images may also be deleted on an interactive basis from a remote terminal.

The preferred embodiment of the present invention thus allows users of IBM PCs (or other appropriately configured display terminals) with the appropriate software to access a photo file on the host system to add, delete, or retrieve and display photos corresponding to properties listed for sale.

The present invention provides the capability to transmit the photo data in either direction between the PDP-11 host and the display terminal in order to store photos in or retrieve photos from the host photo file. Photos may also be deleted from remote display terminals.

A specific communications protocol conveys image data between the host computer and remote data terminals. This protocol includes specific "time-out" limitations, CRC error checking schemes, and a specific "handshaking" signalling sequence that must be observed before the host system will permit manipulation of image files. In addition, the protocol is for "dial up" lines—so that standard telephone equipment and modums do not erroneously recognize protocol characters for control characters relevant to their own operation.

For example, to retrieve an image on the host computer, a remote terminal user telephones the host computer (via a conventional "modem" and landline communications path) and searches standard "multiple listing service" (MLS) listings in a standard manner. Once a specific listing of interest has been isolated, the user inputs a command ("PHO") through his terminal requesting the photo function. The host computer then polls the terminal to determine if the terminal has the appropriate graphics capabilities.

If the poll is successful, the user is prompted for the MLS listing number of the listing of interest. The MLS number is validated, and a "mini-form" consisting of current MLS database fields (e.g., property price reflecting all changes to date) is displayed at the bottom of the screen. Following transmission of the "mini-form", a digitized image is transmitted and displayed at the upper left of the terminal display. Error checking algorithms are applied to the incoming host image data. A full textual listing is then transmitted. The user can "flip" between a text screen showing the full listing and a graphics screen showing the "mini-form" and the image.

If there are multiple photos associated with the same listing, the user is prompted to specify whether the "next" photo is to be displayed. Subsequent images are displayed in the upper right-hand quadrant of the graphics screen, the full text of the listing not being transmitted between subsequent images. The software executing on the data terminal permits the user to display images, print images, or store images on a local magnetic storage medium for later recall.

Images are stored on the host system in files indexed by a single key consisting of the concatenation of the MLS number, a single character photo number, and a single character photo segment number. Users can add images to the host database from their remote data terminals in an interactive mode. When the user invokes the "add photo" routine (command SPH), the host polls the data terminal to ensure it has graphics capture capabilities, and then prompts the user for a MLS number. The geographic street address of the associated property is then displayed for verification by the user (while nine-digit MLS numbers are often confused, addresses are more readily recognized by users), along with an indication of the number of images already stored by the host which relate to the property of interest.

After the user assigns the new image a photo number, the user display terminal begins interactively scanning a video signal (e.g., produced by a video camera), digitizing and compressing the image signal, and transmitting the resulting digital signal to the host for storage. Image capture is performed on a real time, interactive basis—helping to preserve database integrity and providing access to images by others virtually immediately after the user has added the image to the host database. The host provides positive acknowledgment that the new image has been added, and permits the user to enter additional images for the same or different listings if desired.

A single image file manager executes on the host system to manage image files The use of a single manager prevents multiple users from performing duplicate or conflicting image operations on the same images.

The photo capabilities are integrated into the existing Moore Data Management's REAL-TRIEVE real estate listing text access system to the extent that the existing log in and authorization procedures are used to first access the REAL-TRIEVE system. After access, three new photo commands may be issued by the user:

PHO—The "photo" command: To retrieve an existing photo from the host photo file and display it on the user's display terminal.

SPH—the "add photo" command: To add a new photo to the host photo file by transmitting the picture data from the user's display terminal to the host.

DPH—the "delete photo" command: To delete an existing photo from the host photo file. The present invention thus provides a tool that now brings property listings to life in full-color pictures that appear on the computer display screen, along with text describing the property. If equipped with a color printer, the image on the screen, along with the text, can be printed to become a "sales brochure" for the agent to give the client.

The system provided by the present invention enables real estate agencies to "sell" the client on visually acceptable properties without the expense of numerous trips to properties. In addition, the system is superior to any published real estate listings which show only one view of a house or apartment. High-quality color images can be generated with up to sixteen separate views available of a property, including both interior and exterior views, if desired. Since each picture takes less than thirty seconds to produce, it is available in less time than it takes to retrieve a folder from a file cabinet.

Once connected to the host computer over a telephone line, a computer in the office is capable of receiving both text and photographs in just moments. Selected listings, including photographs, can be stored for later use in display terminal local storage. A library of photographs can be prepared for specific client. The client can even be visited at home, with a portable computer display screen, or with photographs and text in the sales brochure format that have been preprinted before the visit.

Some of the advantages and capabilities of the system provided by the present invention include:

Retrieval of property listings from the on-line information system, and displaying, printing and storing of such files in a text file on disk.

Retrieval of photographs associated with the property listings from the on-line information system and display of up to sixteen photographs viewing the property.

Changing of displayed pages between the complete descriptive text and the photographs of the property displayed.

Storing photographs in files on a disk for later access.

When a user display station is not connected to the host on-line system, users can still perform the following tasks:

Recall information previously stored on the disk of both text and photographs, and produce both on a display screen or printer.

Transport the stored disk information to a compatible portable computer.

The recall feature provides users with the flexibility to pick and choose at will those listings applicable to specific clients. The transport capability allows users to provide the client with preselected photographs and text of properties which can then be presented to clients even in the convenience of the client's own home.

The user interface software in the preferred embodiment is "menu driven"—meaning that all these valuable features are performed using easy-to-understand computer menus which appear on the computer display screen A menu is simply a listing of choices of features that can be used. Making a menu choice results in the activation of a system function. Rather than typing in complicated commands, functions are performed by pressing designated function keys which are numbered from one to ten. Each key is referenced on a menu display whenever a function can be performed with it.

BRIEF DESCRIPTION OF THE DRAWINGS

These and other features and advantages of the present invention may be better and more completely understood by studying the following detailed description of the presently preferred embodiments together with the appended drawings of which:

FIG. 2 is a schematic flowchart of tasks performed by the host computer shown in FIG. 1;

FIG. 4 is a schematic diagram of the rear panel of the FIG. 3 processor module;

FIGS. 5A–5C are shematic diagrams showing the resolution of the images produced by the FIG. 1 system;

FIG. 7 is a schematic diagram of an exemplary host image data file formats; and

FIG. 8–26 are flowcharts of exemplary program control steps performed by the system shown in FIG. 1.

DETAILED DESCRIPTION OF PRESENTLY PREFERRED EXEMPLARY EMBODIMENT

Figure 1:
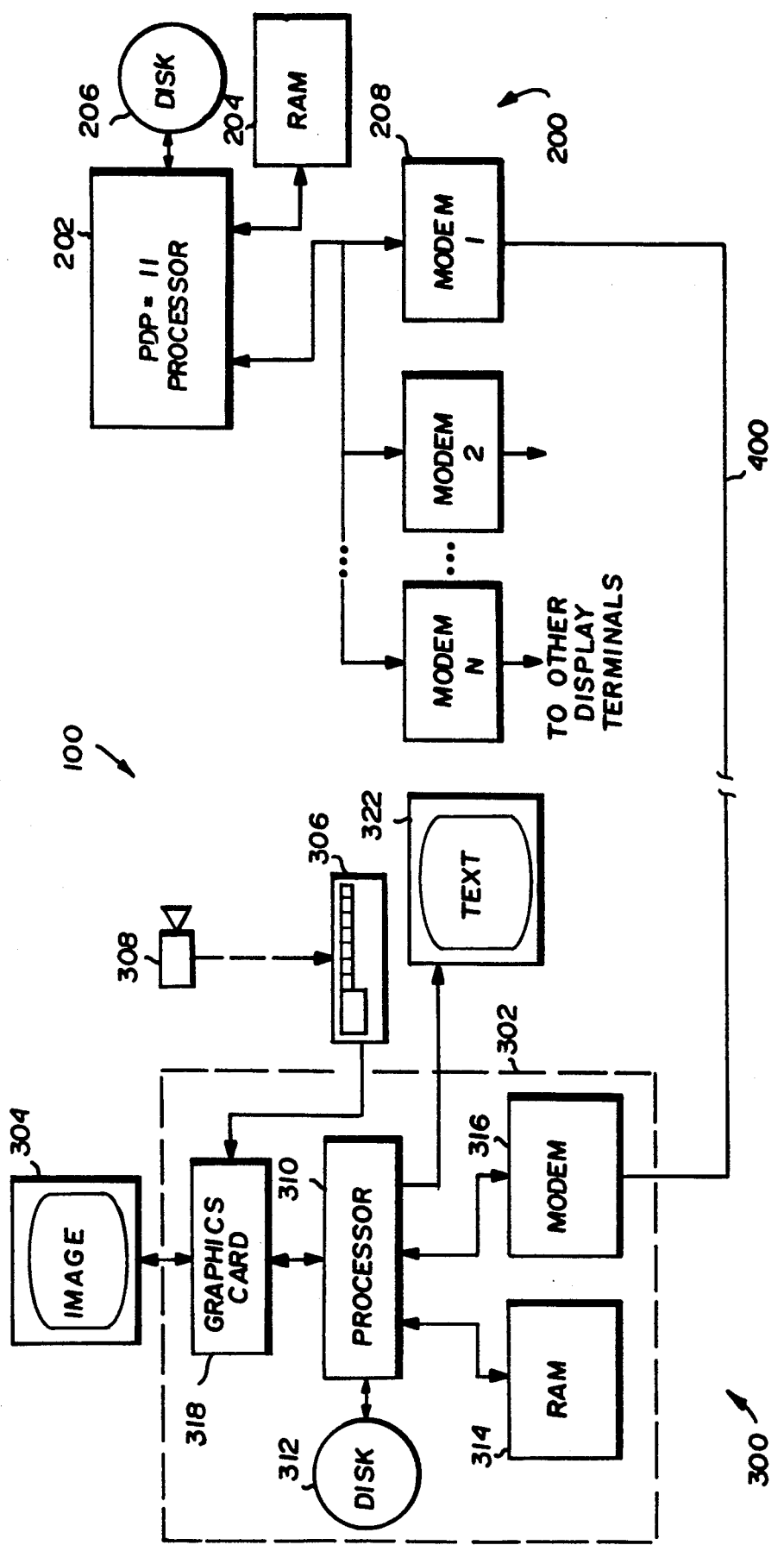
FIG. 1 is a block diagram of the presently preferred exemplary embodiment of a text and graphics communication system in accordance with the present invention.

FIG. 1 is a schematic block diagram of a presently preferred exemplary embodiment of a data processing system 100 in accordance with the present invention. System 100 includes a host computer system 200 and a remote computer system 300 connected together in the preferred embodiment by a conventional voice quality "dial up" telephone line 400.

In the preferred embodiment, host computer system 200 includes a processor 202 and associated random access memory 204, a mass storage device (e.g., magnetic disk) 206, and a serial communications facility 208. In the preferred embodiment, processor 202 includes a Digital Equipment Corp. PDP-11/84 processor having internal random access memory 204 and running under the RSX-11M operating system. Mass storage device 206 may include a 160 megabyte (or larger) Winchester "hard" disk, and conventional DZ communication ports may be used for communication facility 208.

Disk 206 stores a database which includes files containing images corresponding to listed properties. Communications facility 208 permits remote display terminals 300 to establish communications with processor 202 and request the processor to manipulate the image files stored on disk 206 (several display terminals preferably may access the processor at the same time). Processor 202 executes software in the preferred embodiment which implements several functions, including a sign-on task, an image file manager, PHOTOFILE tasks, and REAL-TRIEVE listing text retrieval tasks. The tasks performed by processor 202 to search add, retrieve, alter and delete "multiple listing service" real estate listing text information (which is stored in a database on disk 206 different from the image disk) are conventional and known to those of ordinary skill in this art.

The REAL-TRIEVE System developed by the assignee of the subject application (which has been in public use for quite some time and formerly did not include any imaging capability) utilizes the following:
PDP-11 with RSX-11M operating system
Hard disk storage
DZ-communication ports
REAL-TRIEVE software
using these terminals:
TI silent 700 hard copy terminals;
VT-100 terminals/modems.
The REAL-TRIEVE System is accessed via telephone and one of the terminals mentioned above. Once connected, real estate listings can be searched and displayed through the REAL-TRIEVE System.

The following is additional equipment used for the preferred embodiment of the present invention to provide imaging as well as textual capabilities:
Additional HARD DISK for photo storage (on PDP-11 host computer)
PHOTO-TRIEVE software (runs on PDP-11 host system)
IBM/PC (128K mionimum memory, communication port, color monitor)
AT&T Graphics Cards
PHOTO-TERM and PHOTO-STORE Terminal Software The IBM-PC (or compatible) functions as a display terminal with proprietary PHOTO-TRIEVE terminal software. This software also allows digitized photos to be transmitted from the PDP-11 host to the IBM-PC terminal. The graphics card then displays the photo.

HOST ARCHITECTURE

The host image file manager executed by processor 202 (see FIG. 1) perform tasks on the image files stored on disk 206. In the preferred embodiment, this software was written in FORTRAN IV and Macro 11 assembly language. Tasks executed by the image file manager include adding images (the "SPH", or "add photo" task), retrieving images (the "PHO", or "photo" task), and deleting images (the "DPH", or "delete photo" command). These tasks are performed by corresponding software modules to be discussed shortly. FIG. 2 schematically shows the relationship between the various program control modules performed by host processor 202.

When processor 202 first begins executing REAL-TRIEVE software, it executes a "sign-on" module 225 which, for example, permits user display terminals to begin communicating with the processor via communications facility 208, and performs the various tasks associated with the MLS (multiple listing service) database.

A "PHOTO-FILE" user interface module 226 interfaces the sign on module 225 with an image file manager (PFM) 231. PHOTO-FILE module 226 is started by sign on module 225 in response to input from remote display terminals 300. PHOTO-FILE 226 expects user commands: "SPH" (store photo); "DPH" (delete photo); or "PHO" (retrieve photo). Requests of the user command input, module 226 first prompts the user for a real estate property MLS listing number (hereafter "listing number"), and then verifies the existence of the listing as well as the existence of images stored in connection with the listing. Module 226 transmits to/from dynamic regions in host RAM 204. Commands are passed between modules 226, 231 using RSX-11A operating system "send blocks" (as will be understood by those skilled in the art). A single file management module 231 moves image data between the dynamically allocated memory areas and permanent image files.

In the preferred embodiment, several load modules 226 can execute concurrently for several corresponding simultaneous users sharing host computer 200, but only a single image file manager 231 load module exists. Since file manager 231 is the only module which is capable of accessing image files 232 stored on disk 206, conflicting or inconsistent operations requested by different users on the same image files are prevented.

In response to an "add or delete" command, module 226 controls file manager 231 to add image files to or delete image files from the database stored on disk 206. In the case of adding image files, blocks of digital data representing an image are received by module 226 from the user and stored in a dynamic area of RAM 204 (block 233). File manager 231 then accesses this dynamic area of RAM, reads the image data it contains, and stores the image data in a file on disk 206 (block 232).

The permanent image files stored on disk 208 in the preferred embodiment are indexed RMS files with single keys, the key in the preferred embodiment being a concatenation of a nine character list number; a single character image (photo) number; and a single character image (photo) segment number. Storing photos requires additional disk storage space on host computer hard disk 206 (since photos are stored at the host, the disk must be added to the PDP-11 host system). How much additional storage area depends on the number of active listings. The following can be used as a guideline for additional disk requirements:

2,400 photos 24 MB disk
4,000 photos 40 MB disk
8,000 photos 80 MB disk
16,000 photos 160 MB disk
34,000 photos 340 MB disk
65,000 photos 800 MB disk File manager 231 also deletes image files from disk 206 in response to user requests passed to it through module 226.

Module 226 also allows users to retrieve image files previously stored on disk 206. In response to a user command "PHO" and a user request specifying a listing number and photo number designating an image file, module 227 passes that request to file manager 231 via a "send block" and then waits for the file manager module 231 to respond. File manager 231 reads the requested image file from disk 206 and stores it into a dynamic area of RAM 204 (block 235). The module 226 then reads the digital signals from the dynamic RAM area and transmits those signals to the requesting user via communications facility 208.

REMOTE DISPLAY TERMINAL ARCHITECTURE

Referring once again to FIG. 1, remote display terminal 300 in the preferred embodiment includes a microcomputer 302 (e.g., an IBM XT or compatible), a color monitor 304, and an optional video source such as a video cassette recorder 306 and associated video camera 308 (this optional video source and camera being used to transmit new images to host computer 200 to be added to the image database). Microcomputer 302 in the preferred embodiment includes a processor 310, an associated "hard" disk 312, a random access memory 314, a modem 316, and a graphics card 318.

Remote computer 300 can thus be configured either to "capture" images (i.e., to convert video images to digital form and transmit the digitized image information to host computer 200 for storage); or to retrieve images (i.e., to retrieve selected images stored on the host computer and display, print or store such images). The "capture" configuration is somewhat more expensive than the "retrieve" configuration, so that in a typical real estate office it might be advantageous to have only one remote display terminal configured to "capture" images, but provide several terminals capable of retrieving images.

Display Terminal Capture Configuration

Photos are digitized at display station 300 and stored on the REAL-TRIEVE/PHOTO-TRIEVE host system 200 in the preferred embodiment. The task of digitizing images can be done at the Real Estate Board office, and also by an individual user having a remote display terminal 300 equipped as follows:

IBM PC-XT (or compatible)
VHS—Video Cassette Recorder
Graphics Card
Video Camera (Color)
Video Capture Card
Video Capture Software
PHOTO-TRIEVE Software With this display station configuration, a user can digitize photos and transmit them to the PDP-11 host system 300 system. In the preferred embodiment, photo storage is performed on an interactive basis as will be explained.

The video cassette recorder produces a video image which the graphics card 318 converts to digital signals in a conventional manner. The digital image is stored in the IBM PC RAM memory 314. The photo is then displayed in the upper left-hand quarter of the display monitor 304 at a resolution of $128 \times 100$ pixels. FIGS. 5A–5C show that the digitized image is displayed at the same resolution it was scanned at.

Once a photo is scanned and displayed on the monitor 304, it is available for storage on the PC-XT hard disk 312 if desired. The actual storage required is about 12K per photo. (128 dots $\times$ 100 dots = 12,800.) Conventional data compression routines are used in the preferred embodiment to reduce the data storage for a photo to between 6K–8K.

When communication is established between the host 200 and the display station 300 (preferably, such communications is established before digitizing of images has begun) the display station sends the listing number, the established graphics transmission mode and the compressed photo to the host. The graphics are stored by the host 200 as a separate file from the text listing file.

Because the listing number is transmitted with each photo, new photos and changed photos are automatically updated.

Figure 3:
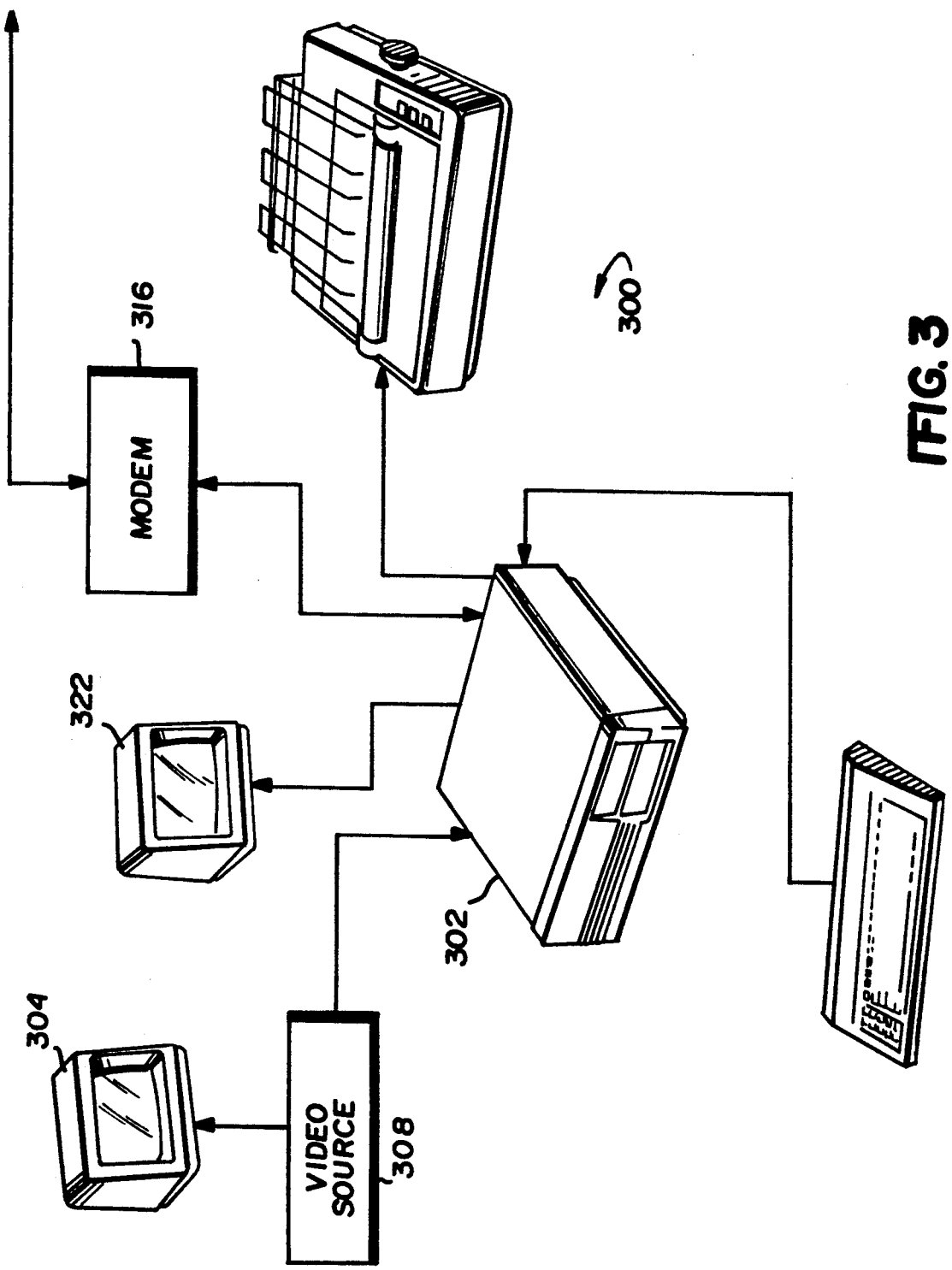
FIG. 3 is a schematic diagram of an exemplary remote display terminal shown in FIG. 1.

In somewhat more detail, the capture configuration hardware for remote display terminal 300 in the preferred embodiment is a Zenith PC model 241 with color graphics (FIG. 1 blocks 310, 312, 314), an AT&T ICB video digitizer board (block 318), two Sony KV1311 monitors (blocks 304,322) (a single pointer can be used if desired), a Magnavox VR8278 video camera (block 308), and an optional printer. The camera 308 and one of the monitors 304 are connected to the AT&T ICB board 318 for input and display of pictures. The other monitor 322 is used for text display of menus and TTY terminal communications from the PDP-11 host. A graphical illustration of this "capture" configuration is shown in FIG. 3. FIG. 4 is a schematic illustration of the rear panel of the FIG. 3 processor 302.

The PC software includes TTY conventional terminal emulation routines. Provision is made for saving parameters for and accessing 15 different host systems. Once a serial asynchronous connection is established, the user is in conversational mode with the REAL-TRIEVE sign on module 225 executing on host system 200. REAL-TRIEVE is a group of computation, database input, database search, and database display functions accessed by specifying the desired function at the main prompt.

When the user wants to input a picture in the database, the store photo function (SPH) is requested by entering the command "SPH". After the host computer 200 loads PHOTO-FILE module 226 and display terminal 300 loads a corresponding "PHOTO-STORE" module (as is discussed in greater detail shortly), the host sends a special inquiry sequence to the display terminal and awaits a reply that indicates matching software is executing on the display terminal 300. Then, the module 226 prompts the user for a listing number. The user's response is verified against the MLS text database (also maintained on the host system) and is rejected if the requested listing does not exist.

Otherwise, the street address of the property associated with the listing number is displayed to the user for possible visual cross-check. The photo database is then searched and the quantity and number (1-16) of the existing pictures (image files already stored on host computer disk 206) corresponding to the listing is also displayed. The user is prompted for the number of the picture to be added. The user can add pictures in any order in the preferred embodiment, and pictures are generally retrieved in numerically order (rather than in the order they are stored). If that picture number is not already stored, a special sequence is sent to the remote data terminal 300 and both the host computer and the remote data terminal enter a blocked data transfer protocol wherein the terminal act as the "master" and the host acts as a "slave". The remote data terminal 300 also switches to a local capture menu while maintaining the protocol in an idling state.

At the local capture menu, the user places the picture to be captured in front of the video camera. The second monitor 304 (see FIG. 3) displays the image as it will be captured. The user may adjust the brightness, hue, and intensity of the picture via the remote data terminal 300 keyboard. The camera is used to adjust focus and frame the picture. When the live image is satisfactory, the user presses a single key on the remote terminal keyboard to complete the capture process. The image is frozen, reduced to a quarter screen size, and color mapped using modified AT&T routines and AT&T graphics card 318 in the preferred embodiment. The image is then compressed using conventional image compression algorithms and sent block by block to the host computer 300. Each block is error checked (using CRC error checking routines and information transmitted by the remote terminal with the image data) and stored by the host computer module 227 in a dynamic area of host RAM 204.

When the entire picture has been received, central picture file manager 231 places the image in the picture database on disk 208 indexed by its list and photo number. The block protocol is terminated and a success or error message is displayed for the user.

Display Terminal

Picture Retrieval Only Configuration

Once the photos are stored on the PDP host system, they are then available for display at remote terminals. Such images can be retrieved by remote display stations 300 having either the "capture" configuration or the "retrieve only" configuration.

A conventional modem 316 is connected to the communication port of the display terminal processor 310. Each display station 300 initially operates as an ASCII terminal. As an ASCII terminal, the display station can access the normal text listing information. When "PHO" is entered as a function, a "mini-listing" consisting of 40 columns of text by 9 lines is sent by host 200 to the display terminal 300 (the contents of this "mini-listing" will be discussed in greater detail shortly). Display terminal 300 and host 200 then enter the blocked data protocol with host 200 acting as "master" and terminal 300 acting as "slave." Host 200 transmits data representing the image, and terminal 300 "paints" the color photo in 4 passes on its graphics screen in the preferred embodiment. When the photo is finished, the normal "print full listing" is displayed on a background screen.

To view the background screen, a user presses the F10 (or other "hot") key. By pressing F10 again, the user sees the color photo. To continue, the user presses F10 to display the text screen where a main menu prompt is displayed.

Transmission time for images depends on the size of the photo and modem speed. The following table sets forth representative transmission times for various modem speeds based on average photo size of 6K.

| Speed | Seconds |
| --- | --- |
| 300 | 80 |
| 1200 | 40 |
| 4800 | 20 |
| 9600 | 10 |

In somewhat more detail, display terminal 300 configured for "retrieve only" functions in the preferred embodiment includes a Zenith 158 PC with color graphics (blocks 310, 312, 314), an AT&T VDA card (block 318), a Sony CPD-131 color monitor (block 304), and an optional Panasonic KXP-1091 printer in the preferred embodiment. Both the monitor 304 and the color graphics port are attached to the AT&T VDA card 318 so that the monitor can display either text from the color graphics port or graphics from the AT&T card under software control (thus avoiding the expense of a second pointer).

The remote data terminal 300 software includes TTY terminal emulation routines. Provision is made for saving parameters for and accessing 15 different host systems. Once a serial connection is established, the user display terminal 300 is in conversational mode with the host REAL-TRIEVE system 200. When the user wants to retrieve a picture in the database, the photo function (PHO) is requested. After loading the module 226, the host computer 200 sends a special inquiry sequence and awaits a reply that indicates matching software is executing on the remote data terminal 300. Then the module 226 prompts the user for a listing number. The user's response is verified against the text database and is rejected if the requested listing is not found. Otherwise, host 200 sends the three portions of the photo listing— brief text ("mini-listing"), picture, and full listing text— each delimited by a special sequence (as will be explained shortly).

At the remote data terminal 300, when the software receives the special start brief text sequence it switches the monitor from color graphics text to the VDA graphics mode. The mini-listing text is displayed on the lower half of the graphics screen. Then, as each block of the picture is received, it is painted on the upper left quadrant of the screen while the next block is being received. The full listing text following the picture is painted in the internal memory of color graphics text card 318, but the monitor 304 is left in VDA graphics mode. The user can use the keyboard to switch between the two display modes. If additional pictures are available, the user may request host 200 to send them one at a time.

Additional functionality is provided at the remote data terminal 300 with extensions to the TTY terminal emulation. A four page buffer is maintained that permits the user to view text that has scrolled off the screen. Users can save text in a file or print it as it is received on the communications link. The last received mini-listing text, photo, and full listing can also be added to a local database stored on terminal disk 312 if desired. In an off-line mode both the text and the photos that have been saved can be reviewed and printed.

USER DISPLAY TERMINAL ENVIRONMENT

The user interface includes two logical screens —a conversational screen and a graphics screen. In a dual monitor environment, the logical screens may actually be displayed on two separate monitors. In a single monitor environment, the user can flip back and forth between the two logical screens by pressing a "hot key" (e.g., F10).

Access by users to the functions which manipulate image files is controlled by the standard function validation mask in a user's Terminal Control File. This is the same security mechanism used for all other online functions (e.g. add new listing) in the preferred embodiment.

(A) Retrieving a Photo (PHO)

To retrieve an image, the user connects to the Real-trieve online host system 200 in the standard fashion. The MLS listings are searched for probable matches using the Search Listing (SL) function. The MLS number is used to display additional information using the Print Listing (PL) or Full Listing (FUL) functions. Once the selections have been narrowed a color photo can be displayed using the Photo function (PHO) as shown:

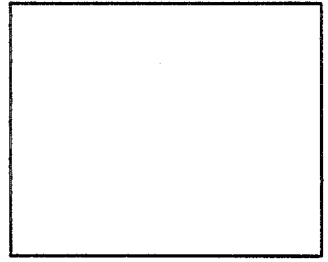

A 'What Are You' probe is sent to the user's display terminal 300 to verify that the display terminal has the appropriate photo display or capture capability. If the terminal does not respond to the probe (or responds incorrectly), the function is terminated. If the probe is successful, the user is prompted for the MLS number:

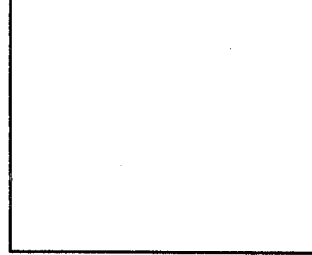

The MLS number is validated by host system 200. Host system 200 then transmits digital data representing the "Mini-Form" of the property listing text (40 columns by 9 lines) for display on the bottom of the display terminal graphics screen (as will be discussed shortly, the "mini-form" is a synopsis of the full property listing text which includes current information from the MLS database). Different colors are used to highlight the data portions of the Mini-Form in the preferred embodiment:

Conversational Screen

```
Function? PHO

Listing number? 8501045

```

Graphics Screen

```

MLS# 8501045     Price: 95500
Address: 111 Blake Road
Bedrooms: 3     Baths: 1.5
Comments: Huge deck with
          southern exposure.
```

Following this display, the digitized photo is transmitted for display in the upper left portion of the graphics screen. Immediately after the photo is transmitted, the host system 300 automatically executes the "PFL" function to display a full listing on the conversational screen:

Conversational Screen

```
Function? PHO

Listing number? 8501045

PFL listing information

```

Graphics Screen

```
##############
##############
photo #####
##############
##############

MLS# 8501045     Price: 95500
Address: 111 Blake Road
Bedrooms: 3     Baths: 1.5
Comments: Huge deck with
          southern exposure.
```

If multiple photos are stored for the listing, the user is asked whether additional photos should be transmitted. In a single monitor environment, the user will see this prompt when flips from the graphics screen to the conversational screen. Subsequent photos are successively displayed in the upper left-hand quadrant of the graphics screen. Note that the full listing data appears only after the first photo:

Conversational Screen

```
Function? PHO

Listing number? 8501045

PFL listing information

Do you want the next photo? YES

```

Graphics Screen

```
##############
##############
photo #####
##############
##############

MLS# 8501045     Price: 95500
Address: 111 Blake Road
Bedrooms: 3     Baths: 1.5
Comments: Huge deck with
          southern exposure.
```

When no more photos remain, the user is prompted for the next MLS number and the process repeats. The user can "escape" to the "function level" at any time as shown:

Conversational Screen

```
Function? PHO

Listing number? 8501045

PFL listing information

Do you want the next photo?  YES

Listing number?   <ESC>

Function?
```

Graphics Screen

```
##############
##############
photo #####
##############
##############

MLS# 8501045     Price: 95500
Address: 111 Blake Road
Bedrooms: 3     Baths: 1.5
Comments: Huge deck with
          southern exposure.
```

(B) Adding a Photo (SPH)

The process of adding a new photo to the database follows a similar format using the two logical screens. Once again, the user gains access to the Realtrieve on-line host system 200 and invokes the Add (store) Photo function (SPH) as shown:

Conversational Screen

```
Function? APH
```

Graphics Screen

A 'What Are You?' probe is sent to the user's terminal 300 to verify that the display terminal has graphics capture capability. The terminal 300 responds to this probe with display terminal profile information indicating whether the terminal has capture capability. If the terminal does not respond to the probe (or responds incorrectly), the function is terminated. If the probe is successful the user is prompted for the MLS number:

Conversational Screen

```
Function? APH

Listing number? 8501144
```

Graphics Screen

Host 200 determines whether the requested listing number is stored on host disk 206 in the MLS database before a photo can be added. The address of the listing is then read from the MLS database stored on disk 206 by host 200, transmitted from the host to display terminal 300, and displayed for verification by the display terminal. Any information about existing photos is also shown. The user is then asked to assign a photo number. If the photo number chosen already exists, the previous photo is replaced. Otherwise, the new photo is added to the database. The first photo is normally assigned number of one (1). A photo number of zero will cancel to process and return to the 'Listing number?' prompt.

The following shows the text and graphics screens during the exchange of information set forth above.

Conversational Screen

```
Function? APH

Listing number? 8501144

Address: 8051 Maryland Ave.
There are no photos on file.

Photo number? 1
```

Graphics Screen

At this point, control is turned over to the display terminal 300 to scan the photo (i.e., the terminal becomes the "master" and the host becomes the "slave"). When the photo has been successfully scanned and the resulting digital data signals have been data-compressed using conventional digital data reduction techniques, the data is transmitted to the host 200 and added to the photo database stored on disk 206. Any errors will be displayed on the display terminal conversational screen. If the process is successful, a positive acknowledgement will be displayed as shown:

Conversational Screen

```
Address: 8051 Maryland Ave.
There are no photo on file.

Photo number? 1

<< any scanning conversation>>

Photo 1 was successfully added.

Listing number?
```

Graphics Screen

```
##############
scanned  ####
photo 1  ####
##############
##############
```

A second photo for the same listing is added by entering the MLS number, checking the validation information and then specifying a new photo number as shown:

Conversational Screen

```
Listing number? 8501144

Address: 8051 Maryland Ave.
Photo number(s) 1 on file.

Photo number? 2
```

Graphics Screen

The second photo is scanned and transmitted. A positive acknowledgement is received. If there are no more photos to be added the user escapes to the 'Function?' prompt as shown:

Conversational Screen

```
Photo number? 2

<< any scanning conversation >>

Photo 2 was successfully added.

Listing number? <ESC>

Function?
```

Graphics Screen

```
###############
scanned ####
photo 2 ####
###############
###############
```

HOST ENVIRONMENT

As mentioned previously, the Phototrieve product exists on host system 200 as two RSX-11M task images. These are:

1) PHOTO-TO-FILE Module 226: Transmits a photo from a temporary sequential photo file over a dial up line to the remote user, receives a photo file from a remote user over a dial-up line and stores it in a dynamic region, and/or deletes a previously stored specific photo; and 2) PFM - Photo File Manager 231: Adds photos to the Photo File from a dynamic region copies photos from the photo file to a dynamic region, or deletes photos in the photo file on requests from SPH module 226 transmitted via "send blocks.".

PHOTO-FILE module 226 is activated by the SIGNON task in response to the PHO, SPH, or DPH commands. PFM 231 is active all the time but is stopped waiting for a send packet from task 226. When module 226 requires the services of PFM 231, it issues a send block and then "unstops" PFM—after which it attempts to read a return send block. On completion of the requested service, PFM task 231 issues a send block and in turn "unstops" the requestor task. The operation of "send block" on PDP-11 systems is well understood by those skilled in the art.

The operation of these programs in response to the various user commands is described in the sections below.

Display Photo Command (PHO)

This command is used to retrieve a specified photo from the host photo file. When the command is entered, the SIGNON task activates the PHOTO-FILE task 226. The following sequence of steps is then performed by host 200:

"PHO"—Retrieve Photo Task, module 226
  Send identification request ESC_DIS escape sequence to user terminal.
  If ESC-PC escape sequence response not received, print error message on user terminal and return to "sign-on" to issue "FUNCTION" prompt.
  Prompt user for list number.
  Verify existence of listing in master file.
  Build 'inquire' send block containing the list number and send it to PFM module 231.
  Wait for response send block from PFM.
PFM—Photo File Manager Task 231
  Receive send block and decodes 'inquire' command.
  Get list number from send block, and searches photo file for all photos for the specified listing.
  Build a photo mask with bits set corresponding to each existing photo.
  Returns send block to module 226.
PHO—Retrieve Photo Task, module 226
  Receive the send block and examine photo mask
  If no photos exist:
    Send message to that effect to the user terminal
    Return to the 'list number' prompt.
  Send message to user terminal indicating which photo numbers exist in the photo file.
  Send ESC_PML escape sequence to signal start of mini-listing.
  Generate mini-listing and transmit it to display terminal with color control codes embedded in the text.
  Send ESC-ASY escape sequence to signal return to asynchronous mode.
  Build a 'get' send block requesting the first photo
  Send the send block to PFM
PFM—Photo File Manager 231
  Receive the send block and decode 'get' command.
  Get specified photo data from file and store it in a dynamic region 235.
  Return send block to module 226 with dynamic region identifier in it.
PHO—Retrieve Photo Task, module 226

Attache to dynamic region
Send ESC_PHO escape sequence to signal blocked protocol.
Enter the protocol mode as "master" and transmit the photo data to the display terminal 300 (which acts as "slave."
Send ESC_ASY escape sequence to signal return to asynchronous mode.
Delete the dynamic region 235.
Automatically execute "PFL" function to print the listing data (Note that this occurs only after the first photo is transmitted)
If any more photos exist
  Ask user if next photo should be displayed
  If so, build 'get' send block requesting next photo from PFM and repeat the sequence.
  If not, return to 'list number' prompt.—[esc] character

Add Photo Command (SPH)

This command is entered to transmit a photo from the display terminal 300 to the host 200 and add it to the photo database. When the command is entered, the SIGNON task module 225 activates the PHOTO-FILE task module 226. The following sequence of steps are then performed:

DPH—Add Photo Task, module 226
  Decode 'add' command from SIGNON
  Send identification request ESC_CAP escape sequence to user terminal.
  If not ESC-PC escape sequence response
    Print error message on user terminal and return to SIGNON to issue 'function' prompt.
  Build 'inquire' send block containing the list number and send it to PFM 231.
  Wait for response send block from PFM module 231
PFM—Photo File Manager Task 231
  Receive send block and decodes 'inquire' command.
  Get list number from send block and search disk 208 for all photos for the specified listing.
  Build a photo mask with bits set corresponding to each existing photo.
  Return send block to module 226.
DPH—Add Photo Task, module 226
  Receive the send block and examine photo mask
  Send message to user terminal indicating the numbers of all existing photos.
  Ask user terminal for number of photo to be added or replaced.
    If the number entered is the number of an already existing photo, the existing one will be replaced.
    If the number entered does not already exist, a new photo will be added.
  Send ESC-APH escape sequence to signal blocked data protocol to transmit photo from display terminal to host.
  Send 11 character photo identifier—nine character list number plus 2 ASCII character photo number (decimal).
  Enter protocol as "slave" and receive the photo data.
  Send ESC-ASY escape sequence to signal return to asynchronous mode.
  On completion of photo data transfer, build a send block containing a region identifier for the dynamic n.
  If photo number already exists, put 'replace' command in send block.
  If photo number is new, put 'add' command in send block.
  Send block to PFM module 231
PFM—Photo File Manager 231
  Receive the send block and decode command.
  If 'replace' command
    Delete the existing photo from photo file.
  If 'add' or 'replace' command
    Add the new photo file to disk 208 database.
  Return send block to module 226 with success status.
DPH—Add Photo Task, module 226
  Delete the dynamic region 233.
  Print success or fail message on user terminal depending on status returned from PFM 231.
  Return to 'list number' prompt.
  User returns to 'function' prompt by typing [esc] character.

Delete Photo Command (DPH)

This command is entered to delete a specified photo from the host photo file database stored on disk 208. When host computer 200 receives the command DPH, the SIGNON task 225 activates the task module 226. The following sequence of steps are then performed by host computer 200.

DPH—Delete Photo Task, module 226
  Decode 'delete' command from SIGNON
  Send identification request ESC_CAP escape sequence to user terminal.
  If not ESC-PC escape sequence response return to SIGNON task 225 to issue 'function' prompt.
  Build 'inquire' send block containing the list number and send it to PFM module 231.
  Wait for response send block from PFM 231
PFM—Photo File Manager Task 231
  Receive send block and decodes 'inquire' command.
  Get list number from send block and searches photo file for all photos for the specified listing.
  Build a photo mask with bits set corresponding to each existing photo.
  Return send block to module 226.
DPH—Delete Photo Task 226
  Receive the send block and examines photo mask
  If no photos exist
    Send message to that effect to the user terminal
    Return to the 'list number' prompt.
  Send message to user terminal indicating which photo numbers exist in the photo file.
  Prompt user for number of photo to delete.
  Build a 'delete' send block with the specified photo number.
  Send send block to PFM 231
PFM—Photo File Manager 231
  Receive the send block and decode 'delete' command.
  Delete the existing photo from disk 208.
  Return send block to module 226 with status.
DPH—Delete Photo Task, module 226
  Print success or fail message to user terminal depending on status from PFM module 231.
  If any more photos exist
    Prompt user terminal for number of next photo to delete
    If number entered, loop back to build 'delete' send block and repeat sequence.
    If either [ESC] or [CR] only entered return to 'list number' prompt.

User returns to 'function' prompt by typing ESC] character.

COMMUNICATIONS BETWEEN MODULES 226, 231

Communications between PHOTO-FILE module 226 and PFM module 231 are via 13 word "send blocks." When module 226 wishes to access the photo file manager module 231 services to obtain or store a photo (image file), it notifies PFM 231 of its requests via a send block. After completion of the service, PFM 231 returns a send block to module with the requested data, or in the case of a photo, with the file id of an image file.

Communications of command in function between PFM 231 and module 226 in accordance with the following send block format:

| # Bytes | Send Block Format | |
|---|---|---|
| | Definition | |
| 2 | Command | (explained below) |
| 2 | Status | (Complete Status) |
| 9 | 9 Char List No | (List and photo number to be stored or retrieved) |
| 1 | Photo No. | |
| 2 | Photo Mask | (Flags present photos) |
| 4 | Four byte Region id | (Region Identifier) |
| 4 | | Unused |
| 2 | Two byte TID | (Terminal ID) |

Commands in first field are selected from the following:

| | |
|---|---|
| * ADD | Add a photo to the photo file |
| * DELETE | Delete a photo from the photo file |
| * REPLACE | Replace an existing photo in the file |
| * INQUIRE | Search for all photos for a listing |
| * GET | Retrieve a photo from the file |
| * NEXT | Return next list number for which photos exist in the photo file. |

PHOTO FILE FORMAT

The photo file used in the preferred embodiment is an Indexed RMS variable length record file with a single key and a bucket size of 1k-2k bytes. The data representing each image is divided into one or more photo segments (records), each of which is sized to fit into a 'bucket' of the RMS file—these segments corresponding to the lines of data packets transmitted in blocked data protocol. Each photo can have a maximum length of 254 segments.

The file key used in the preferred embodiment is an eleven character field consisting of a nine character list number, a one character photo number, and one character photo segment number. The list number is the MLS listing number of the property corresponding to the image. The photo number is an arbitrary value between 1 and 16 which is assigned by the user when the photo is submitted for storage. Once the photo number is assigned, it cannot be changed in the preferred embodiment.

Photos are always stored in the photo file in order of increasing photo number. Photos may be retrieved by photo number, or they may be retrieved sequentially in order of photo number. In the latter case, the photo number affects the order of retrieval of photos from the file. The segment number portion of the record key is one (1) for the first segment of each photo and is incremented for each photo segment. This method provides each record (photo segment) with a unique key.

Each record, or segment, of the photo file has the key field described above at the beginning of the file record header before it is written to the file. The record header is removed on retrieval before transmission of the photo to the display terminal.

FIG. 7 is a schematic diagram of a typical image file record format.

PHOTO-FILE MAINTENANCE

A photo deletion utility task (which may be run periodically via an "MCR" command issued on host computer 200) scans the photo file and compare list numbers found there with list numbers contained in the master list file. Any photos for listings which do not appear in the master list file are automatically deleted from the photo file. This utility uses PFM module 231 services for all access to the photo file—since in the preferred embodiment, access to image files stored on disk 208 is strictly limited to the PFM module in order to prevent conflicting operations from being performed on individual files—and also to permit this routine maintenance utility to be run on line without affecting normal photo file access.

As list numbers and their accompanying photos are deleted, the disk 208 space remains dedicated to original list numbers (keys) while at the same time new list photos with higher list numbers will cause files to be extended. Files therefore need to be compressed periodically to ensure that all images relating to a particular listing are stored contiguously on disk 208 (and thereby decrease disk access time). File compression can be performed using standard host RMS operating system utilities to compress the file. In order to compress files, unused disk space equal to the size of the input files are required on the disk. User access to the photo files is denied by the host software while this compression process is in progress.

MINI-LISTING

The 'Mini-Listing' described in this section refers to an abbreviated version of the Print Full Listing (PFL) used for display on the color graphics terminals having a 40 column output restriction. Mini-listings have a 9 line limit—allowing then to be displayed concurrently with the color photos.

The first line of the Mini-Listing in the preferred embodiment displays the current list price (LP), selling price (SP) and listing status (ST e.g., NEW, ACTV, SOLD) taken from the Master Multiple listing service record corresponding to the property of interest. This is similar to the current Print Full Listing function.

Mini-Listing formats will be defined using the "Easy-Entry" forms editor (EASYED) as is currently done for the full listing forms. An additional definition file defines a subset of fields to be extracted from the full listing record for display in the Mini-Listing.

When the Mini-Listing is displayed as part of the photo retrieval function (PHO), additional color control characters are inserted in the output stream in the preferred embodiment, allowing the variable data and the background form to be highlighted in different colors.

The Mini-Listing is displayed as part of the photo retrieval function (PHO). The existing Print Full Listing shared code already in use by REAL-TRIEVE to generate full listing formats is used, with the following modifications, for generation of mini listing formats:

A custom PRINTLIST definition (with a 40 column limit) is used for the first line to display the list price (LP), selling price (SP) and listing status (ST).

Special color control codes are inserted in the output stream. The control character COLOR_BKGRND precedes each background or fixed portion of the text. The control character COLOR_DATA precedes each data or variable portion of the text.

The existing code for 'vectored data' is used to selectively display portions of the full listing record. This allows selection of any incorporation of the selected fields into the mini listing format in any desired order rather than displaying the data as a sequential stream (as is done for PFL).

PROTOCOL OF COMMUNICATIONS BETWEEN THE HOST AND THE DISPLAY TERMINAL

Communication between the host computer 200 and the display terminal 300 occurs at two levels— the command level and the data transmission level. All user commands and response messages from the host 200 occur at the command level. Photo data transmission occurs at the data transmission level.

To move from the command level to the data transmission level, one of two escape sequences—to indicate direction of pending data transfer—is transmitted by the host 200 to the display terminal 00. On completion of the photo data transmission, and following the normal exit from the transmission level protocol, an additional escape sequence is transmitted by the host to insure that both sides of the line remain in sync—that is, that both the host and the display terminal recognize the return to command level protocol. Each of the escape sequences is transmitted by the host to the display terminal in the preferred embodiment—none are transmitted by the terminal to the host.

The command level protocol used in the preferred embodiment is a conventional asynchronous terminal character protocol. Image data transmission protocol is based on the ANSI X3.28 blocked data protocol.

After a user has inputted a photo command at a display terminal 300, and when the picture data is to be transmitted, the host 200 sends one of two escape sequences (to indicate photo transmission or reception) to the display terminal directing it to enter the blocked data protocol. When picture data transmission is completed, the blocked data prococol is exited as provided for in the protocol, after which the host sends a 'protocol exit' escape sequence to insure that both side recognize the return to the command level.

While the blocked data protocol used by the preferred embodiment is based on the ANSI X3.28 protocol, there are some significant differences. For example, the two bytes of checksum data are never allowed to be control character codes in the preferred embodiment. If the low order 7 bits of either checksum byte represent any control characters (i.e., less than 40 octal), an octal 100 is ORed with the byte both at the transmitting side before transmission of the CRC and at the receiving side after computation of the CRC and before the receiver checks CRC. This convention prevents CRC error checking information from being confused with reserved control character information.

An additional restriction placed on the transmitted data is that appearance of the following control characters in the data stream must be restricted.

S,Q,E—Control S, Q or E (octal 23, 21, 05)—DC3 and DC1

These characters are reserved to allow for flow control by any status multiplexers which may be in the data path. Note that this convention is observed without regard to the high order bits of eight bit characters. That is, each character really represents two eight bit values. For example, "control S" implies both 023 and 223 octal.

P—Cohtrol P (octal 20)—DLE

For efficiency of the host 200 input, this character should only appear as a part of the TSTX and TETX (Transparent start and end of text) sequences. This character causes termination of a data read request by the host 200. Thus, appearance of this character in the binary data stream transmitted from the display terminal 300 to the host 200 causes the termination and reissuance of a read request, resulting in several reads being issued by the host to read a single block of data. While such repeated read requests do not seriously disrupt system operation, they do decrease the efficiency with which the host 200 handles input signals and therefore decrease overall system throughput.

Display Terminal Escape Character

The character selected by the display terminal 300 to escape or flag the encoding of the above characters in the data must itself, of course, be escaped. That is, if 'esc' is the escape character selected, then an 'esc' in the data must be transmitted as 'esc' 'esc'.

The above characters, wherever they appear in the photo data, must be encoded by the display terminal 300 transmission of photo data to the host and be decoded again by the display terminal on retrieval of the data again for display. The method of encoding and decoding these characters is entirely at the discretion of the display terminal software since they are treated transparently by the host 200—that is, they are stored in the photo file and returned back to the display terminal 300 exactly as originally encoded by the display terminal.

Storage of encoded data without interpretation by the host implies that on retrieval of the data by the same or different display terminal 300, it is possible that the escape character used to flag the encoded character—which should not be the DLE character—could be the last character in one record and the encoded character itself may be the first character in the next record.

An exemplary communication between host 200 and a display terminal 300 using the ANSI X3.28 protocol is described pictorially as follows.

| Host | Display Terminal |
|---|---|
| 1) Host is ready to enter protocol to transmit/receive photo data [ESC] 'sequence' → where 'sequence' is: ESC SPH to receive data (causes the display terminal to become the master in the following exchanges), or ESC PHO to transmit data - (causes the host to become the "master" in the following exchanges). 2) Connect Phase | |
| Master | Slave |
| ENQ → | |
| | ← ACK0 |

-continued

3) Data Transmission
The following sequence of 'Data Packet'
followed by 'ACKx' response is repeated until
all data has been transmitted. ACK0 and ACK1
are alternated on successive packets to allow
the master to detect a missed packet.

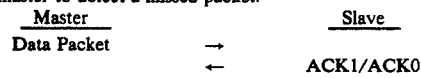

| Master | | Slave |
|---|---|---|
| Data Packet | → | |
| | ← | ACK1/ACK0 |

'Data Packet' has the following format in the
preferred embodiment:
[DLE] [STX] [1-256 data characters] [DLE]
[ETX] [2 byte CRC]
where
"DLE" is the "protocol escape" character, "STX"
is the start of the XL (hereafter, "ETX" is the
"end of text" character, and CPC is checksum data.
In the event the receiving unit detects a CRC
error in the received data, the "slave" responds
with 'NAK' (not acknowledge) instead of 'ACKx' and
the "master" retransmits the incorrectly received
block. Provision is also made for the "slave" to
respond with an 'abort' response in which case the
"master" stops transmitting picture data, exits the
blocked data protocol, and returns to command level.
(4) Termination Phase

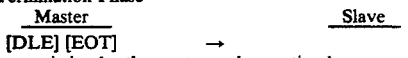

| Master | | Slave |
|---|---|---|
| [DLE] [EOT] | → | |

On transmission by the master and reception by
the slave of this end of transmission sequence,
each returns to character asynchronous (command
level) protocol.

| Host | | Display Terminal |
|---|---|---|
| ESC ASY | → | |

The following escape sequence from host 200 to
display terminal 300 flags the end of the
blocked data protocol and the return to the
asynchronous protocol.

MENU AND COMMAND STRUCTURE

Figure 6:
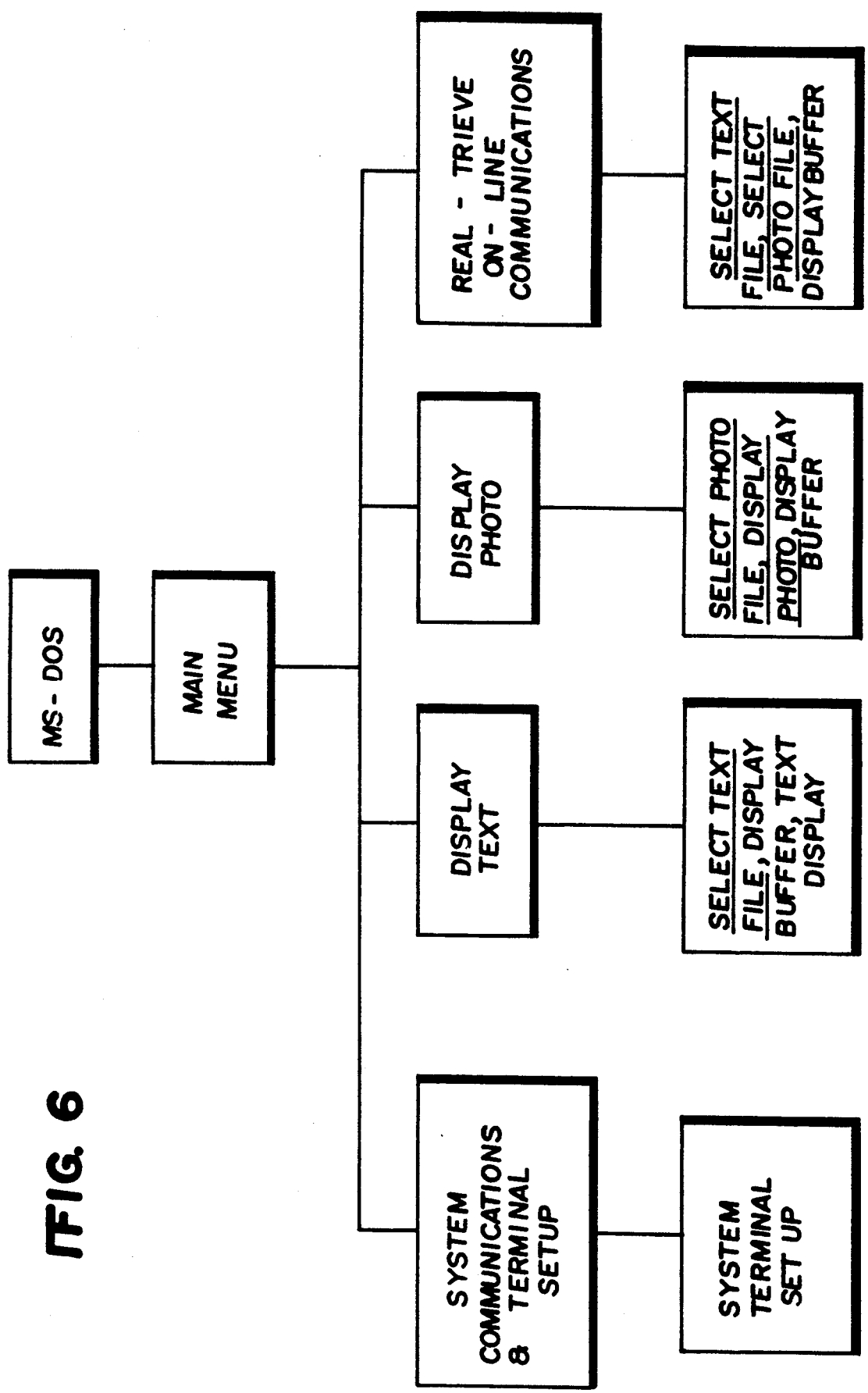
FIG. 6 is a schematic diagram of the user menu structure displayed by the FIG. 1 remote display station.

System 100 has been designed to be a "user friendly" environment so make it easier for a user of remote display terminals 300 to perform image related tasks. Accordingly, system software is "menu driven" with menus organized in a hierarchical structure. FIG. 6 is a schematic diagram of the hierarchical user menu structure of the preferred embodiment. The following are detailed examples of the preferred embodiment menu formats and command options shown in FIG. 6, along with a summary of the steps performed by system 100 in response to selection of menu options.

PROGRAM INITIALIZATION

Install printer driver from
East Coast Software for
graphics
Install routines from Blaise for
serial port interrupt handling
Install clock and error
interrupt handling routines
using routines from Blaise for
interrupt replacement
Set up memory buffer space
using routines from Blaise for
memory management
Initialize AT&T VDA board
using routines from AT&T for
graphics
Initialize text graphics adapter
using routines from Blaise for
screen management
Setup the base communications
and terminal parameters using
default settings from the
PTERM.CFG parameter file
on the drive in the directory
where the program was found
Display the main menu and         Routines for text display
accept user input using routines  use routines from Blaise that
(pg 3)                            actually paint the screen;
                                  routines for user input use
                                  routines from Blaise that
                                  actually retrieve the keystrokes

USER INPUT SCREEN

| | |
|---|---|
| User input screens are used throughout the system where choices for a variable cannot be presented sequentially | The screen presents a prompt defining the type of input required and a window sized to the maximum characters permitted and containing the current value of the prompted variable with the cursor placed at the end of that value; some variables are restricted to text only input and others permit any 8 bit value generated by the keyboard; 3 special key sequences are supplied |
| Cancel | Exits the input screen leaving the value of the prompted variable set as it was when the screen was entered |
| Backspace key | Erase the previous character and back up the cursor |
| Return | Validate and set the variable to the value in the window |

FILE SELECTION SCREEN

| | |
|---|---|
| File selection screens are used throughout the system to let the user view and select from a number of names | The screen presents a list of the file names with the current selection highlighted in reverse video; the selection is changed by moving the highlight with the cursor keys; various operations can be performed by selecting the appropriate function key as defined with that screen |

C1:Main Menu: local

Photo-Term TM

Copyright 1986 by Moore, Data Management Services Division

\<F1\> Exit to DOS
\<F2\> Change setup
\<F3\> Format data disk
\<F4\>
\<F5\>
\<F6\>
\<F7\> Display text
\<F8\> Display photos
\<F9\> Select setup DEFAULT
\<F10\> Call the host computer
Press the appropriate function key to make your selection.

F1—Exit to DOS: Pressing F1 returns your monitor screen to the DOS C>prompt.

F2—Change setup: Pressing F2 takes you to an input screen which asks you to enter a password. Only an authorized user can change the terminal and communications setup.

F3—Format data disk: Pressing F3 enables you to prepare a brand new floppy disk for use. By pressing F3 you get a message to place a floppy disk in a designated drive (usually drive B). A floppy disk, once placed in the drive, is formatted for use by your computer. Use caution in formatting used floppy disks, as all files will be erased.

F7—Display text: Pressing F7 displays a menu that permits you to select a text file and display or print text that has been stored on your computer.

F8—Display photos: Pressing F8 displays a menu that permits you to select a photo file and display or print photos that have been stored on your computer.

F9—Select setup: Pressing F9 selects the setup for your terminal and communications that is used when F10 is pressed to contact your host computer.

F10—Call the host computer: Pressing F10 initiates steps which cause your computer to communicate with the host computer on which the Real-Trieve information system is available.

| MAIN MENU | |
|---|---|
| Exit to DOS | Reset AT&T VDA board using routines from AT&T for graphics; reset text board using routines from Blaise for screen management; restore original clock and error routines using routines from Blaise for interrupt management; free memory buffers using routines from Blaise for memory management |
| Change setup | Execute password checking with a user input screen prompting for the password; display communications and terminal setup menu with current parameters and accept user input (pg 4) |
| Format data disk | Verify that data disk is not hard disk or program disk; call DOS format command using routine from Blaise for calling DOS commands |
| Display text | Open default text file; display first text screen and accept user input (pg 7) |
| Display photo | Open default photo index file; display user selection screen with photo names and accept user input (pg 8) |
| Select setup | Recall next set of stored parameters making them current |
| Call host system | Initialize the serial port using routines from Blaise for serial communications; place modem dialing prefix and telephone number in the output buffer; display the on-line communications screen and accept user input (pg 10) |

C2: System Communications & Terminal Setup: local

System Communications & Terminal Setup

<F1> Exit to main menu
<F2> Change terminal setup
<F3> Prefix string for autodial . . .
<F4> Phone number string for autodial . . .
<F5> Hangup string for autodial . . .
<F6> Answerback string  HIDDEN 
<F7> Com port number (serial port) _
<F8> Speed (baud rate) . . .
<F9> Select setup . . .
<F10> Save communications setup
Press the appropriate function key to make you selection.

| COMMUNICATIONS & TERMINAL SETUP MENU | |
|---|---|
| Exit to main menu | Display main menu and accept user input |
| Change terminal setup | Display terminal setup menu with terminal parameters and accept user input (pg 6) |
| Prefix string for autodial | Display user input screen prompting for |

| COMMUNICATIONS & TERMINAL SETUP MENU (continued) | |
|---|---|
| | modem setup commands and accept user input; set current prefix to user input |
| Phone number string | Display user input screen prompting for telephone number and accept user input; set current phone number to user input |
| Hangup string for autodial | Display user input screen prompting for modem hangup commands and accept user input; set current hangup to user input |
| Answerback string | Display user input screen without current value, prompting for new answerback and accept user input; set current answerback to user input |
| Com port number | Switch current port between port 1 or 2 |
| Speed | Set current speed to next speed in cycle (300, 1200, 2400, 4800, 9600) |
| Select setup | Recall next set of stored parameters making them current |
| Save communications setup | Display selection screen with names of all currently saved setups; the following functions are available: Exit-Display communications and terminal setup menu Erase-Remove the highlighted entry and rewrite the PTERM.CFG file Default-mark the highlighted entry as the default one to use when the program starts and rewrite the PTERM.CFG file Rename-display the user input screen prompting for a replacement name for the highlighted entry; rewrite the PTERM.CFG file Replace-take the current values and use them to replace the values of the highlighted entry; rewrite the PTERM.CFG file Add-display the user input screen prompting for a new name for an additional entry; rewrite the PTERM.CFG file |

C3: System Terminal Setup: local

System Terminal Setup

<F1> Exit to communications menu
<F2> Separate photo monitor_
<F3> Printer port_
<F4> Printer type . . .
<F5> Printed photo size_
<F6> Photo print sequence . . .
<F7> Data drive_
<F8> Data path . . .
<F9> Set password . . .
<F10> Save terminal setup and exit
Press the appropriate function key to make your selection.

| TERMINAL SETUP MENU | |
|---|---|
| Exit to commmunications menu | Redisplay communications and terminal setup menu with current parameters and accept user input |
| Separate graphics monitor | Switch between yes or no 2nd monitor |
| Printer port | Cycle to next printer port (1, 2, 3) |
| Printer type | Cycle to next printer type (as supported by driver from East Coast Software) |
| Printed photo size | Cycle to next photo size (1-9 as supported by driver from East Coast Software) |
| Photo print sequence | Display user input screen prompting |

TERMINAL SETUP MENU

| | |
|---|---|
| | for P-photo, B-brief text, L-full listing text, and F-form feed to specify which elements and sequence are to be printed for the print photo command; set photo print sequence to user input |
| Data drive | Cycle to next data drive (A-F) for use when saving text or photos or when formatting a data disk |
| Data path | Display user input screen prompting for a pathname to use when saving text or photos; set data path to user input |
| Set password | Display user input screen without previous value, prompting for the password used to control access to the setup menus; set password to user input |
| Save terminal setup and exit | Save the current terminal setup and rewrite the PTERM.CFG file; display the communications and terminal setup menu |

C4: Display Text: local

---

Do you want the next photo? (y/n): N
LISTING NUMBER(S)? 17773
Photos currently on file: 1, 2, 3, 4, 5
Photo 1 plotted.

INFORMATION IS DEEMED RELIABLE BUT NOT WARRANTED

<<< L-$73,500     S-                    >>>

Add: WILDWOOD WEST, CHARLOTTE          Area 02 $ 73500    Sign Y   MLS# 0017773
Directions RTE 7 SOUTH, 1ST R AFTER WILDFLOWER FARM, 1ST LEFT, 2ND HOUSE ON
LEFT                                   House size 28×46            Style RANCH
Lot sz.F 175 1A+ —        Deed V. 41 P. 528 Apx.Sq.Ft. 1300         Color GREEN
Rms Appx.Sz.      B   1 2 Rms Appx.Sz.    B    1 2 Fin.Bsmt UNFIN   Flrs HW/INLAID
LR   15×18        X    Ba  1,1/2MBR           X   Est.Age 10+ —     Walls SR
DR   12.5×10.7    X    BdR 15.5×11.9          X   Constr. WF        Pch/Deck 4×10.4
Kit  13.3×8.6     X    BdR 11.5×12.9JO        X   Fnd.Wls PC        St.Win THERMAL
Kit  w/ ROHF,DW,DSS,RE BdR 11.6×10.6          X   Siding MASONITE   Fpl LR W/S BSMT
Fr                                                Roof AS           Typ Heat ELEC/WD
Gar: 2 Att/Det/Und ATT Tot.Rms 5  Tot.BdR 3       Water COMM        HtWtr ELEC O/R
Remarks: RANGE,RED, NEW. WS, WOOD, TV ANTEN       Sewer SEPTIC      Gas/Oil Co
,DRAPES ALL STAY. BSMT GOOD HGT FOR FINISHI       DrvWy GRAVEL      Elect.Co GMP
NG,BUILT IN CHINA, HW FLOORS,APPROX $100*         Zoning RES
1>EXIT    3>PRT FILE    4>BGN FILE    5>SEL FILE    8>1/2 PAGE    9>BUF    10>NXT PAGE

---

DISPLAY TEXT

| | |
|---|---|
| Text screen | Display the first screenful of text from the file PTERM.TXT on the data drive in the directory path specified in the terminal setup and copy it to the multi-page buffer that holds the last 96 lines displayed; the following functions are available: |
| EXIT | Redisplay the main menu and accept user input |
| PRT FILE | Write each line of the file to the printer followed by a carriage return and line feed |
| BGN FILE | Restart the display at the beginning |

---

DISPLAY TEXT

| | |
|---|---|
| | of the file |
| SEL FILE | Display a user selection screen with all the .TXT file names on the data drive in the directory path specified in the terminal setup; let the user select the following functions: Cancel-redisplay the main menu and accept user input Erase-delete the highlighted file and redisplay remaining file names Use-display the first screenful of text from the highlighted file on the data drive in the directory path specified in the terminal setup and copy it to the multi-page buffer |
| ½ PAGE | Display the next 12 lines of text on the screen and copy them to the multi-page buffer |
| BUF | Permit the use of the cursor keys to display the lines saved in the multi-page buffer and the cancel function to redisplay the last 24 lines |
| NXT PAGE | Display the next 24 lines of text on the screen and copy them to the multi-page buffer |

---

C5: Select Text File: local

PTERM

MORETXT

Use cursor keys to choose an existing text file.
<F1> Cancel
<F9> Erase highlighted text file
<F10> Use highlighted text file
Press the appropriate function key to make your selection.

C6: Display Buffer

---

INFORMATION IS DEEMED RELIABLE BUT NOT WARRANTED

<<< L-$73,500     S-                    >>>

Add: WILDWOOD WEST, CHARLOTTE          Area 02 $ 73500    Sign Y   MLS# 0017773
Directions RTE 7 SOUTH, 1ST R AFTER WILDFLOWER FARM, 1ST LEFT, 2ND HOUSE ON
LEFT                                   House size 28×46            Style RANCH
Lot sz.F 175 1A+ —        Deed V. 41 P. 528 Apx.Sq.Ft. 1300         Color GREEN -continued

| Rms Appx.Sz. | | B | 1 2 | Rms Appx.Sz. | | B | 1 2 | Fin.Bsmt UNFIN | Flrs HW/INLAID |
|---|---|---|---|---|---|---|---|---|---|
| LR | 15×18 | | X | Ba | 1,1/2MBR | | X | Est.Age 10+ — | Walls SR |
| DR | 12.5×10.7 | | X | BdR | 15.5×11.9 | | X | Constr. WF | Pch/Deck 4×10.4 |
| Kit | 13.3×8.6 | | X | BdR | 11.5×12.9JO | | X | Fnd.Wls PC | St.Win THERMAL |
| Kit | w/ ROHF,DW,DSS,RE | | | BdR | 11.6×10.6 | | X | Siding MASONITE | Fpl LR W/S BSMT |
| Fr | | | | | | | | Roof AS | Typ Heat ELEC/WD |
| Gar: | 2 Att/Det/Und ATT Tot.Rms 5 Tot.BdR 3 | | | | | | | Water COMM | HtWtr ELEC O/R |
| Remarks: RANGE,RED, NEW. WS, WOOD, TV ANTEN | | | | | | | | Sewer SEPTIC | Gas/Oil Co |
| ,DRAPES ALL STAY. BSMT GOOD HGT FOR FINISHI | | | | | | | | DrvWy GRAVEL | Elect.Co GMP |
| NG,BUILT IN CHINA, HW FLOORS,APPROX $100* | | | | | | | | Zoning RES | |

1>CANCEL                                    Use cursor keys to move forward and backward.

C7: Display Photo: local

PHOTO2

PHOTO1

Use cursor keys to choose a photo.
<F1> Exit to main menu
<F2> Erase highlighted photo
<F3> Mark highlighted photo for moving
<F6> Photo print
<F7> Display highlighted photo
<F8> Select another photo file
<F9> View buffer with full listing
<F10> Switch to photo

| DISPLAY PHOTO | |
|---|---|
| Photo selection screen | Display a user selection screen with the names of the photos saved in the index file PTERM.PDX on the data drive in the directory path specified in the terminal setup; the following functions are available: |
| Cancel | Display the main menu and accept user input |
| Erase | Remove the highlighted entry from the index; delete the file with the data for the highlighted entry; rewrite the index file |
| Mark photo | Note the currently highlighted entry as marked; enable the move marked function, if the move marked photo function is not the next function selected, cancel the mark and disable the move marked photo function |
| Move marked photo | Adjust the index pointers so that the marked entry is placed ahead of the highlighted entry in the display order of the index; display the new index order |
| Print photo | If a photo has been displayed, print the last photo displayed (using the printer driver from East Coast Software), brief text buffer, full text buffer, and form feeds as specified in the terminal setup |
| Display photo | Reads the file pointed to by the highlighted entry into the photo buffer, brief text buffer, and full text buffer, switch the AT&T VDA board to graphics mode using a routine from AT&T; paint the brief text buffer on the VDA board using routines to control placement and routines from AT&T to actually paint the characters; pass the photo buffer data to a routine from AT&T for decoding and painting on the graphics screen in alternating upper quadrants so that two photos are displayed simultaneously |
| Select photo file | Display a user selection screen with all the .PDX file names on the data drive in the directory path specified in the terminal setup; let the user select the |

| -continued | |
|---|---|
| DISPLAY PHOTO | |
| | following functions: |
| | Cancel-display the main menu and accept user input |
| | Erase-delete the highlighted index file and all photo data files pointed to by that index and redisplay remaining index file names |
| | Use-display a user selection screen with the names of the photos saved in the .PDX index file of the highlighted name on the data drive in the directory path specified in the terminal setup |
| View buffer | Copy the contents of the full text buffer to the multi-page buffer; display the last 24 lines of the multipage buffer; permit the use of the cursor keys to display the lines in the multi-page buffer and the cancel function to display the photo name user selection screen |
| Print photo | If a photo has been displayed, print the last photo displayed (using the East Coast Software printer driver), brief text buffer, full text buffer, and form feeds as specified in the terminal setup |
| Switch to photo | Switch the AT&T VDA board to display graphics using a routine from AT&T; while graphics are displayed keyboard input is disabled except for the PH PRT (Print photo) and BUF (View buffer) functions plus a NEXT PHOTO function that advances to the next index entry before executing the Display photo function and a MENU function that switches the AT&T board back to display the photo name user selection screen using a routine from AT&T |

C8: Select Photo File: local

PTERM

BARB

User cursor keys to choose an existing photo file.
<F1> Cancel
<F9> Erase highlighted photo file
<F10> Use highlighted photo file
Press the appropriate function key to make your selection

| ON-LINE COMMUNICATIONS | |
|---|---|
| Received communications | The serial communications routines from Blaise handle a received character by interrupting the current activity and placing the character in the input buffer |
| Keyboard input | Hardware routines handle a keystroke by placing a scan code into a keyboard |

ON-LINE COMMUNICATIONS -continued

| | |
|---|---|
| Communications loop | buffer<br>A routine alternately checks the received communications buffer and the keyboard buffer using routines from Blaise; communications are checked for special character sequences and if not found are displayed as text or the appropriate format control on the screen and moved to the multi-page buffer that holds the last 96 lines received; keystrokes are checked for function key sequence and if not found are placed into an output buffer using a routine from Blaise-the serial communications routines from Blaise then send the character out the serial port<br>*Received special sequences* |
| x05 | Place the current answerback string into the output buffer |
| x1D x5B x43 | Place the terminal type response string into the output buffer |
| x1D x5B x4D | Switch the AT&T VDA board to graphics mode using a routine from AT&T; paint all received characters on the VDA board using routines to control placement and routines from AT&T to actually paint the characters; place it in the brief text buffer |
| x1D x5B x50 | Switch the AT&T VDA board to graphics mode using a routine from AT&T; establish ANSI 3.28 block protocol mode with the host system using the clock routine to control timing; receive each block from the host; error check the block; check for an end block protocol sequence; decode and paint each block on the graphics screen (upper left if immediately preceeded by brief text, otherwise upper right) using a routine from AT&T; place it in the photo buffer |
| x1D x5B x50 | Revert to processing received data as ordinary text |
| x1D x5B x70 | Process incoming data as ordinary text and also place it in the full text buffer |
| x1D x5B x51 | Place the password protecting the setup menus into the output buffer<br>*Keystroke function sequences* |
| EXIT | Confirm that user wishes to exit; close open files and turn off printer; reset AT&T VDA card to display text using routine from AT&T; display main menu and accept user input |
| HOLD | If not currently locked, place XOFF in the output buffer and disable display of received characters<br>If currrently locked, place XON in the output buffer and enable the display of received characters |
| TX PRT | If not currently on, send a return to printer and as each line received is completed send it followed by a return and line feed to the printer<br>If currently on, disable printing |
| TX SAV | If not currently on, open a .TXT file or the data disk in the directory path specified by the terminal setup using the name specified by the TX NAM command or PTERM if none has been specified; as each line received is completed add it to the file<br>If currently on, close the file |
| TX NAM | Display a file selection screen with all current .TXT files on the data disk in the directory path specified by the terminal setup; the following functions are available<br>Cancel-do not change the current selection<br>Use highlighted-make the highlighted |
| PH PRT | file the current file for text<br>Name and use new-display a user input screen prompting for a new name for a file for saving text<br>If a photo has been received, print the last photo displayed (using the printer driver from East Coast Software), brief text buffer, full text buffer, and form feeds as specified in the terminal setup |
| PH SAV | If a photo has been received, display a user input screen prompting for a name for the photo; add the name entry to the index file on the data disk in the directory path specified by the terminal setup using the index file name specified by the PH NAM command or PTER if none has been specified; open a file on the data disk in the directory path specified by the terminal setup using the name specified by the TX NAM command or PTERM if none has been specified and a numeric extension based on its place in the index; write the contents of the photo, brief text, and full text buffer to the file |
| PH NAM | Display a file selection screen with all current .PDX files on the data disk in the directory path specified by the terminal setup; the following functions are available<br>Cancel-do not change the current selection<br>Use highlighted-make the highlighted file the current index file for photos<br>Name and use new-display a user input screen prompting for a new name for an index file for saving photos |
| BUF | Stop displaying received communications permit the use of the cursor keys to display the lines saved in the multi-page buffer and the cancel function to redisplay the last screen and restart display of received communications |
| PHO | Switch the AT&T VDA board to display graphics using a routine from AT&T; while graphics are displayed keyboard input is disabled except for the PH PRT, PH SAV, PH NAM, and BUF functions plus a TXT function that switches the AT&T board back to display text using a routine from AT&T |

C9: Select Text File: on-line

PTERM

MORETXT

Use cursor keys to choose an existing text file.
<F1> Cancel
<F9> Name and use new text file
<F10> Use highlighted text file
Press the appropriate function key to make your selection.

C10: Select Photo File: on-line

PTERM

BARB

Use cursor keys to choose an existing photo file.
<F1> Cancel
<F9> Name and use new photo file
<F10> Use highlighted photo file
Press the appropriate function key to make your selection.

C11: Real-Trieve Communications Display

```
10/08/86 16:14:12 LINE#4
TERMINAL #0600
GREETINGS
WELCOME TO MOORE DATA'S REAL-TRIEVE ON-LINE SYSTEM
FUNCTION?_
1>EXIT 2>HOLD 3>TX PRT 4>TX SAV 5>TX NAM 6>PH PRT 7>PH SAV 8>PH NAM 9>BUF 10>PHO
```

DETAILED DESCRIPTION OF STEPS PERFORMED BY HOST AND DISPLAY TERMINAL

FIGS. 8-26 are detailed schematic flow charts of steps performed by host 200 and display terminal 300 during operation in the image mode of the presently preferred exemplary embodiment of FIG. 1 system 100. FIGS. 9-12 are detailed flow charts of the steps performed by display terminal 300 to retrieve images previously stored by host 200; FIGS. 22-26 are detailed flow charts of steps performed by the display terminal to capture and store images on the host; and FIGS. 13-21 are detailed flow charts of steps performed by the host to receive and transmit image data to the display terminal.

TERMINAL IMAGE RETRIEVAL

Image retrieval routine ("PHOTO-TERM") 500 shown in FIG. 8 is executed by display terminal 300 in response to the command "PHO" inputted by the user. Routine 500 requests a particular image stored on host 200 and displays the image on display terminal monitor 304.

In response to data received from the host (block 502), the display terminal determines whether the received data is simply text to be displayed on the conversational screen or special protocol data which must be interpreted (decision block 504). If the received data is merely text to be displayed, display terminal 300 acts simply as a TTY display terminal by displaying all legal characters on its conversational display screen (blocks 506, 508). On the other hand, if a "protocol sequence" character (i.e., a special character) has been received, display terminal 300 tests the significance of the received character.

If the received character(s) indicate a request by host 200 for the display terminal identification (tested for by decision block 510), the display terminal transmits the appropriate identification response sequence (block 512). If received special characters indicate the beginning of a "mini-list" (decision 513), display terminal 300 "flips" monitor 304 to the image graphics mode and reserves a storage area within memory 314 in which to store the incoming data (block 514). As text data corresponding to the "mini-listing" is received (block 516), display terminal 300 writes the received data to the graphics display and also to a text buffer area within RAM 314 (block 518). Detection of a further "protocol sequence" character (decision 520) causes display terminal 300 to cease treating received data as "mini-list" data.

If the "protocol sequence" character(s) received by block 502 are not identification inquiry or start mini-list characters, display terminal 300 determines whether the received character indicates a full text listing is about to be transmitted (decision 521). If the host 200 transmits the full text listing, display terminal 300 clears a buffer in RAM 314 for use in storing the listing (block 522), and then receives the full text data and writes same to the buffer (blocks 524, 526). Insertion of a "protocol sequence" character in the text (tested for by decision block 528) is used to stop display terminal 300 from storing full text information and to determine what other command has been specified by host system 200.

If the special "protocol sequence" character received by display terminal 300 is a character indicating a photo (image) is to be received, (tested for by decision block 530; this start photo character is transmitted by host 200 in response to receipt by the host of the command "PHO" transmitted earlier by the display terminal operating in the TTY mode), the display terminal executes receive image routine 532 to receive an image to be transmitted by the host.

If the special character received by display terminal 300 is a "password" inquiry (tested for by decision block 534), the display terminal transmits a predetermined password in response to the character (decision block 536). Finally, if the received special character is a command to display terminal 300 to return to the serial asynchronous terminal mode (as tested for by decision block 538), the display terminal closes any open data buffers (block 540) and reverts to the TTY mode to await received data at block 502.

Figure 9:
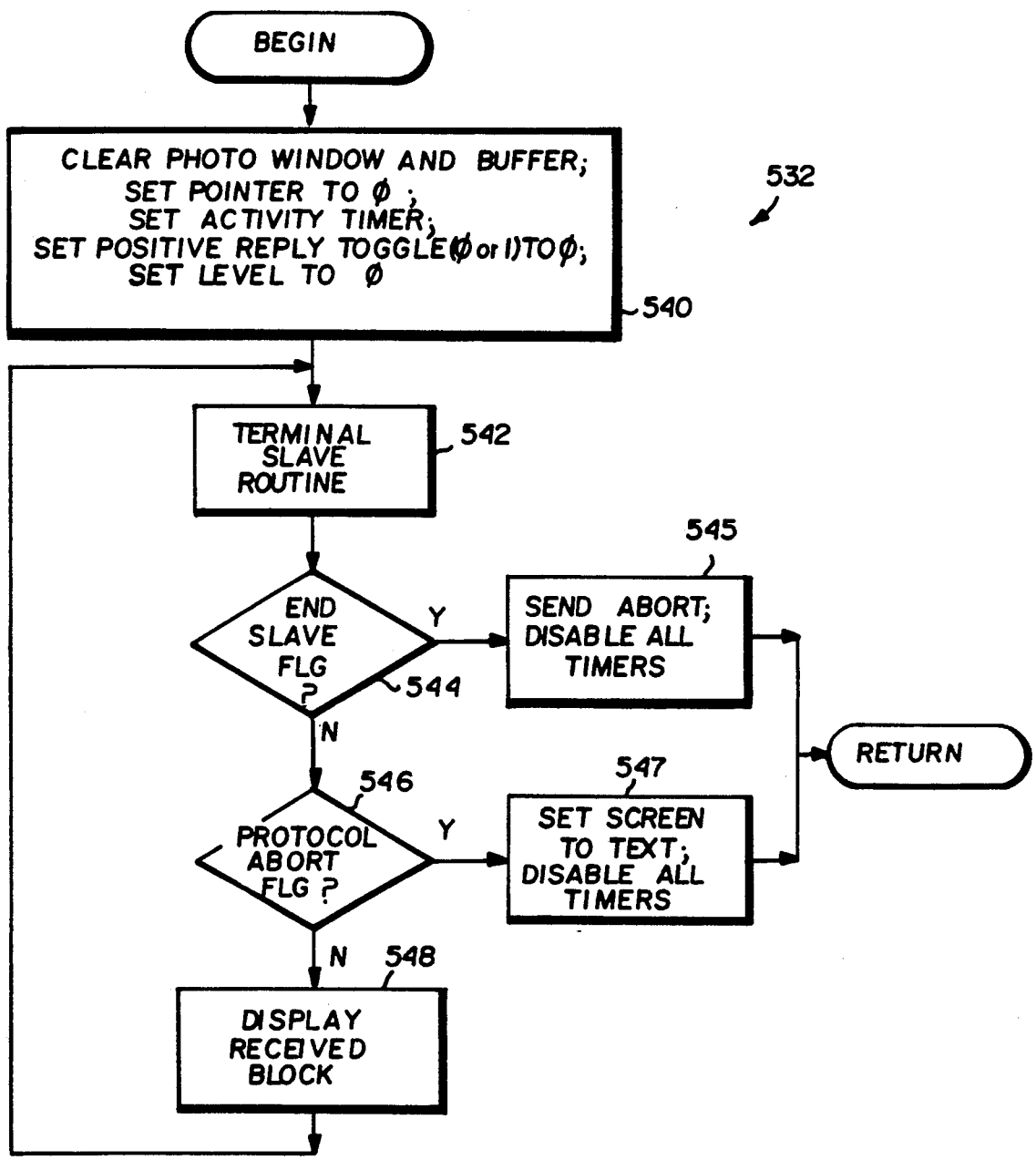

FIG. 9 is a schematic diagram of the received image routine 512 shown in FIG. 8 This received image routine is executed by display terminal 300 to receive and display an image transmitted to it by host 200. Upon determining that image data is to be transmitted, display terminal 300 initializes various storage areas and parameters it will use to receive the image (block 540). For example, display terminal 300 clears buffers and other storage areas to be used to store the actual image data; initializes buffer pointers which point to locations within those cleared buffers; initializes an activity timer (used in the preferred embodiment to discontinue image receiving if too long a period of time has elapsed since data was received from the host); initializes a "positive reply" counter to 0 (this counter is used to "toggle" values of received acknowledged signals transmitted by the display terminal to the host between "ACK0" and "ACK1);" and initializes a "level" state variable to 0 (as will be explained in connection with FIG. 11, the "level" state variable is used by the display terminal to determine the type of information it is to expect next).

Figure 10:
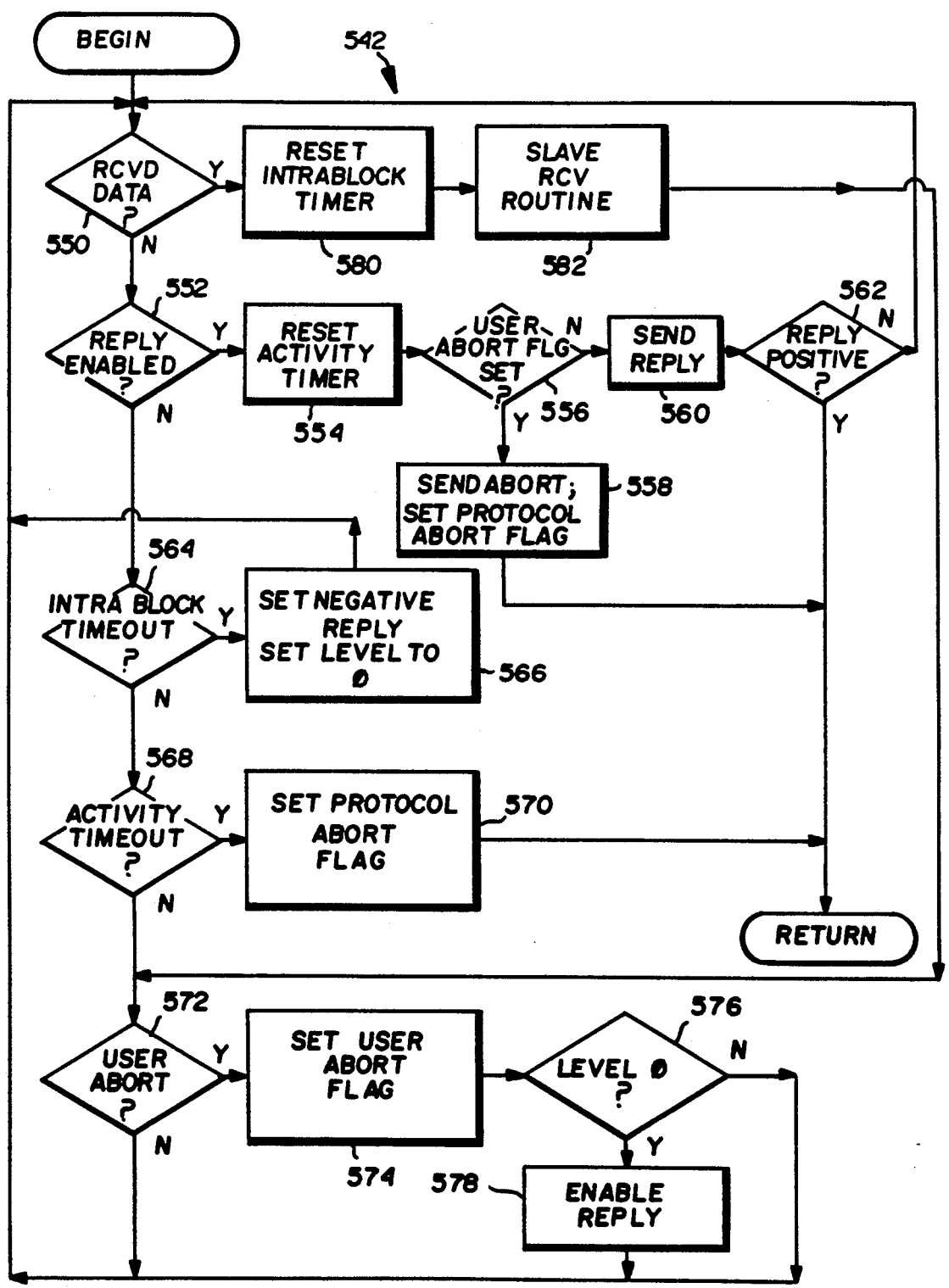
Figure 11A:
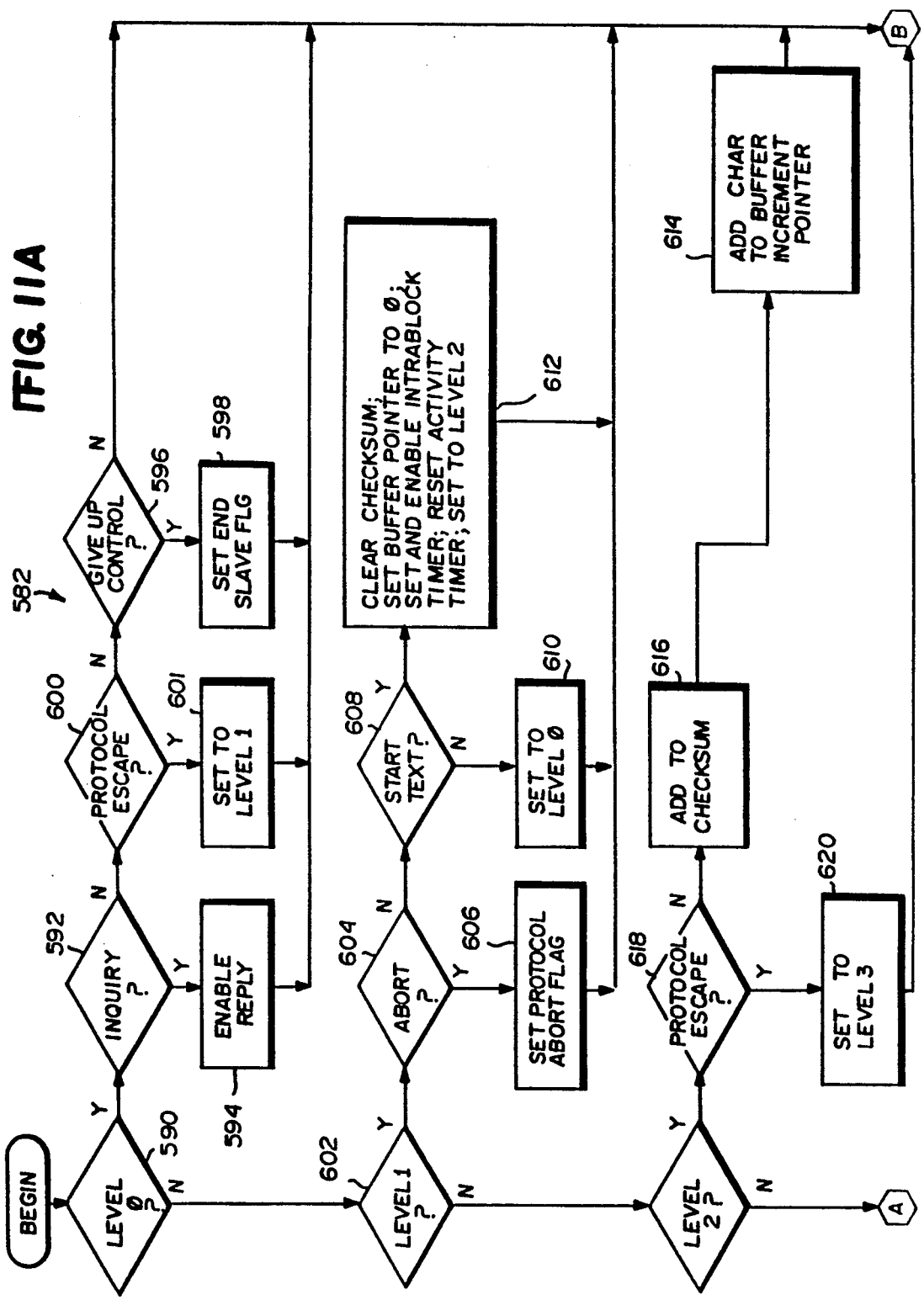

After initialization step been performed, display terminal 300 executes the terminal "slave" select routine 502 shown in greater detail in FIG. 10. In the preferred embodiment, the one of host display terminal 300 receiving image data act as a "slave," while the transmitting unit acts as a "master." When operating as a "slave," display terminal 300 simply receives blocks of digital data, acknowledges receipt of those blocks during periods when host 200 is not transmitting data, and waits for the next block to be transmitted by host 200. In the preferred embodiment, the "slave" mode is entered by display terminal 300 upon receipt of special protocol charactersfrom host 200, and may be exited by the display terminal only under certain circumstances (e.g., an activity time-out, or a positive indication from the host that the display terminal is to return to the asynchronous receive mode). Operating display terminal 300 in the "slave" mode during times host 200 is transmitting image data prevents the display terminal from interrupting the host and also insures that image data transmitted by the host is received by the display terminal.

Referring now more particularly to FIG. 10, display terminal 300 tests whether new data has been received from the host (decision block 550). If no data has been received from the host, then the display terminal determines whether a "reply enable" flag has been set (decision block 552). In the preferred embodiment, display terminal 300 is inhibited from transmitting anything to host 200 during periods when the host is transmitting image data because the display terminal is a "slave" to the host's transmission. In the preferred protocol, however, the display terminal 300 must acknowledges receipt of each and every block of image data transmitted by the host—either with a "positive" acknowledge message indicating correct receipt, or with a "negative" acknowledge message requesting retransmission of the last data block. Accordingly, when display terminal 300 determines that it has correctly (or incorrectly) received a block of image data, it sets this "reply enable" flag to "remind" itself that it must transmit an acknowledge (or not acknowledge) message to host 200 when the host stops transmitting data.

If display terminal 300 determines that its "reply enable" flag is set (decision block 552), it resets the activity timer (block 554) and then determines whether the "user abort" flag has been set. In the preferred embodiment, a user may abort receipt of an image at any time by depressing a keyboard key sequence (e.g., CNTRL-BREAK). However, just as the display terminal will not interrupt host transmissions with an acknowledgement message, the display terminal 300 will also not immediately send a message to the host indicating the user has requested the current image display operation to be aborted, but instead transmits this message after the host has finished transmitting its current data block.

If display terminal 300 determines the "abort" flag has been set (decision block 556), it transmits the abort message and also sets a "protocol abort" flag (block 558) to "remind" itself that it should return to the TTY asynchronous mode of operation. On the other hand, if the user has not requested an "abort", the reply which was "enabled" to be sent is now transmitted to the host (block 560), and is then tested to determine whether it is a "positive" or a "negative" acknowledge message (deccision block 562). If the reply was a "negative" acknowledge message list, ("NAK") control returns to decision block 550 to wait for receipt of the block again when the host 200 retransmits it in response to the negative acknowledge message. If the reply was "positive", on the other hand, control returns to receive image routine 532 shown in FIG. 9. Referring once again to FIG. 9, after return from terminal "slave" select routine 502, display terminal 300 tests whether an "end slave" flag has been set (decision block 544). A set "end slave" flag indicates that the display terminal is to exit the "slave" mode and to return to the TTY mode. Under these circumstances, display terminal 300 transmits an "abort" sequence to host 200 and disables all time-out timers (block 545). If upon returning to routine 532 the display terminal determines that "protocol abort" flag is set (decision block 546), it ceases displaying the graphics screen on monitor 304 (and begins displaying text), and also disables all active timers (block 547). If terminal "slave" routine 542 returns without the "end slave" flag or "protocol abort" flags being set, this indicates that an entire block of image data was correctly received from host 200. This received block is "painted" on the graphics display (via graphics card 318) and displayed on monitor 304 (block 548).

Referring once again to FIG. 10, if no data is correctly being received from host 200 and no reply has been "enabled," display terminal 300 tests whether too much time has passed since it received the beginning of the format block of image data from host 200 (decision block 564). If too much time elapses since the last data block was received, the display terminal 300 assumes it entirely missed receiving the block, sets the "reply and enable" flag to "remind" itself to transmit a negative acknowledge message to the host, and sets the "level" state variable to level 0 (block 566). Display terminal 300 also determines whether it has waited too long to receive the current image (decision block 568). Display terminal 300 autonomously aborts the image receive operation if it has waited too long for receipt of the current image by sending the "protocol abort" flag (block 570) to be tested by FIG. 9 decision block 546.

Finally, if display terminal 300 is not currently receiving data or transmitting a reply and no time-outs have occurred, the display terminal tests whether the user has requested the entire image receipt operation to be "aborted" (e.g., by testing the contents of the keyboard buffer) (decision block 572). If the user has requested an "abort", the "user abort" flag is set (block 574) and reply is enabled if the "level" state variable is set to level 0 (decision block 576; block 578).

If decision block 550 determines that a new block of data is being received, the "intrablock timer" (the value of which is tested by decision block 564 to determine when too much time has passed during reception of the correct of data) is reset (block 580), and display terminal 300 begins executing "slave" receive routine 582.

"Slave" routine 582 (shown in detail in FIGS. 124-128) is a routine performed by display terminal 300 to receive blocks of image data transmitted by host 200. When display terminal 300 first executes routine 582, it operates at level 0 (because the "level" state variable was set to the value 0 at FIG. 9 block 540). Decision block 590 tests the value of this "level" state variable. During level 0 operation, the display terminal awaits receipt of a command from host 200.

Before transmitting image data, host 200 first transmits two special characters: a "protocol escape" character and a "start text" character. Display terminal 200 tests for these two characters before treating any received data as image data. Since the probability that display terminal 300 would mistake line noises for these two successive special characters is extremely small, it is highly unlikely that the display terminal will ever be "fooled" into erroneously treating noise or other characters as image data.

Besides the "protocol escape" and "start text" special characters, host 200 may also transmit other special characters to display terminal 300. For example, the host may transmit an "inquiry" special character to the display terminal to request a reply. In addition, the host may instruct the display terminal 300 to cease operating in the "slave" mode and to return to the TTY mode.

During operation in level 0, display terminal 300 simply waits for receipt of one of the special characters transmitted by host 200. If the display terminal receives the "inquiry" special character (decision block 592), it sets the "reply and enable" flag to reply to the host's "inquiry". If the display terminal receives the host instruction to cease operating as a "slave" (decision block 596), the "end slave" flag is set (block 598) (the value of this flag is tested for by FIG. 9, decision block 544). If the display terminal receives the special "protocol escape" character during operation in level 0 (tested for by decision block 600), it begins operating at level 1 to await receipt of the special "start text" character.

Decision block 602 causes display terminal 300 to operate at level 1. During operation at level 1, the display terminal awaits receipt of the "start text" character—which precedes all host image data block transmissions. If an "abort" condition is detected during operation in level 1 (as tested for by decision block 604), the "protocol abort" flag is set to later cause the display terminal to return to TTY operation (block 606). If the next character received from host 200 is not the special "start text" character (tested for by decision block 608), display terminal 300 returns to level 0 to await further commands issued by the host (block 610). If the "start text" character is received, on the other hand, display terminal 300 prepares for receipt of a block of image data by clearing previously calculated checksum information; initializing a pointer into a block data buffer preserved in RAM 314; setting and enabling the timer used to determine how much time has elapsed since receipt of the initial portion of the current data block; resetting the activity timer; and forcing the display terminal to begin operating in level 2 (block 612).

During operation in level 2, display terminal 300 receives image data characters from host 200 and stores them in its buffer (block 614). In addition, display terminal 300 calculates a running checksum of received characters for purposes of determining whether the block was correctly received (block 616). Display terminal 300 will continue to operate in level 2 until it receives a special "protocol escape" character from the host (as tested for by decision block 618), prompting the display terminal to begin operating in level 3 (block 620).

In level 3 operation, display terminal 300 tests for possible receipt of a special "end of text" character indicating end of transmission of the current block (decision block 628). Characters received during level 3 operation are checked to determine whether they are "abort" characters (decision block 622)—such characters prompting the display terminal to set its "protocol abort" flag (block 624). Characters which are not "abort" characters are added to the running checksum (block 626) and then tested to determine whether they are the special "end of text" character (decision block 628).

Received "end of text" characters cause display terminal 300 to "disable" intrablock time-outs and to begin operating in level 4 (block 630). Since level 4 operation is used to receive checksum data which is appended by host 200 to each transmitted image data block, display terminal 300 ceases its block time-out operations to give the host time to calculate the checksum data (in some host arrangements, it may be desirable to transmit an entire block of data, and only then calculate and transmit checksum data, as opposed to first calculating checksum and then transmitting the data block with appended checksum data).

If the character received during level 3 operation is not the "end of text" character, display terminal 300 determines whether the character is the "protocol escape" character (decision block 632). A "protocol escape" character is added to the buffer (permitting image data to contain "protocol escape" characters)—but only if the host transmits two successive "protocol escape" characters for each "protocol escape" character embedded in the image data (block 634). That is, the first "protocol escape" character causes the host 200 to enter "level 3" operation—and the second "protocol escape" character is stored in the receive data buffer and causes the host to return to "level 2" operation. Display terminal 300 finally returns to level 2 operation whenever it receives any character other than an "abort" or "end of text" character during level 3 operation (blocks 636, 638).

Display terminal 300 receives a first checksum character during level 4 operation (i.e., after receipt of an "end of text" character). This first checksum character is stored (block 640), and the display terminal then operates in level 5 to receive and store the second checksum character (block 642). In the preferred embodiment, the host 200 transmits a 2-byte checksum field calculated using conventional CRC algorithms (although other conventional error checking algorithms would also be suitable). When display terminal has received and stored both bytes of the checksum field, it compares those bytes with the running checksum it has calculated (i.e., in blocks 616 and 626) (block 644). A checksum error causes display terminal 300 to transmit a "no acknowledge" (NAK) reply, while a positive checksum result prompts the display terminal to send a positive acknowledgement message to the host.

Since the display terminal 300 is still operating in the "slave" mode at the point it receives and analyzed checksum data, it simply "enables" an appropriate reply (either positive or negative acknowledge) (blocks 646, 648). If a positive reply is to be sent, the "positive reply" toggle is "toggled" so that the next positive reply has an alternate value (block 648). That is, if display terminal 300 acknowledges correct receipt of the last-transmitted image data block with acknowledgement message "ACK0," then the "positive reply" toggle is "toggled" to 1 so that correct receipt of the next-transmitted data block will be acknowledged with the positive acknowledgement message "ACK1"—and vice versa. Alternating-valued acknowledgement messages are used in the preferred embodiment because host 200 typically begins transmitting a block of data before it has even received an acknowledgement message relating to the previously transmitted data block. The transmitting host uses the alternating-valued acknowledgement messages to "match-up" acknowledgement messages with transmitted data blocks.

Block 642 resets the "level" state variable to level 0—causing the display terminal to expect a special character to be received next.

HOST COMMUNICATIONS ROUTINE

Figure 12B:
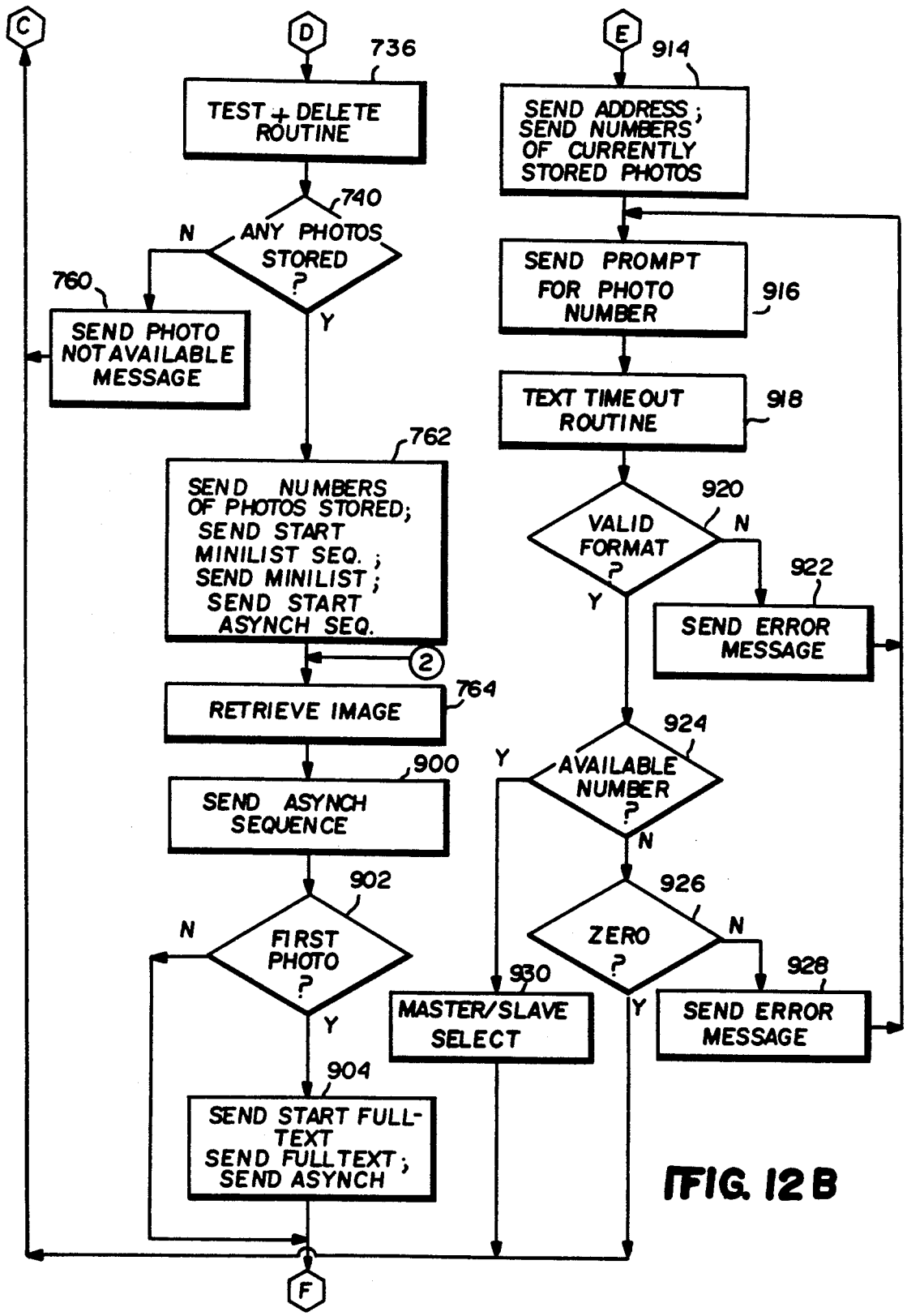
Figure 12C:
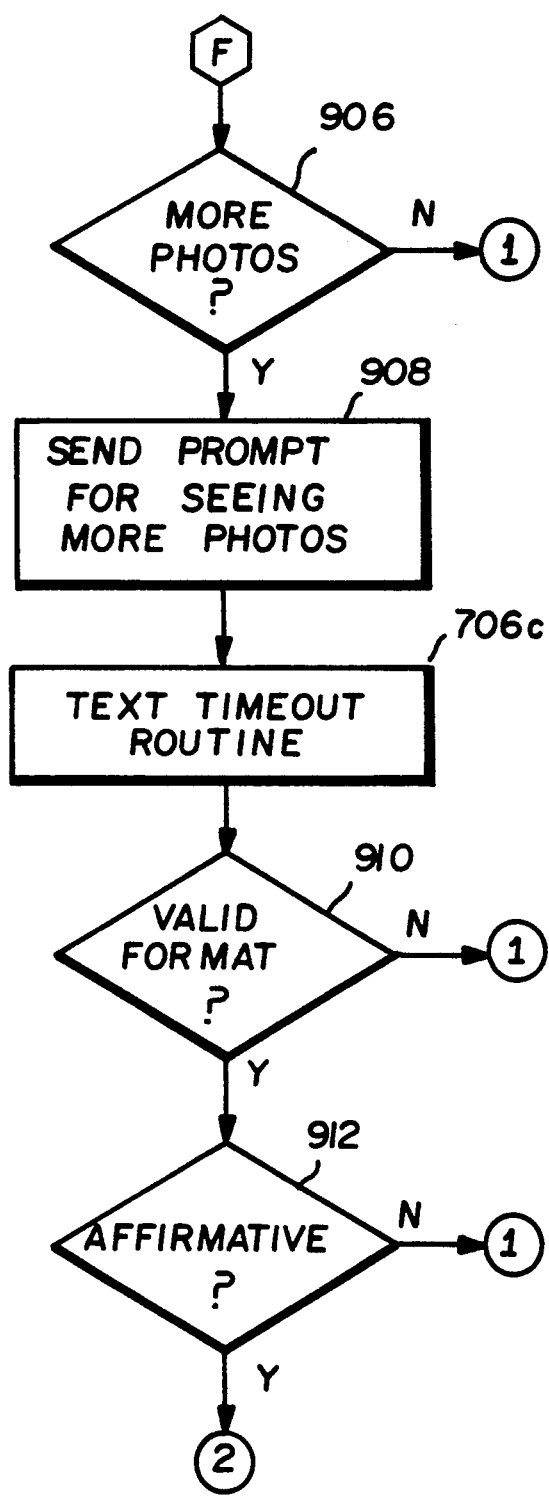

FIGS. 13-21 are detailed schematic flow charts of steps performed by host 200 to retrieve, delete and/or store images in response to user input. FIGS. 12A-12C is a flow chart of the overall image management routine "PHOTO-FILE" executed by host 200 in response to user input command "SPH," "PHO or "DPH." This routine first decodes the user input command, and sets a flag to indicate whether the user has requested an image to be added, deleted, or retrieved (block 702). Next, the host transmits to display terminal 300 a request for identification (block 704) and waits to receive a response. A text time-out routine (block 706) insures that a response is received from display terminal 300 within a reasonable time period.

Figure 14:
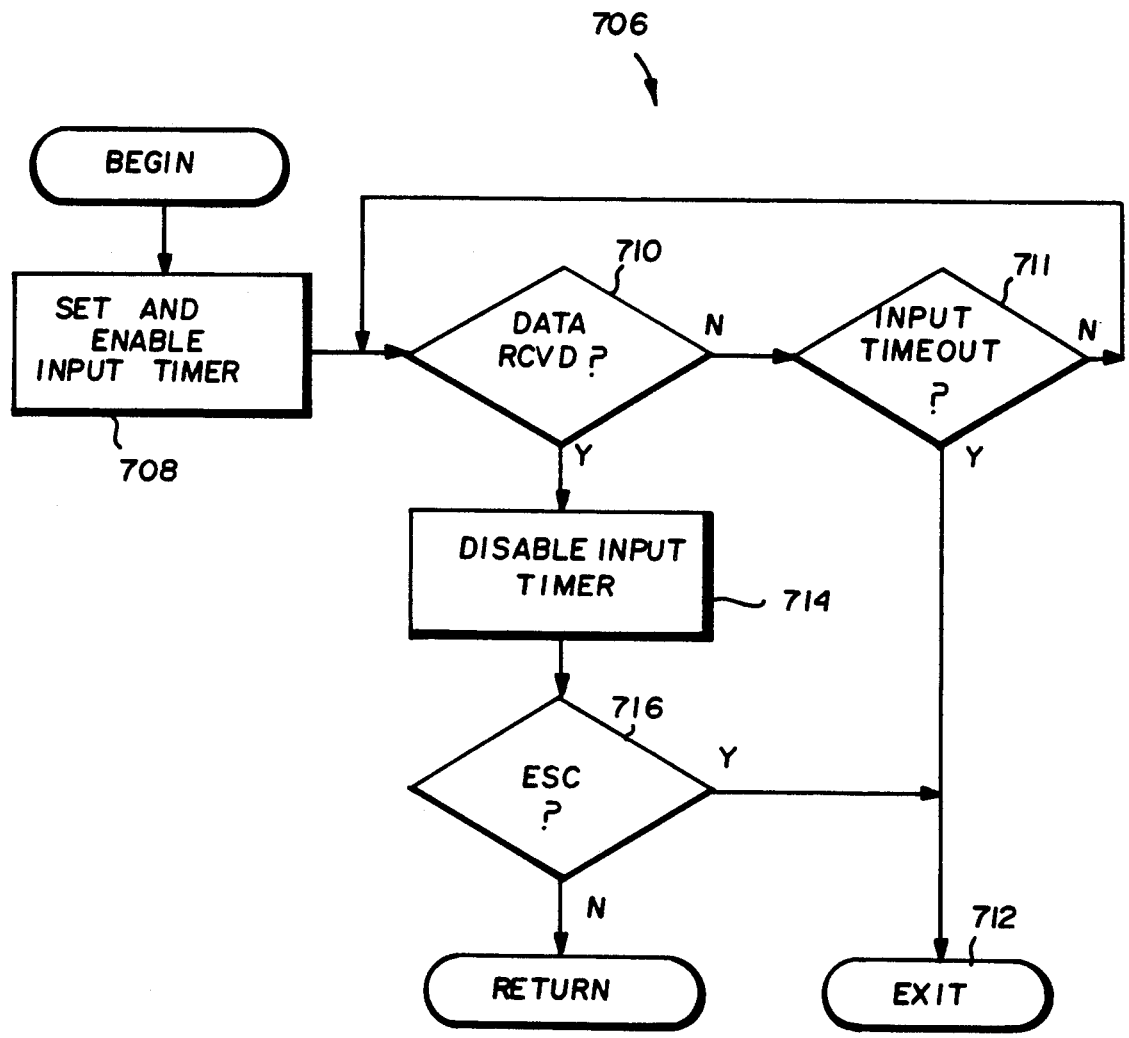

FIG. 14 is a flow chart of text time-out routine 706. The text time-out routine is interrupted-driven in the preferred embodiment, but is shown explicitly in the sequential flow chart for purposes of clarity. Text time-out routine 706 sets and enables an input timer (block 708), and then awaits receipt of data from display terminal 300 (decision block 710). If the time period being timed by input timer block 708 expires before data is received (as tested for by decision block 710), the management routine 700 is exited (block 710). If data is received before this timer "times out," the input timer is "disabled" (block 714) and the received data is tested to determine whether it is a display terminal "escape" sequence (block 716). The display terminal user indicates he wishes to discontinue image processing by entering this display terminal sequence—and time-out routine 706 accordingly exits management routine 700 in response to this "escape" sequence. If the received data is not the "escape" sequence, time-out routine 706 returns to the routine which called it (in this case, to execute decision block 718 shown in FIG. 12).

Decision block 718 shown in FIG. 12 determines whether the received display terminal identification requested by block 704 is valid for the requested function. For example, some display terminals 300 may be authorized to "retrieve" images, but not to store or delete images. Other display terminals may have authority to "delete or retrieve" images, but have no "capture" capabilities. Still other display terminals 300 may not have any graphics capabilities, and therefore are completely denied access to image management routine 700. If decision block 718 determines a requesting display terminal does not have authority or capability to perform the image function it has requested, the routine transmits an error message and exits back to the "SIGNON" task (block 720).

If the received data terminal identification is valid for the requested image function, a message confirming the requested function is transmitted to the display terminal (block 722) followed by a prompt for real estate property listing number (block 724). Time-out routine 706 is then executed again, and when a response to the listing number prompt has been received from the display terminal, it is checked for valid format (block 726) and an error message is sent if the received format is invalid (block 728). Host 200 then cross-checks the listing number in the MLS listing database to determine whether a listing for the inputted listing number exists (decision block 730). If no listing number exists, an error message to that effect is transmitted to display terminal 300 (block 732) and the user is "prompted" for a new listing number (block 724).

Assuming that the listing number inputted by the user is valid and corresponds to a property that is listed for sale, host 200 branches to different sections of management routine 700 depending upon the function the user has requested. Decision block 734 first determines whether the user has requested an "add" (store) of a new photo to the image database. If the user has not requested a photo to be added, test and delete routine 736 is executed to determine whether the user has requested a photo to be "deleted" and to delete a photo in response to such request. A flow chart of the test and delete routine 736 is shown in FIG. 13.

Figure 13:
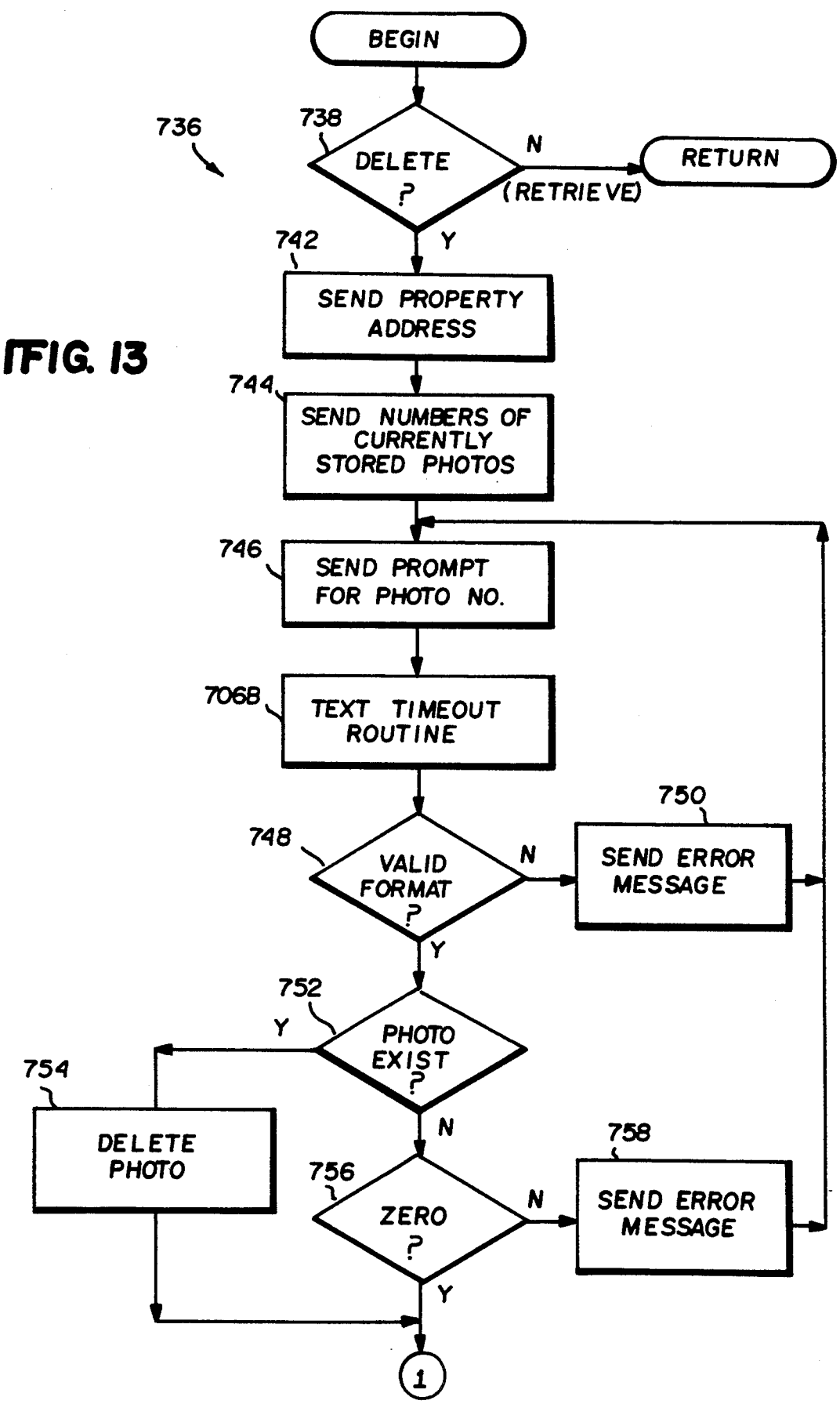

Referring now to FIG. 13, decision block 738 tests whether the user has requested the "delete" function (if delete has not been requested, control returns to decision block 740 shown in FIG. 12 since the user has requested a "retrieve"). If a "delete" has been requested, host 200 sends to display terminal 300 the geographical address of the property corresponding to the inputted listing number (block 742) along with the numbers designating photos in the database corresponding to that listing. In the preferred embodiment, up to sixteen photos can be stored for any one property listing. In addition, the preferred embodiment designates photos at the time they are stored in accordance with user preferences. For example, a user may decide to designate three images he stores in connection with a particular property listing as photo number 1, photo number 3 and photo number 4. In the preferred embodiment, there is no requirement to store photo number 2 before storing photo number 3. Images are retrieved in the order of their numerical designations, not in the order they were stored. This feature of the preferred embodiment adds flexibility as will be appreciated.

Routine 736 then sends a "prompt" requesting the user to input the photo number he wishes to "delete" (block 746), and executes "time-out" routine 706 while waiting to receive the user response. If the user response has an invalid format (as tested for by decision block 748), host 200 transmits an error message to the display terminal (block 750) and retransmits the photo number "prompt" (block 746). If the format is valid, it is determined whether the photo requested to be deleted exists (decision block 752). If the photo exists, it is deleted (block 754) by requesting photo file manager module 731 to delete the corresponding image file. If the photo requested by the user to be deleted does not exist, then it is determined whether the user inputted the number 0 (indicating that he made a mistake and he does not wish to delete a photo after all) (decision block 756). If the number 0 was inputted, control returns to block 724 in FIG. 12 to "prompt" for a new listing number. If the user did not input a zero, an error message is transmitted to the display terminal (block 758) and the user is "prompted" for a new photo number (block 746).

If decision block 734 determines the user has not requested a new image to be "stored" and decision block 738 determines the user has also not requested "deletion" of an image file, then the user must have requested "retrieval" of an image—and decision block 740 shown in FIG. 12 determines whether any images have been stored in connection with the user-inputted listing number. If no such images have been stored, host 200 transmits an error message to that effect to display terminal 300 (block 760). On the other hand, if there are images stored in connection with the inputted listing number, host 200 transmits the numbers of the stored photos, and then performs the steps required to transmit the "mini-list" (i.e., sends a special character sequence indicating the start of the "mini-list", sends the actual text of the "mini-list", and then sends another special character sequence requiring the receiving display terminal 300 to return to the TTY asynchronous terminal mode (block 762)). Routine 764 is then executed to "retrieve" an image from a file stored on disk 206 and to transmit digital data signals representing the image to display terminal 300 for display. A detailed flow chart of the host retrieve image routine 764 is shown in FIG. 15.

Figure 15:
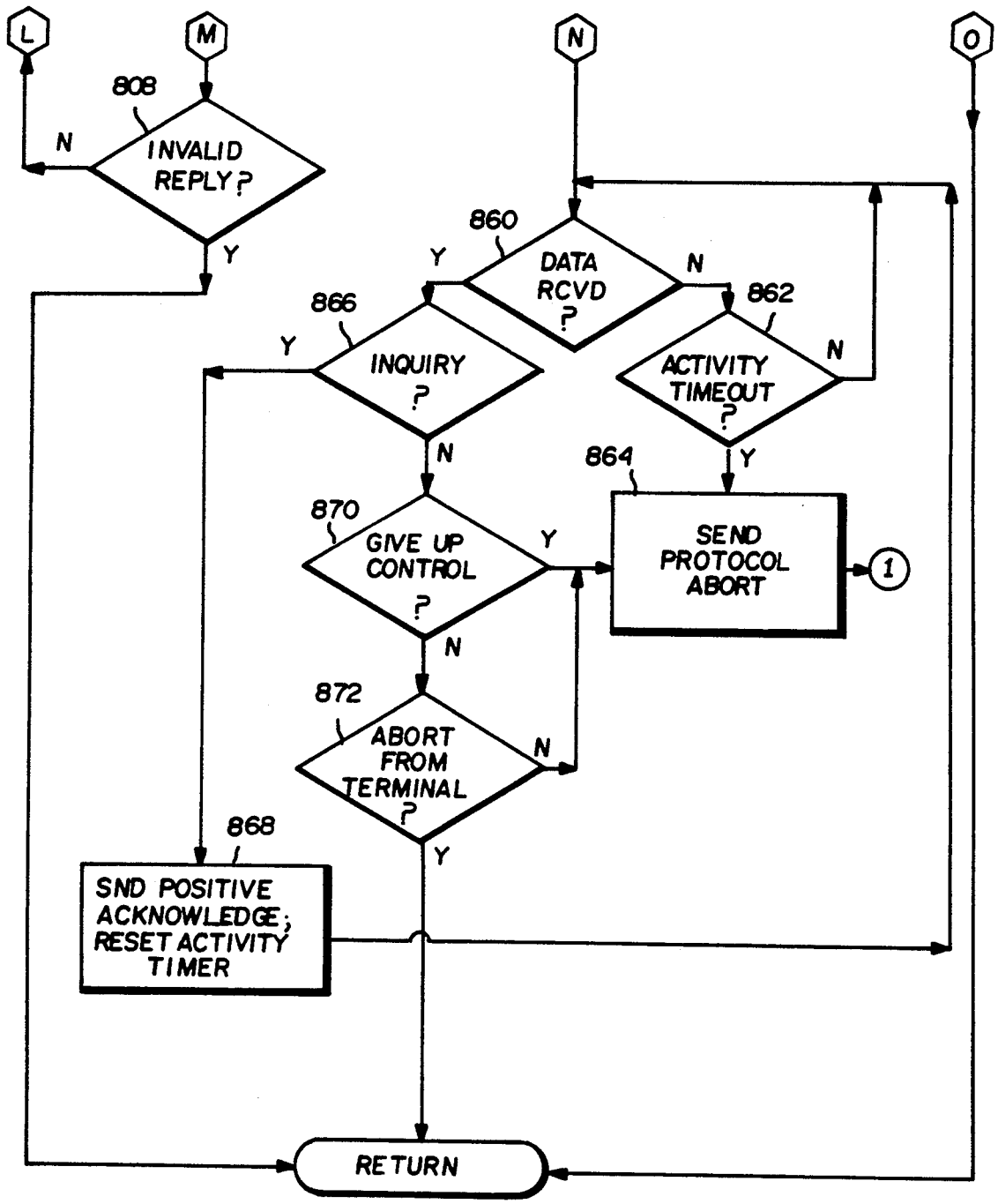

Referring now to FIG. 15, host 200 "retrieves" a photo from its image file database by providing file manager module 231 with the index key associated with the file (i.e., listing number and photo number) and then waiting for the file manager to return a send block containing the contents of the image file. If this retrieve operation is not successful (tested for by decision block 782), host 200 sends an error message to that effect to display terminal 300 (block 784). If the retrieve operation was a success, on the other hand, host 200 transmits start photo sequence character(s) to display terminal 300, sets an activity timer and a retry counter, and begins operating as a "master" in the blocked image data transmission protocol discussed previously in connection with the operation of the display terminal (block 786). As will be explained, the retry counter is used by host 200 to control the number of times it will retry transmission of a block of digital data before giving up.

Host 200 then transmits an "inquiry" to display terminal 300 (block 788), exits back to host image management routine 700 if it has already retried transmission of the current digital data block a predetermined number of times (e g., five in the preferred embodiment), (decision block 790) and executes a response time-out routine 792 while waiting for a response from display terminal 300.

Figure 17:
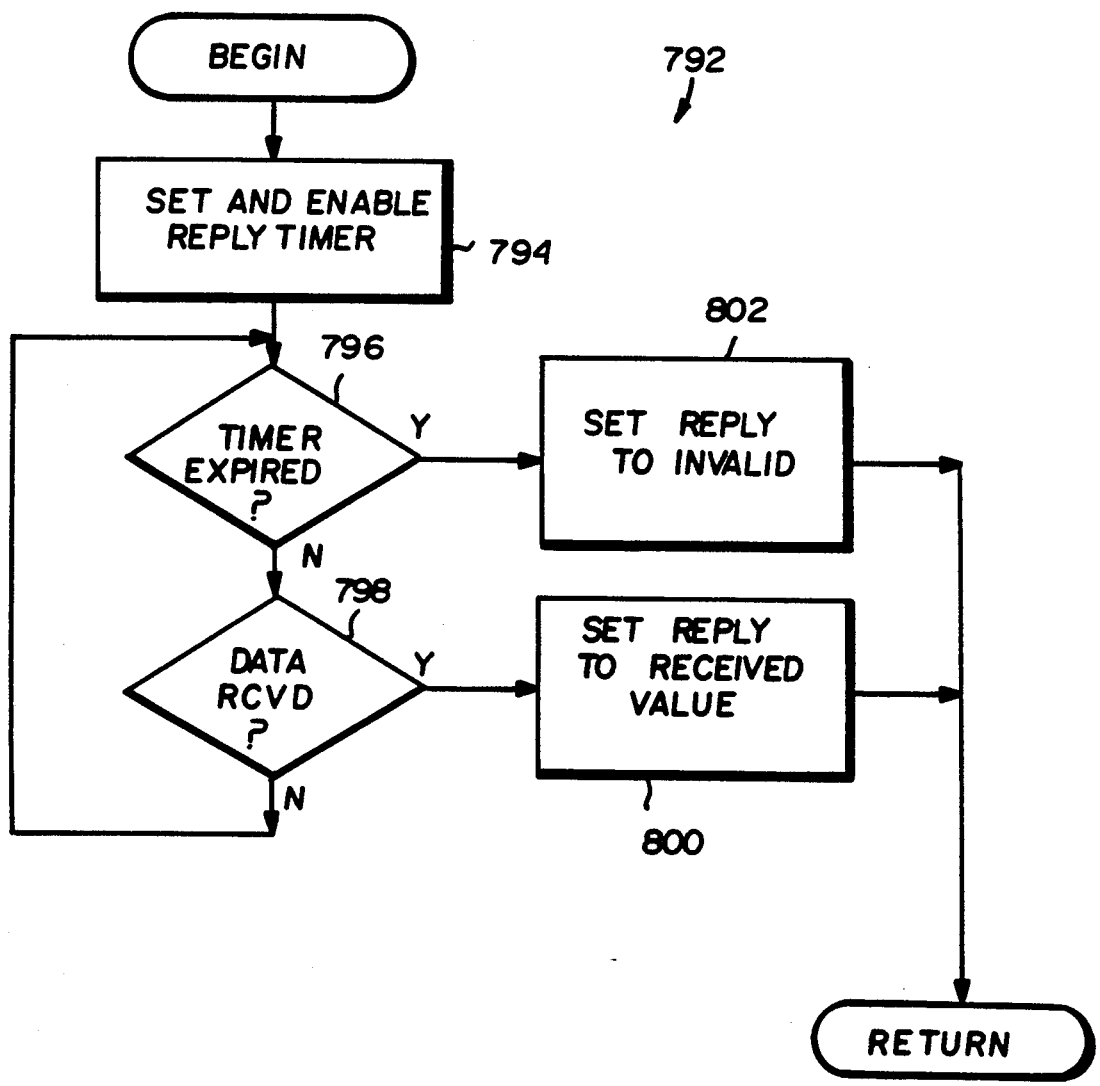

FIG. 17 is a flow chart of response time-out routine 792. This time-out routine simply waits a maximum predetermined time period to receive a response from a display terminal (blocks 794, 796, 798), accepts the received value as the reply (block 800) and sets the reply to an invalid state if no data is received from display terminal 300 within a predetermined time period (block 802).

Referring once again to FIG. 15, if the reply received from the display terminal was not the positive (decision block 804), the retry counter is decremented (block 806) and control is returned to block 788 to send the "inquiry" once again so long as the reply is not invalid (i.e., so long as the display terminal returned some reply which was received by the host) (block 808). If block 802 shown in FIG. 17 sets the reply to an invalid value upon not receiving any response at all from the display terminal within the time-out period, on the other hand, routine 764 is exited and control returns to routine 700.

If a positive reply was received (decision block 804), it is determined whether any more image data for the current image remains to be transmitted (decision block 810). If more image data remains, a block of data is moved from the dynamic memory area received from file manager 231 to a temporary transmit buffer (out of which data is transmitted to display terminal 300) (block 812), and that block is then transmitted out of the buffer to the display terminal (block 814). Transmit image routine 814 is shown in detail in FIG. 16.

Figure 16:
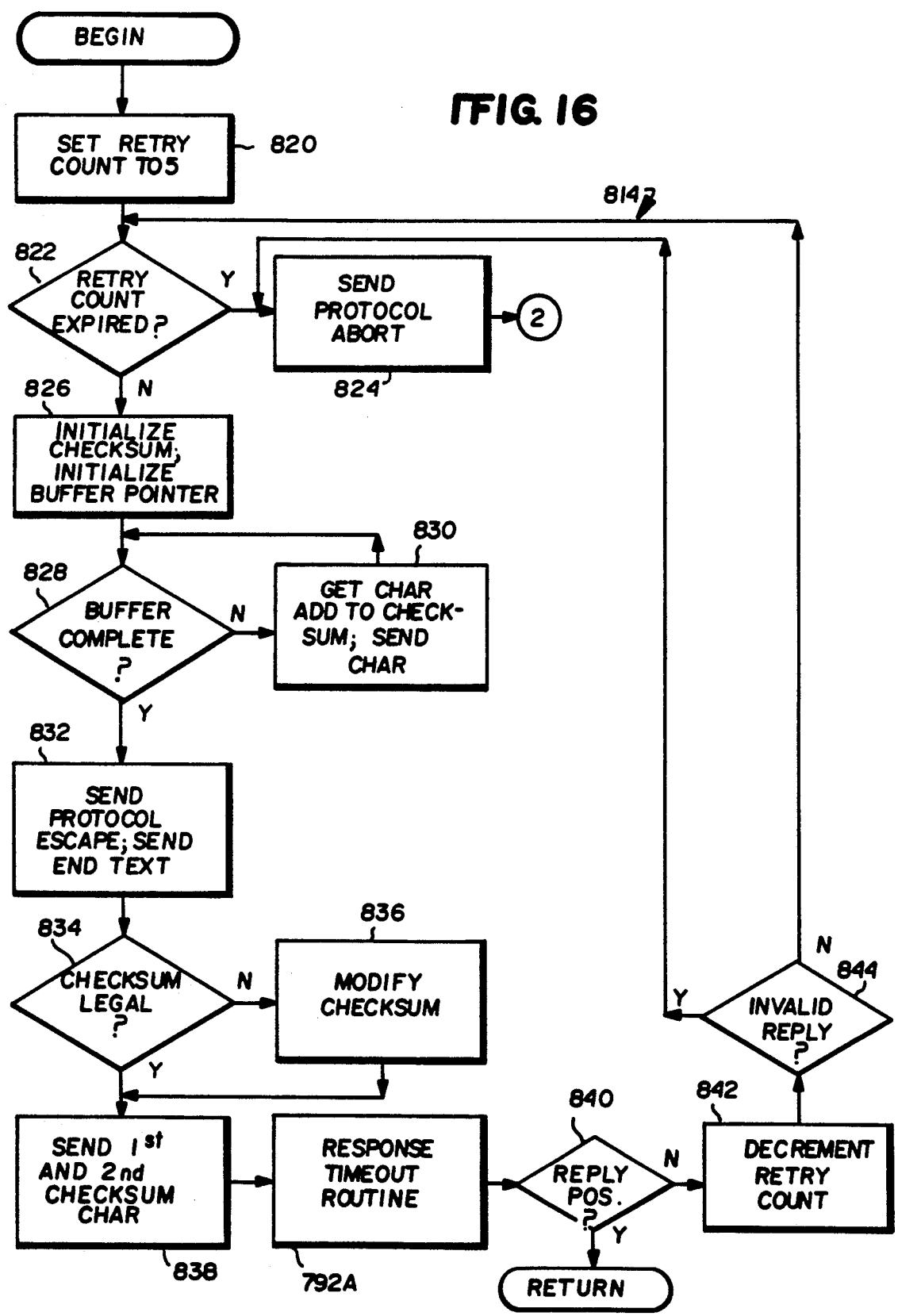

Referring now to FIG. 16, to transmit a block of image data to display terminal 300, the retry counter is first initialized to five (to permit the host to retry transmitting the same block of data a maximum of five times) (block 820). The retry counter is then tested to determined whether it has been decremented to 0 (decision block 822), and if too many retrys have occurred, a "protocol abort" character is transmitted to the display terminal 300 to cause the display terminal to exit the blocked data receive mode and return to the TTY mode (block 824). If too many retrys have not yet occurred, a running checksum counter and a buffer point are initialized (block 826), and data is then transmitted one character at a time from the buffer to the display terminal until all characters of the block have been transmitted (decision block 828; block 830). In the preferred embodiment, a running checksum is calculated as characters are transmitted (block 830). When the entire block (up to 2048 bytes in the preferred embodiment) have been transmitted, host 200 transmits a "protocol escape" character and an "end of text" character to indicate to the display terminal that block transmission is complete (block 832).

The running checksum value is then tested to determine whether it is a "legal" value (decision block 834), and modified to make it a "legal" value if necessary (block 836). It has been found that equipment commonly found on conventional dial-up lines (e.g., error correcting modems, data multiplexers, and the like) may improperly respond to certain special characters which would normally be transmitted as part of the ANSI X 3.28 protocol. In particular, much of this equipment looks at the low-order six bits of each and every byte which is transmitted, and if it recognizes any such character as would fall within the range of hex 00 to hex 1F, such equipment commonly responds to the byte as if it were a special "protocol" character. Depending upon the equipment involved, unexpected or undesirable results may be obtained. For example, some equipment simply treats such characters falling within this range as control character intended for it and does not even pass the characters on. Other equipment may repeat the character (i.e., insert an extra, duplicate character immediately following retransmission of the first).

For example, it has been found that the standard "data escape" character called for by the standard ANSI X 3.28 protocol is repeated in this manner by data multiplexers commonly found on dial-up lines. If host 200 were to transmit a single "data escape" character, the first multiplexer on the line might repeat the character (to place two "data escape" characters in the serial bit stream at the point where the host transmitted only one), and other multiplexers down the line typically would do the same. The result was found to be that single "data escape" characters transmitted by host 200 would cause display terminal 300 to received many such (even hundreds of) "data escape" characters.

To make the blocked data protocol of the preferred embodiment compatible with standard dial-up line equipment, host 200 never transmits a byte having a hex value within the range of 00 to 1F in its lowest order six bits. Sometimes, however, checksum values may fall within this range. To avoid confusing dial-up line multiplexer and other equipment, any checksum value which does fall within this "illegal" $00_{hex}$–$1F_{hex}$ range is modified by ORing it with octal value 100 (e.g., adding a logic level 1 in the 64th bit place) to prevent the value from falling within this "illegal" range.

After modifying the checksum as necessary, host 200 transmits both bytes of the running checksum (block 838) and executes response time-out routine 792 to wait for an acknowledge from display terminal 300. If display terminal 300 transmits a negative acknowledge message in response to receipt of the just-transmitted block (as tested by decision 840), the block is retransmitted by routine 814 (after determining that the block has not already been retransmitted five or more times and that a valid but negative reply was in fact received from the display terminal) (blocks 842, 844, 822). If display terminal 300 positively acknowledges receipt of the just-transmitted block, control returns to routine 764, decision block 810 (FIG. 15) to determine whether additional image data remains to be transmitted. If more image data remains, the next block of data is moved into the transmit buffer (block 812) and routine 814 is executed to transmit that block of data.

When no more image data remains, host 200 sends a special character to display terminal 300 making the display terminal the "master" and then itself becomes the "slave" (block 850). In the preferred embodiment, host 200 acts as the "master" and thus controls the operation of the display terminal "slave" during the entire time image data is being transmitted from the host to the display terminal. As "master," host 200 transmits blocks of data and is not interrupted by display terminal transmissions, since the display terminal (as "slave") can only transmit during times when the host is not transmitting—and even then is capable of transmitting only a very limited repertoire of responses to host transmissions, (e.g., "NAK," "AK0," "AK1" or "abort"). After an entire block has been transmitted, however, host 200 in the preferred embodiment sends a special "escape" sequence which causes display terminal 300 to operate as the "master" and then itself becomes "slave." The reason for this is to give display terminal 300 the opportunity to positively recognize that host 200 considers itself to have transmitted an entire, complete and "good" image to the display terminal without requiring the use of any other special characters to signify end of image transmission.

After becoming "slave," host 200 simply waits to receive data from display terminal 300—without executing any of the time-out routines since the host is now acting as a "slave" but conditioning receipt of a command from the terminal on falling within the activity time-out period (decision blocks 860, 862). If no response has been received within the activity time-out period, a "protocol abort" character is transmitted to the display terminal and routine 764 is exited (block 864). If data is received from the display terminal, it is tested to determine whether it is an "inquiry" (the data the host expects to receive from the display terminal upon correct receipt of an image) (decision block 866). If an "inquiry" is received, host 200 transmits a positive acknowledgement message, resets an activity timer, remains the "slave" and awaits further data to be transmitted by the display terminal (block 868; decision block 860). If the received data is not an "inquiry," then host 200 determines whether the received data indicates the display terminal has given up control to make the host the "master" once again (block 870). If the display terminal has given up control, host 200 transmits the "protocol abort" character (block 864) and exits to routine 700. If the received data is neither an "inquiry" nor the "give-up control" escape sequence, then host 200 determines whether the received character is an "abort" (decision block 872). The terminal "abort" character causes host 200 to transmit a responsive "protocol abort" character (block 864).

Referring now once again to FIG. 12, after host 200 "retrieves" and transmits an entire image (block 764), it transmits the "asynchronous escape" sequence which causes display terminal 300 to return to the asynchronous TTY mode (block 900), and then determines whether the image it just transmitted was for the first photo (decision block 902). In the preferred embodiment, display of the first (but not later) photos on the display terminal graphics screen is followed by display of the full text MLS listing on the display terminal conversational screen. Accordingly, after transmission of the first image, host 200 transmits the full text listing (block 904). Host 200 then determines whether additional photos corresponding to the listing exists (decision block 906). If additional photos do exist, the host "prompts" the user for the number of an additional photo (block 908), executes time-out routine 706 while waiting for a response, and then after determining the response is in valid format, tests the response to determine if the user has requested display of an additional image (decision blocks 910, 912). If the user has requested display of an additional image, retrieve image routine 764 is executed once again. If the user does not request display of another image, the host transmits the listing number prompt (block 724).

In the preferred embodiment, a user may "add" images to the image file database on an interactive basis. If the user requests storage of an image (as tested for by FIG. 12 decision block 734), host 200 transmits the geographical address of the property corresponding to the inputted listing number for verification by the user along with the numbers of currently stored photos (block 914). The property address is transmitted to permit the user to verify the address corresponding to the property (since nine digit listing numbers are often confused, but street addresses are more difficult to confuse and are more easily understandable by users). Host 200 then transmits a "prompt" for the photo number to be "added" (in the preferred embodiment, the user may "add" photos to the database in any desired order), and then waits for and validates the response (blocks 916, 918). A zero response allows the user to "abort" the operation and causes host 200 to transmit the listing number prompt again (blocks 926, 928, 724). If the user has responded with an available photo number, however, host 200 executes the "master/slave" select routine (block 930) to capture the transmitted image.

Figure 18:
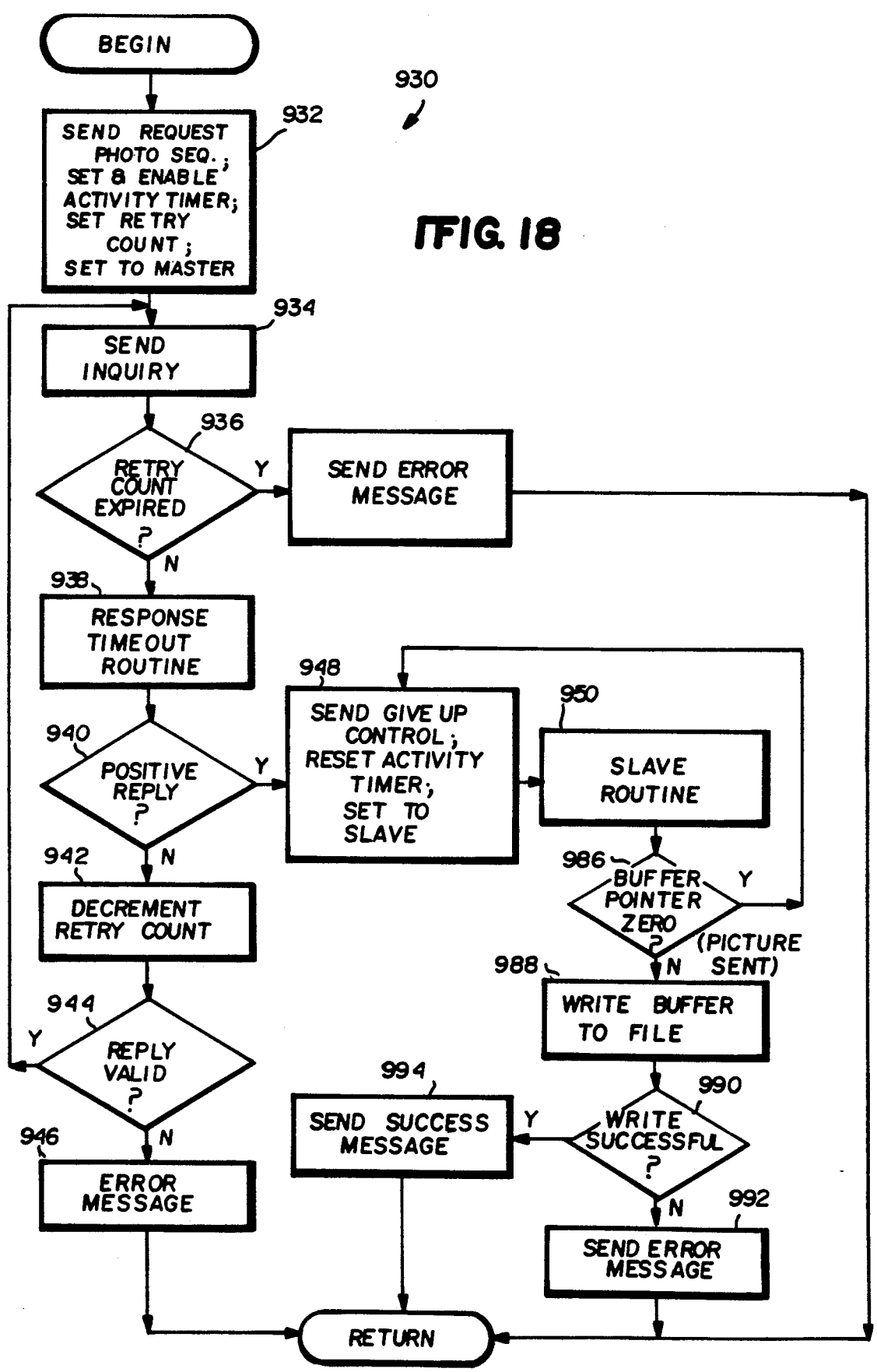

A detailed flow chart of the "master/slave" select routine 930 is shown in FIG. 18. In the preferred embodiment, host 200 becomes "slave" during receipt of image data being transmitted by display terminal 300. "Master/slave" select routine 930 causes host 200 to begin operating in the "slave" mode. Host 200 first transmits a requests for photo sequence, sets and enables the activity timer, initializes the retry counter, enters the "master" mode and then transmits an "inquiry" to display terminal 300 (blocks 932, 934). "Inquiries" are repeatedly transmitted until a positive response is received or until the retry counter has been decremented to zero at which time the host "gives-up" and returns to image management routine 700 (blocks 936–946). If the host finally receives a positive, valid reply to its "inquiry" (as tested for by decision block 940), it transmits a special "escape" sequence to the display terminal 300 indicating to the display terminal that the host is entering the "slave" mode and that the display terminal is to begin operating as "master" (block 948). Host 200 then begins executing "slave" routine 950—during which operation it receives image data transmitted by the display terminal.

Figure 19:
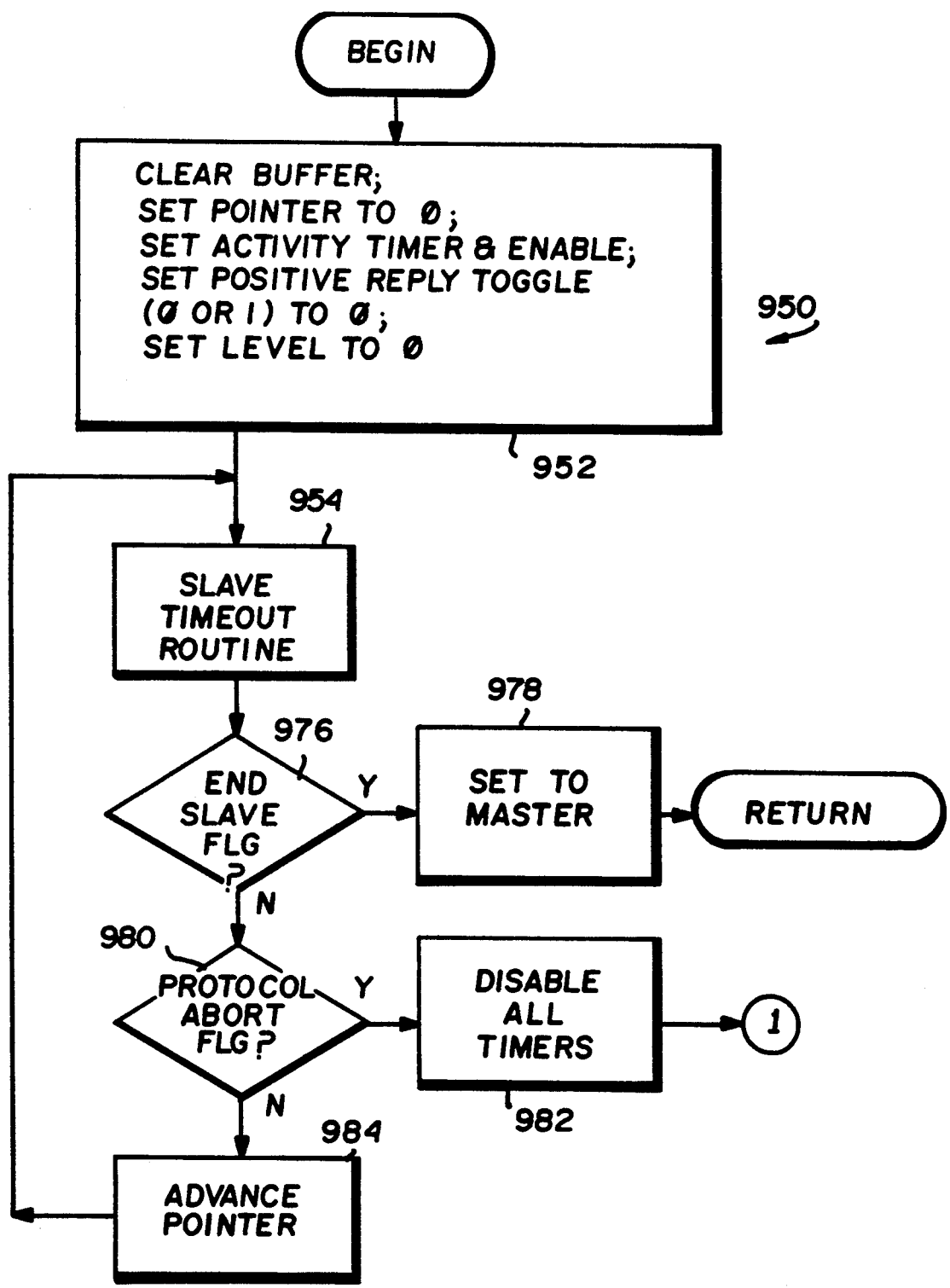

A detailed flow chart of "slave" routine 950 is shown in FIG. 19. After initializing a receive buffer and associated buffer pointer, activity timer, positive reply "toggle" and "level" state variable (block 952), host 200 executes a "slave" time-out routine 954 to insure that it does not remain a "slave" for a long period of time during which the display terminal fails to transmit data.

Figure 20:
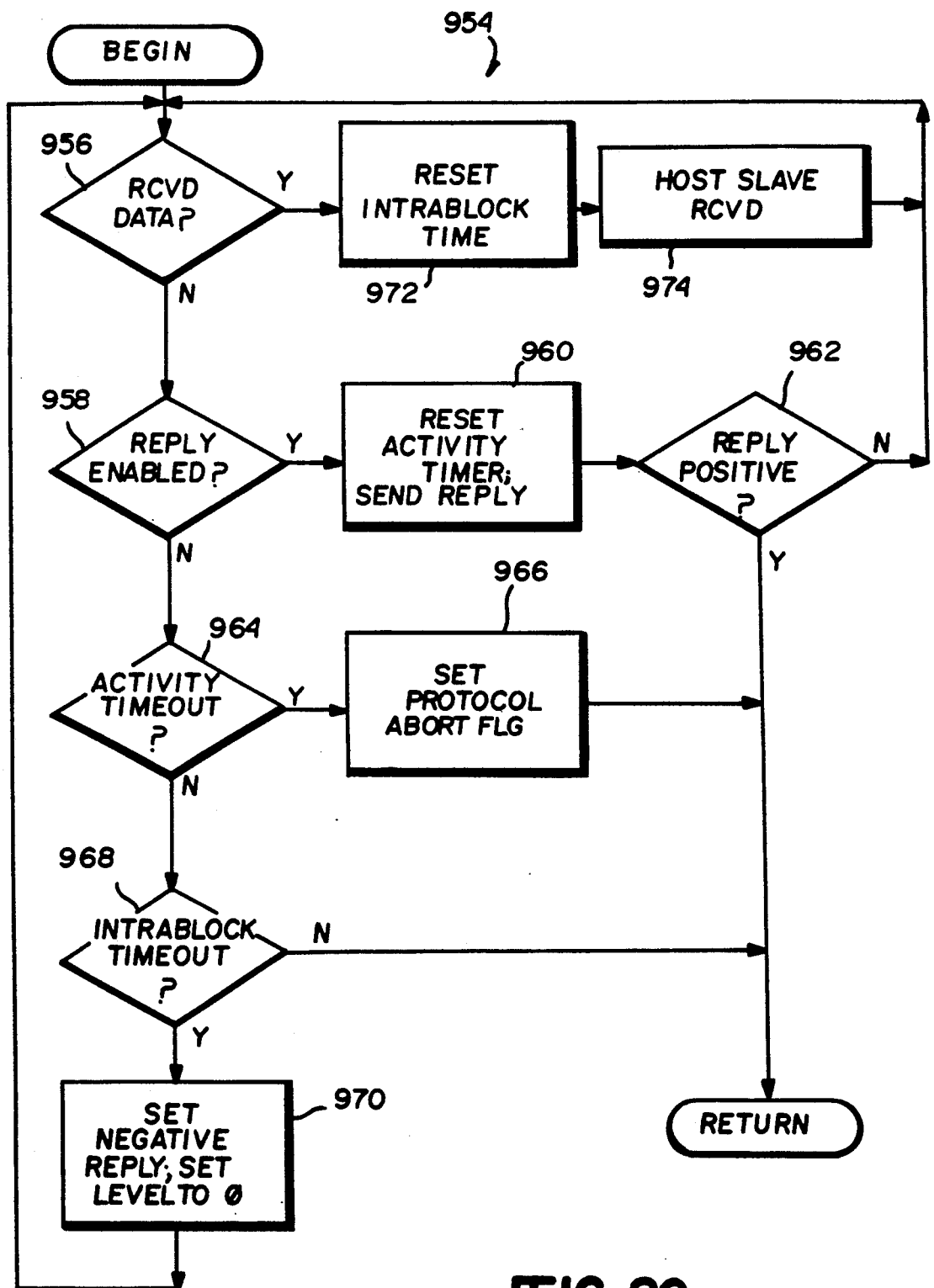

A flow chart of the "slave" time-out routine 754 is shown in FIG. 20. If data is not received from the display terminal (as tested for by decision block 956), host 200 determines whether it has "enabled" a reply (block 958) (just as discussed in connection with display terminal, when acting as "slave" the host can only transmit characters to the "master" display terminal during times when the display terminal is not actually transmitting data). If a reply is "enabled," the host transmits the reply (block 960) and, if the reply is not positively acknowledged (as tested for by decision block 962), retransmits the reply until either the reply is positively acknowledge or until the activity time-out period has expired (as tested for by decision block 964). If the activity time-out period expires (indicating that host 200 has not received any data from the display terminal for more than a predetermined activity time-out period), the "protocol abort" flag is set to cause the host to transmit an "abort" character to the display terminal at the next available opportunity (block 966). Host 200 also keeps track of how long it has waited to receive the current data block and if a corresponding time-out period expires, it "gives up" receiving the block and transmits a negative acknowledge message to the display terminal to force the display terminal to retransmit the block (decision block 968; block 970).

When data is finally received from display terminal 300, host 200 resets the "intrablock" timer (block 972) and then executes the host "slave" routine (block 974) to actually receive the image data.

Figure 21A:
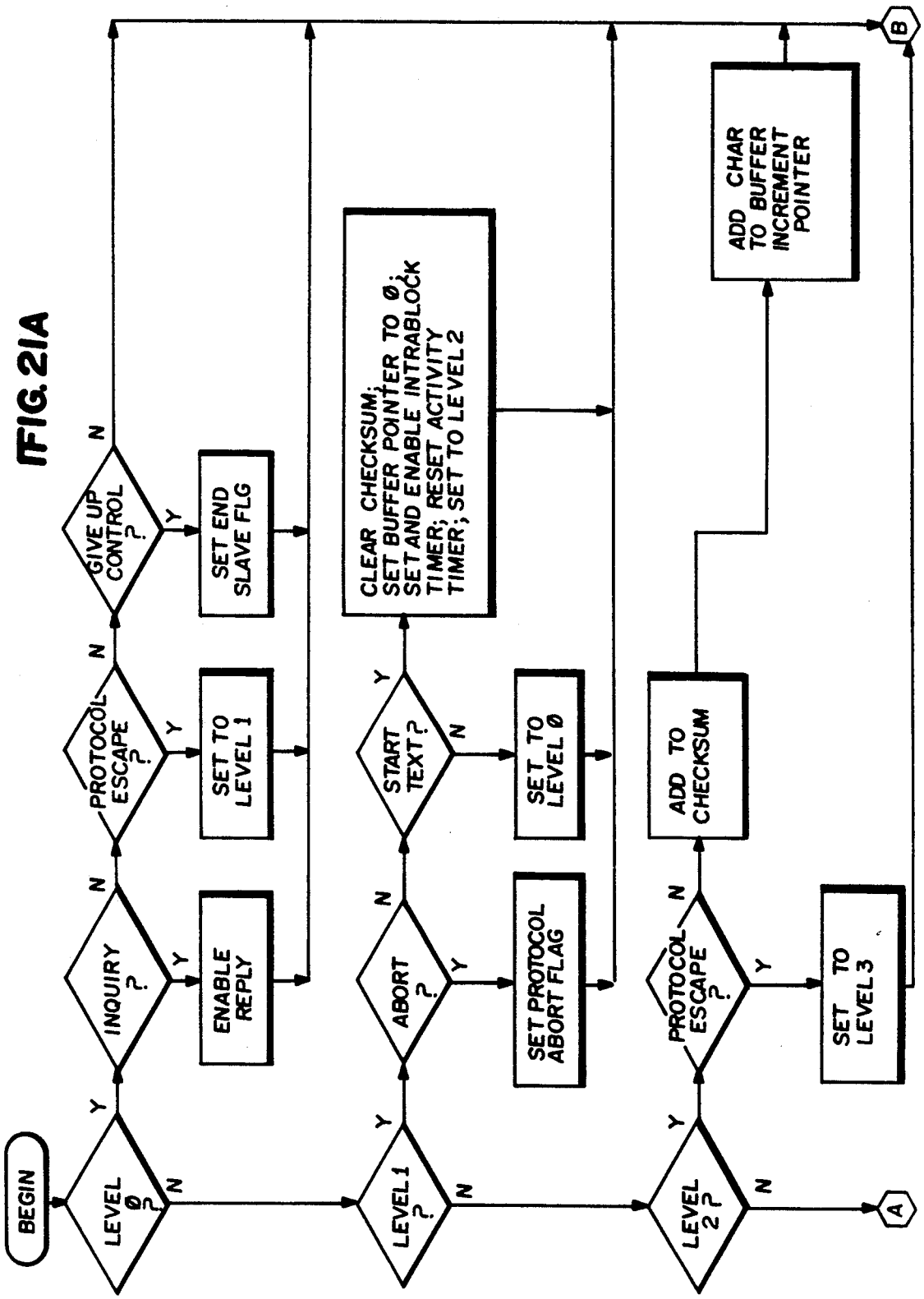
Figure 21B:
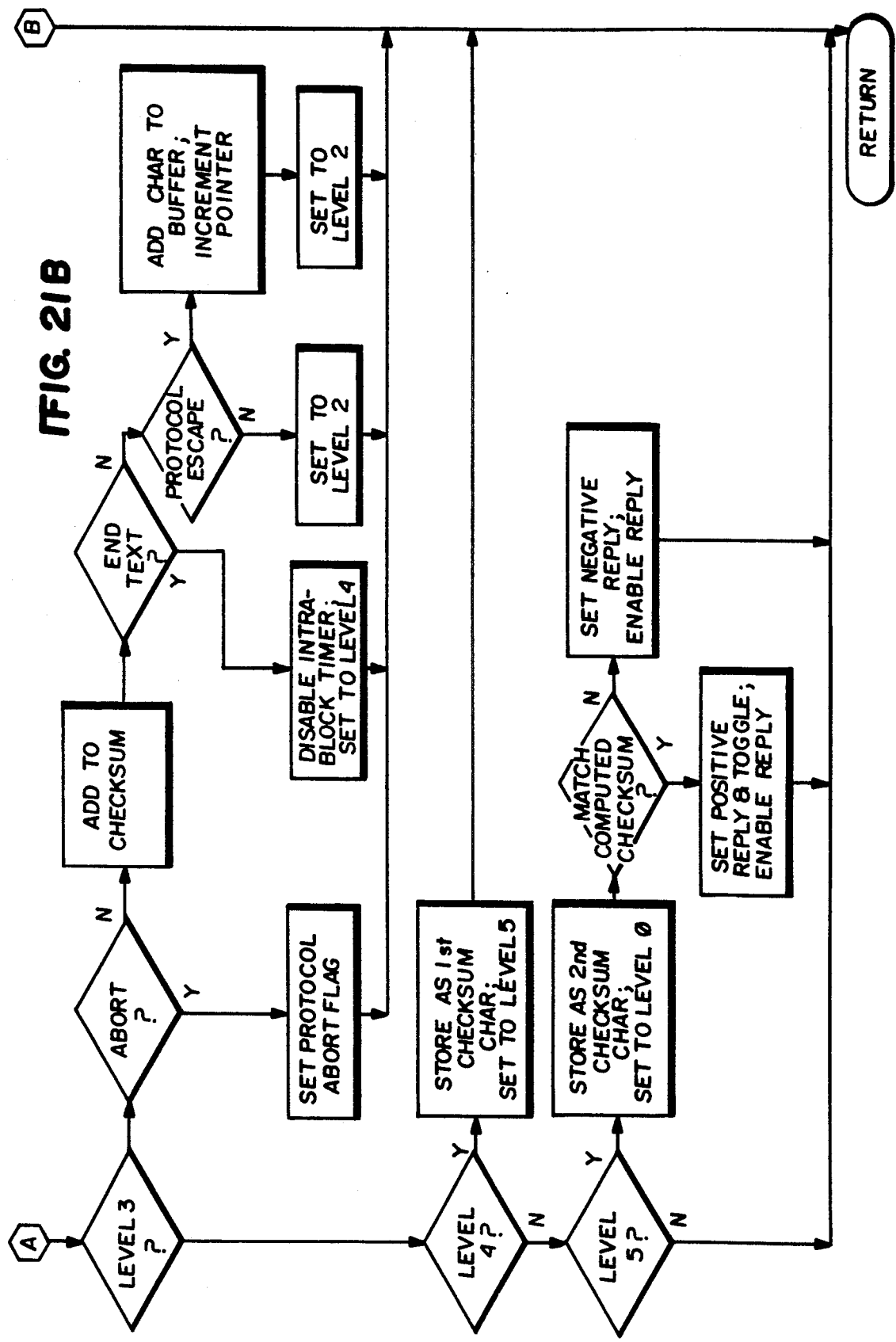

FIGS. 21A–21B are together a detailed flow chart the host "slave" routine 974. This routine is virtually identical to terminal "slave" receive 582 shown in (and discussed in detail in connection with) FIG. 11. In the preferred embodiment, host 200 stores received image data as it receives it without additional processing. Hence, "modified" characters and embedded "protocol escape" characters are stored with the image data as received. However, host 200 does accommodate "modified" checksum characters by modifying calculated checksum values falling within the "illegal" range before performing conventional error checking comparison.

Upon receiving "positive" reply from host 200 in response to its own transmitted reply (blocks 960, 962 of "slave" time-out routine 954 shown in FIG. 20), host 200 returns to execution of "slave" routine 950 shown in FIG. 19 and determines whether it is to continue to act as a "slave" (during operation and "level 0" shown in FIG. 21). Host 200 "looks for" receipt of an "escape" sequence from display terminal 300 indicating that the display terminal has ceased operating as "master" and now allows the host to operate as "master." When display terminal 300 gives up control (as tested for by FIG. 19 decision block 976), host 200 reverts to operating as "master" (block 978) and then returns to "master/slave" select routine shown in FIG. 18. Otherwise, host 200 continues operating as "slave" until either a time-out occurs or until a "protocol abort" occurs (e.g., in response to an "abort" character transmitted by display terminal 300) (blocks 980, 982, 984).

Referring now once again to FIG. 18, upon return from "slave" routine 950, the buffer pointer is tested to determine whether it has been incremented (decision block 986). If the buffer pointer has not been incremented, then no image data has yet been received and blocks 948 and 950 are executed once again. If an image has been received, however, the contents of the receive image buffer is read into an image file (block 988) through file management module 931. Host 200 then transmits a success or error message depending upon the completion codes it receives from file management routine 231 (decision block 990, blocks 992, 994). Control then returns to image management routine 700, block 724 (shown in FIG. 12) to "prompt" for a new listing number.

DISPLAY TERMINAL IMAGE CAPTURE OPERATION

Figure 22:
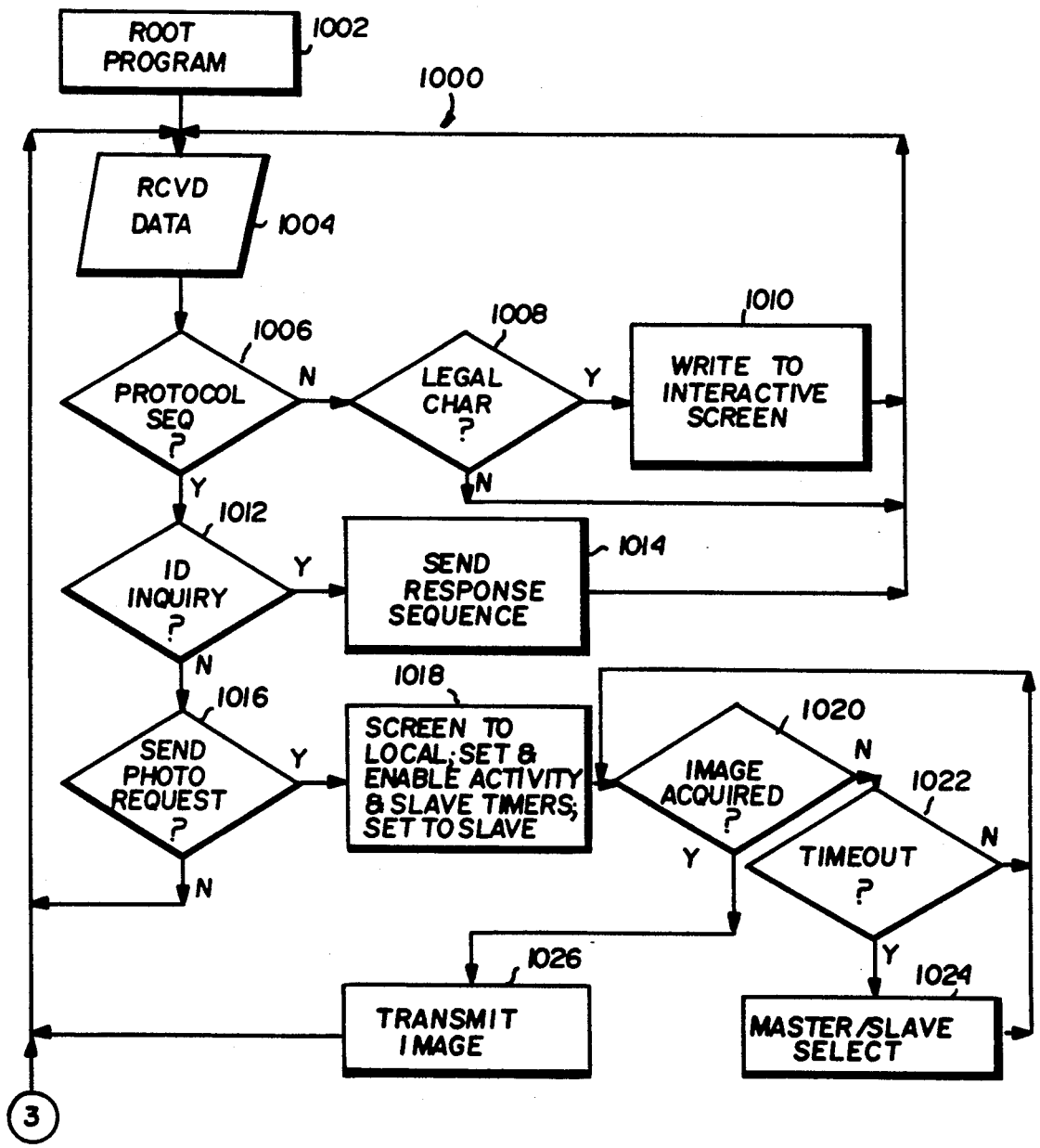

FIGS. 22–26 are detailed flow charts of the capture image routine 1000 performed by display terminal 300 to capture and transmit images to host 200. Capture image routine 1000 is called from the basic conventional monitor program executed by display terminal 300 upon input by the user of the command "SPH" (FIG. 22 block 1002).

Display terminal 300 awaits for receipt of data from host 200 (block 1004) and then tests whether the received data is "protocol" sequence data or simply "text" data (block 1006). Generally, display terminal 300 operates in the TTY mode by simply displaying on its conversational screen all "legal" characters transmitted to it by host 200 (block 1008, 1010). If a special "protocol" sequence character is received, however, display terminal 300 analyzes the character to determine whether it is an identification "inquiry"—and if it is, immediately responds with a predetermined terminal identification assigned to it (blocks 1012, 1014).

If the received special "protocol" sequence character authorizes display terminal 300 to transmit an image to host 200 (tested for by decision block 1016), the display terminal begins operating in the "slave" mode and controls graphics card 318 to digitize and "acquire" an image produced by VCR (or other video source) 306 (blocks 1018, 1020). If a predetermined time-out period expires before a complete image is acquired, a "master/slave" select routine 1024 (to be described shortly in connection with FIG. 24) is executed to return to the TTY mode. When an image is acquired, a transmit image routine 1026 is executed to actually transmit the acquired image.

Figure 23:
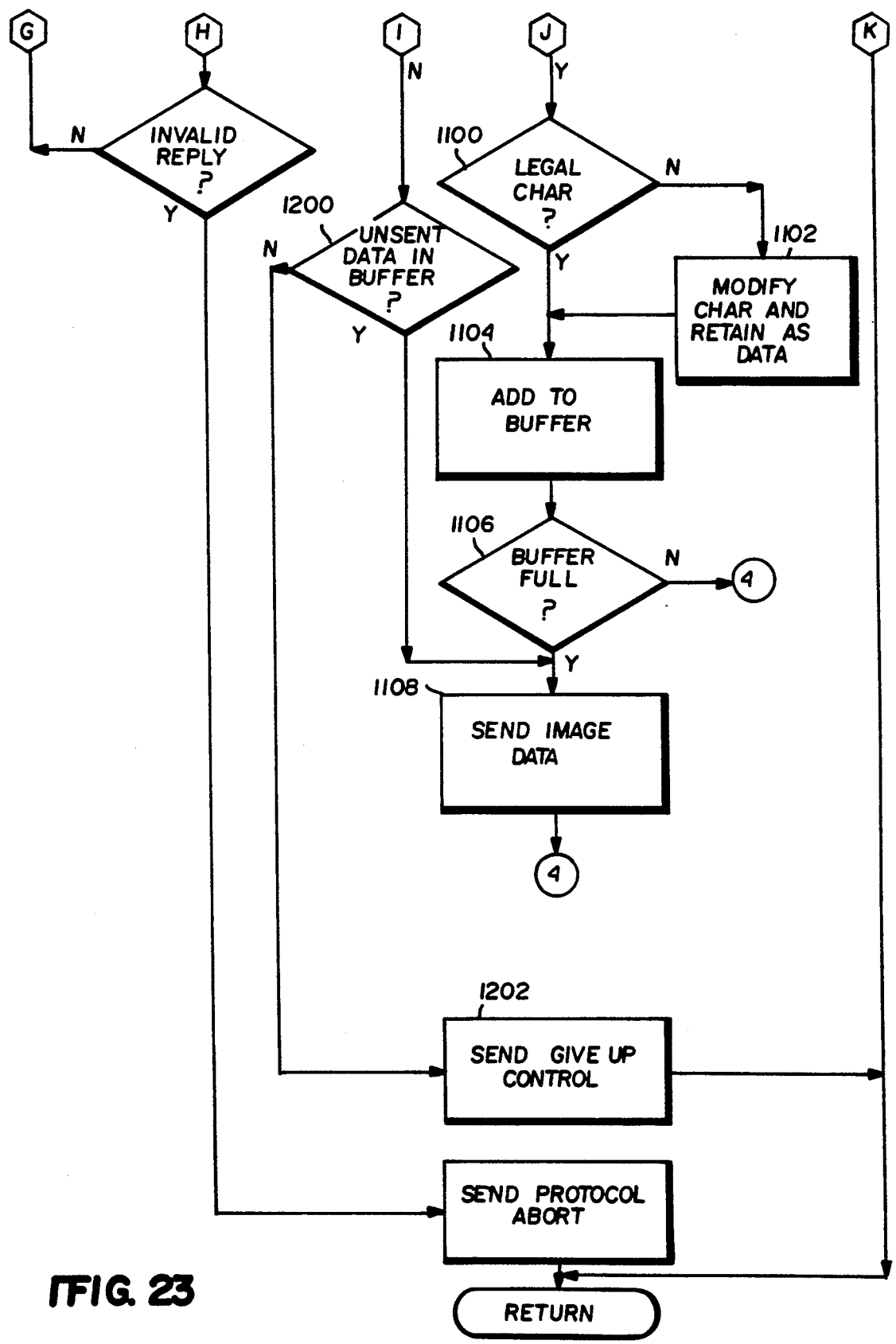

A detailed flow chart of the transmit image routine 1026 is shown in FIG. 23. The display terminal display screen 304 is returned to the interactive mode (so that it displays communications received from host 200 rather than the digitized acquired image) (block 1030), and then display terminal 300 determines whether the user requested image acquisition to be aborted by keying in an "abort" command during image acquisition (decision block 1032). If image acquisition was aborted, display terminal 300 transmits a "protocol abort" message to indicate to host 200 that an image is not to be transmitted and that the display terminal 300 is to return to the TTY mode (block 1034).

Display terminal 300 then determines whether it is still operating as a "slave" (block 1036). Display terminal 300 does not transmit any image data until it has become "master" and host 200 is operating as "slave." However, the display terminal cannot become "master" until the host has released control and has itself become "slave." Display terminal 300 transmits an "inquiry" to host 200 (block 1040) requesting permission to become "master." If display terminal 300 waits more than a predetermine time-out period before becoming "master" (as tested for by decision block 1042), it executes "master/slave" select routine 1024 shown in more detail in FIG. 24.

Figure 24:
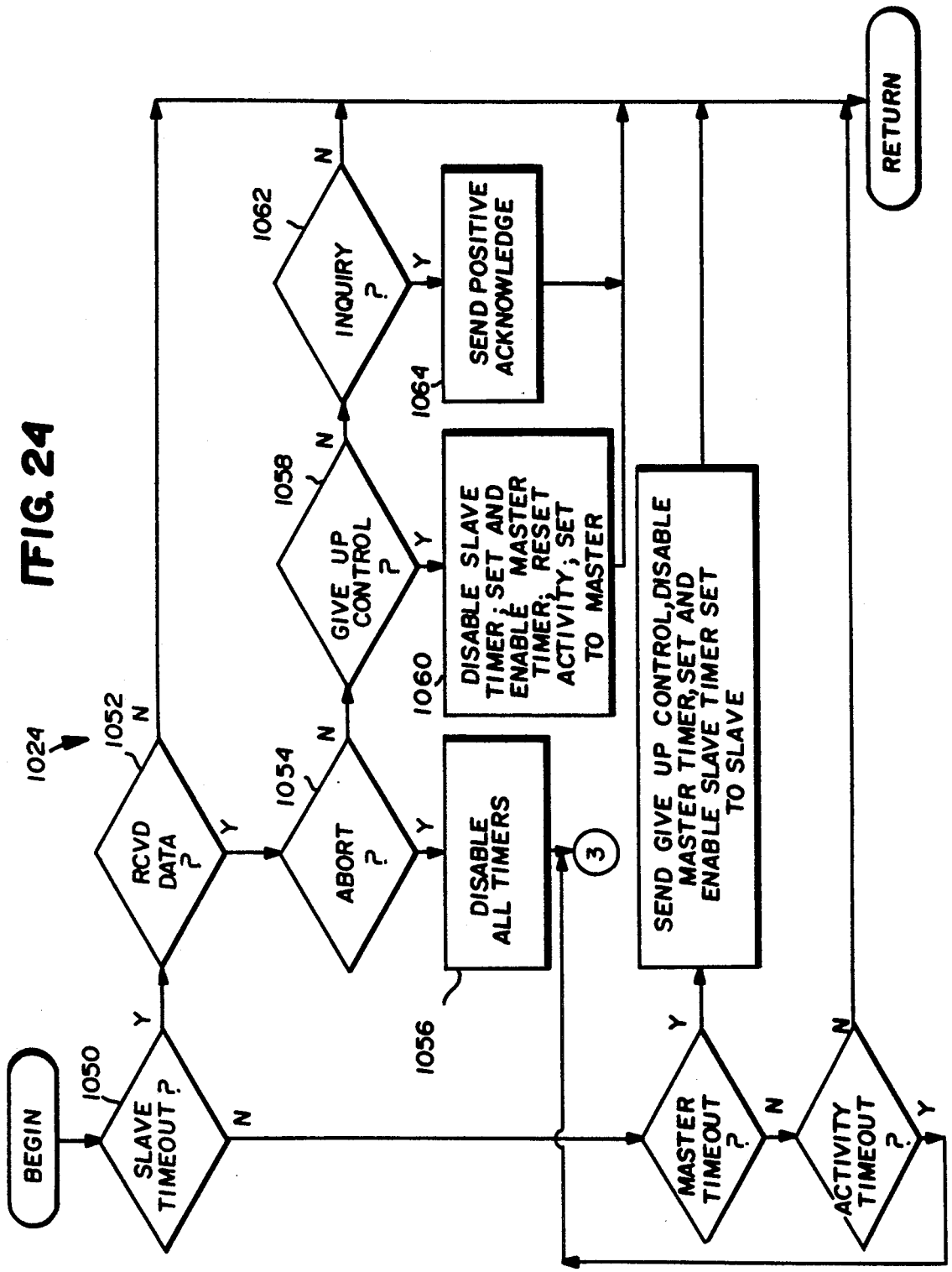

Referring now more particularly to FIG. 24, if the terminal "master/slave" select routine is entered because of a "slave" time-out (e.g., from decision block 1036, 1042) (decision block 1050), display terminal 300 determines whether it has received data from host 200 (decision block 1052). If data has been received, display terminal 300 determines whether the received data is an "abort" sequence—and if it is, exits to capture image routine 1000 to await additional received data in the TTY mode (decision block 1054, block 1056). On the other hand, if the received data is a command to display terminal 300 to become "master," the display terminal begins operating as "master" (decision block 1058, block 1060). If the received data is an "inquiry," on the other hand, display terminal 300 transmits a positive acknowledge message (decision block 1062, 1064).

When decision block 1036 shown in FIG. 23 finally determines that host 200 has granted display terminal 300 permission to act as "master," it transmits an "inquiry" to the host (block 1040) and then waits for a response from the host (decision block 1042, 1044). Time-out routine 1044 shown in detail in FIG. 26 prevents display terminal 300 from waiting more than a predetermined time-out period for a response to its "inquiry." If the reply to "inquiry" is positive (decision block 1046), display terminal 300 determines whether there is additional image data not yet transmitted (decision block 1048). If additional data exists, display terminal 300 determines whether the next data byte is a "legal" character (i.e., whether it falls outside of the range of hex 00 to hex 1F) (decision block 1100). If the next character is not a "legal" character, it is ORed with octal value 100 in the preferred embodiment (thus modifying it to make it have a "legal" value) and then is added to the buffer (block 1102, 1104). If the character is "legal" it is simply added to the buffer (block 1104). This process is repeated until the data block buffer is full (as tested for by decision block 1106). When the data buffer becomes full, send image data routine 1108 is executed to transmit the buffer contents to host 200.

Figure 25:
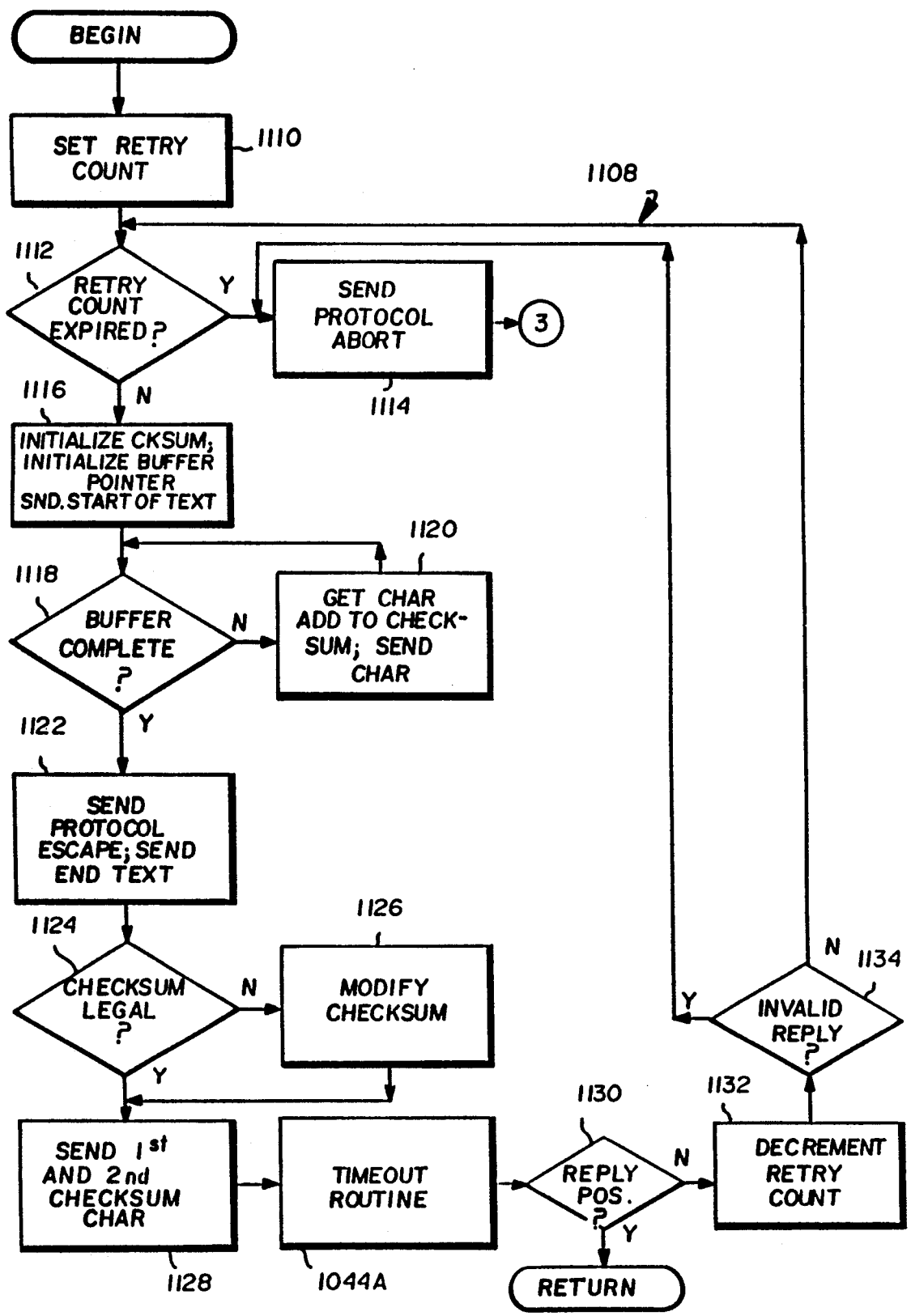
Figure 26:
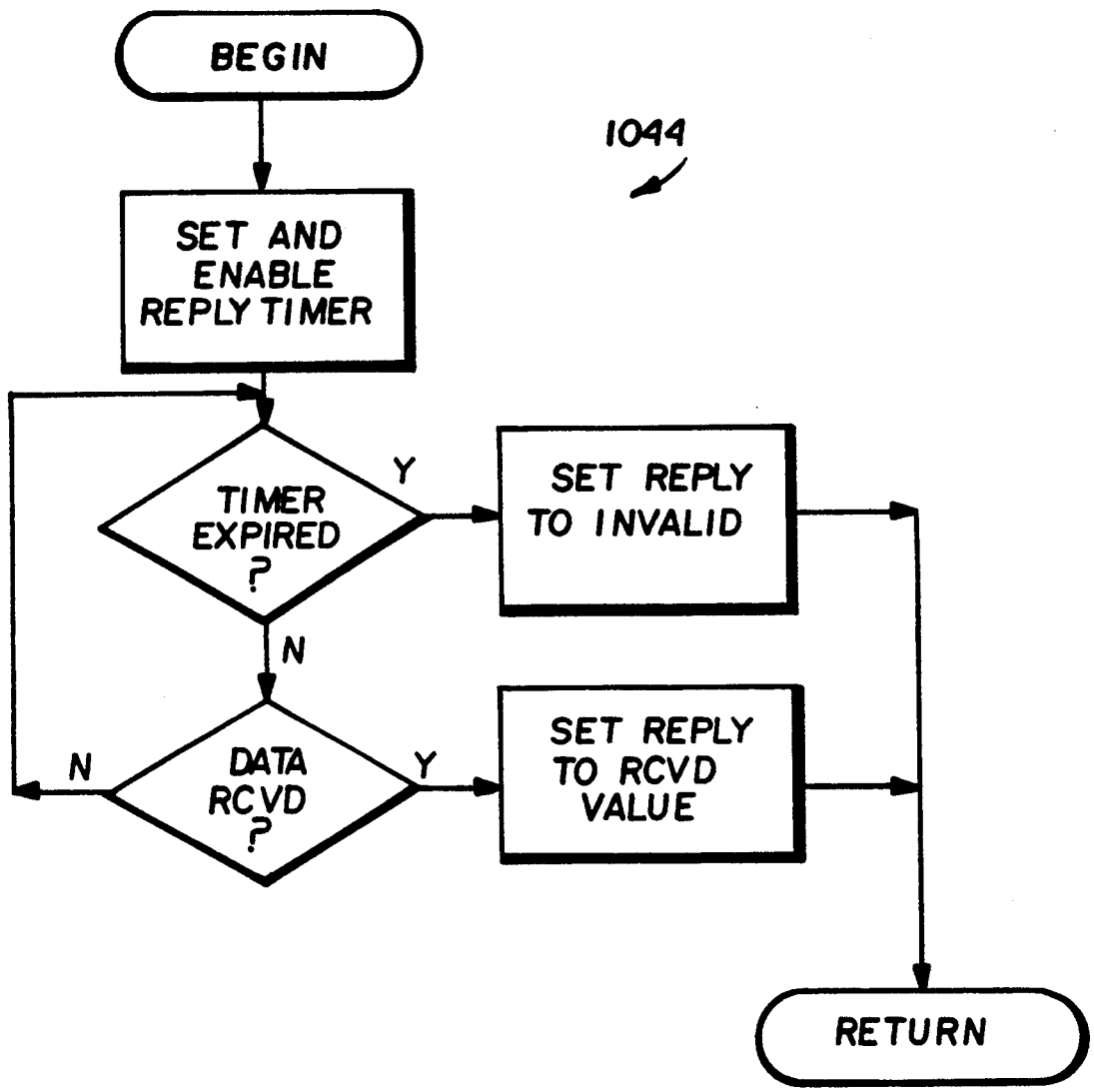

A detailed flow chart of the send image data routine 1108 is shown in FIG. 25. A retry counter is set (block 1110), and then the retry counter is tested to determine whether it has expired (decision block 1112). Data terminal 300 only attempts to transmit the same block a predetermined number of retry times after which it "gives-up" and transmits a "protocol abort" character to host 200 (decision block 1112, block 1114). If less than the maximum permitted number of retrys have occurred, display terminal 300 initializes a running checksum value, initializes a buffer pointer used to read characters from the transmit data buffer, and then transmits a "start of text" character to host 200 (block 1116) to indicate to the host that a block of image data is to follow.

Display terminal 300 then transmits image data, character by character, out of the transmit buffer until no more data exists in the buffer (decision block 1118, block 1120). When the entire buffer contents have been transmitted, display terminal 300 transmits a "protocol escape" and "end of text" character to indicate to host 200 that the block is complete (block 1122), and then transmits its running checksum value at the end of the block (after modifying same if necessary to make the value fall within the "legal" limits) (decision block 1124, blocks 1126, 1128). Display terminal 300 then waits for an acknowledgement from host 200 (time-out routine 1044). If the acknowledgement is negative (indicating that the host did not correctly receive the data block), the retry counter is decremented (decision block 1130, block 1132), and steps 1112-1128 are executed again. If an invalid response is received from the host (as tested for by decision block 1134), display terminal 300 transmits a "protocol abort" escape sequence to cause both display terminal 300 and host 200 to exit the blocked data communication protocol. If a positive acknowledgement is received from host 200 (as tested for by decision block 1130), control is returned to transmit image routine 1026, block 1098 shown in FIG. 23 to test whether any additional blocks of data should be transmitted as part of the current image.

Referring now once again to FIG. 23, when no more image data remains to be transmitted, display terminal 300 determines whether any additional untransmitted data remains in the transmit buffer (decision block 1200). If such untransmitted data does remain, send image data routine 1109 is executed to transmit the untransmitted data. If no more data remains to be transmitted, display terminal 300 transmits the "escape" sequence used in the preferred embodiment to indicate to the host 200 that it no longer is operating as "master" (block 1202), and control reverts to capture image routine 1000 shown in FIG. 22.

DETAILED DISCUSSION OF OPERATION OF SYSTEM 100 FROM STANDPOINT OF A TYPICAL USER OF DISPLAY TERMINAL 100

The lengthy appendix attached hereto describes how system 100 is used by a typical realtor to manipulate text and image data, retrieve and display images, add new images, delete images, print images, locally store and later manipulate retrieved images, and execute setup routines to initialize display terminal 300.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

APPENDIX

```
This chapter will introduce you to the eight
steps of starting Photo-Term and establishing
your link to the host computer and Real-Trieve.
These steps include the following:

1.  Turn on the power.
2.  Insert the Photo-Term disk (floppy disk
    users only).
```

3. Start the computer.
4. Type the command: PTERM.
5. Select the setup (F9).
6. Call the host computer (F10).
7. Respond to messages from the host computer.
8. Select a desired function.

In order to establish your link to Moore's on-line information system Real-Trieve, a Photo-Term system communications and terminal setup must be established for each host computer system with which you will communicate.

One person at your office should manage the setups for your installation of Photo-Term. Although your Moore representative can assist you in the initial establishment of the Photo-Term system communications and terminal setups, changes in the host computer systems can require further modifications necessary to the setups. The person in your office who is designated with the responsibility for managing the setups should read Chapter 13: Configuring Your Photo-Term System Communications & Terminal Setup.

Once an appropriate communications and terminal setup has been established for your use, you will find it easy to link to your host computer system and Moore's Real-Trieve information system shortly after starting Photo-Term on your computer.

If you are using Photo-Term for the first time, be sure that you check hardware connections and your power supply for proper equipment operation to be ensured.

Before a link can be established with the host computer, Photo-Term must be properly installed on your computer. For more information, read Chapter 4: Photo-Term Installation.

Starting Photo-Term is discussed in Chapter 5. If you have not read Chapter 5, do so now. Your first step in establishing your link to the host computer and to Real-Trieve is to start Photo-Term and obtain the main menu.

The following procedure should be used to start Photo-Term and to establish your link to Real-Trieve via the host computer.

Turn on the power supply to all attached devices, including the monitor and the printer.

FIXED DISK USERS SHOULD OMIT STEP 2.

If you are starting Photo-Term from a floppy disk, insert the Photo-Term floppy disk in drive A and close the latch. (Have you properly installed Photo-Term? If not, be sure to read Chapters 4 and 5.)

Turn on the power to your processor unit. Locate the switch in the rear of the processor unit and toggle it upward to the on position. As you start the computer, a few long moments will pass during which time the computer transfers the DOS into its memory and makes itself ready for use. When the process is completed, indicator lights on the front of the processor unit will stop flashing and a prompt will appear on the screen.

The prompt will appear as A> if you are starting Photo-Term from floppy disk.

The prompt will appear as C> if you are starting Photo-Term from fixed disk.

Type the command: PTERM. Then press the RETURN key.

The Photo-Term program starts, and the main menu is displayed on your monitor screen as shown in the following illustration.

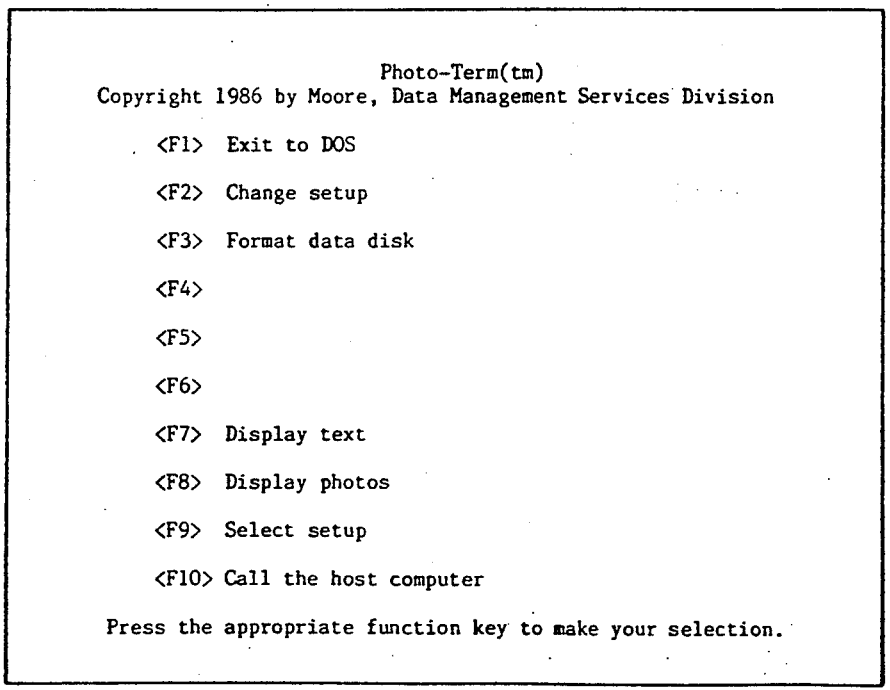

To link with the host computer, you will be using two function keys, F9 and F10. These function keys are located on the lower left side of your keyboard.

If necessary, press the F9 key to select the appropriate setup name. When the main menu first appears, a default setup name is displayed to the right of the phrase "Select setup." Your computer may contain a list of alternate setup names from which you will need to choose the correct one.

IF YOU DO NOT KNOW THE CORRECT SETUP NAME, YOU WILL NEED TO DETERMINE THIS FROM THE PERSON WHO ESTABLISHES THE SETUP NAMES.

With each single press of the F9 key, the name of the setup displayed to the right of the phrase "Select setup" may change.

IF THE SETUP NAME DOES NOT CHANGE WHEN YOU PRESS F9, THERE ARE NO ALTERNATE SETUP NAMES FROM WHICH TO SELECT.

After pressing F9 a few times, the default name will again appear. This indicates that you have viewed all of the alternate setup names.

In summary, press F9 as many times as necessary until you see the setup name you intend to use. The correct setup name must appear on the main menu if the next step in this procedure is to work.

THE CORRECT SETUP NAME APPEARS ON THE MAIN MENU. This is the setup name that will be used as you establish your link to the host computer and Real-Trieve.

Press the F10 function key. This key is located in the lower left corner area of your keyboard.

Pressing F10 ("Call the host computer") begins a procedure which relies on information stored in the communications and terminal setup selected via the F9 function key in the previous step.

You need to press F10 only once.

As soon as your connection is made with the host computer, your monitor will display messages received from the host computer. Be sure to check that your monitor is operating properly should these messages fail to appear.

If the messages do not appear within ten or fifteen seconds, press the RETURN key several times SLOWLY, pausing about four seconds between each press of the key.

Your host computer agency may have provided you with a password, account number, or other means of identification. In order to be able to use Real-Trieve, you must follow the correct procedure as established by the organization operating the host computer.

Once you have gained access to the use of Moore's on-line information system Real-Trieve, Real-Trieve will respond with a message on your monitor screen and then ask you for a function as shown in the following screen.

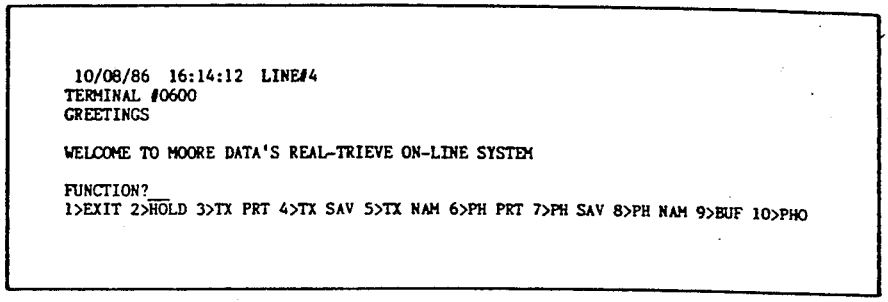

When the prompt FUNCTION?__ is displayed, you will be able to respond with a brief command.

There are many command functions available for Real-Trieve. For example, when retrieving the photographs of listed property, the command you will use is PHO (Display Photo).

However, you can use other commands if you wish. Consult your Real-Trieve User's Guide for more detailed information as to the available commands.

Once connected to the host computer system and Real-Trieve, you will be able to do the following:

- Get a listing and display a photo from Real-Trieve.

- Display multiple photos from a single listing from Real-Trieve.

- Copy a photo from a Real-Trieve listing to a photo file stored on your own computer.

- Copy text from a Real-Trieve listing to a text file stored on your computer.

- Display and/or print photos and text directly from Real-Trieve.

- Display and/or print photos and text from files stored on your computer.

See the specific chapters in this user's guide on each of these functions to learn the correct procedure for accomplishing these tasks.

If you are unable to gain access to the host computer and Real-Trieve, there are several possible causes, including those presented in the following text.

Upon pressing the F10 key from the Photo-Term main menu, you may receive a message denying access to the host computer, or you may receive no messages at all. The host computer may be down--it may not be operating and cannot communicate. You may wish to call your host computer service center or use a hotline telephone number provided by the host computer agency to verify the down status and to determine a time when you can try again.

Some down time is scheduled on a regular basis by most host computer organizations. Be sure to consult your host computer agency for a listing of these times.

If the use of the host computer requires an account number, user identification, or password, you may need to recheck these items. If it has been some time since you last used the host computer service, there may have been a change.

You may have an invalid answerback code (if the host computer requires one). Your answerback code is recorded as part of the communications and terminal setup that you selected and displayed on the Photo-Term main menu via the F9 function key.

Recheck that you are using the correct setup name. If the setup name is correct, then check with the person in your office who manages the setup. This person may consult Chapter 13: Configuring Your Photo-Term Communications and Terminal Setup for more information concerning the answerback code.

BE SURE TO TYPE CAREFULLY.

Most errors made by users of computers are the result of mistakes in typing and/or spelling. When you contact the host computer system and make a typing or spelling error, you will be prompted to try again. However, most host computers will allow only a limited number of attempts before disconnecting from the telephone line.

To exit the communications display, press the F1 (EXIT) key.

A message is displayed as shown in the following screen:

```
Exit ends communication with host
computer.  ARE YOU SURE? (Y/N)
```

Press "Y" to end communications and return to the Main Menu.

Do this if your attempt to communicate with the host computer was unsuccessful.

Also do this after typing "BYE" to end your communication with Real-Trieve.

Press "N" to maintain communications.

In order to get a listing and display a photo, you must be linked to Moore's on-line retrieval system, Real-Trieve. If you have not established this link and you need to review the procedure, see Chapter 5: Getting Started with Photo-Term and Chapter 6: Establishing Your Link to Moore's On-line Information System Real-Trieve.

To get a listing and display a photo, perform the following procedure when the FUNCTION?__ prompt appears:

1. Enter command PHO (PHOTO).

2. Press RETURN key.

3. Enter listing number.

4. Press RETURN key.

5. Receive text and graphic (photo) display.

6. Press F10 key to change pages between text and photo.

7. Request new listing number.

8. Obtain another function.

9. Disconnect from Real-Trieve.

10. Display text.

11. Print text.

When the prompt FUNCTION?__ appears, enter the command PHO, then press RETURN as shown in the following example.

```
                    FUNCTION?PHO
```

Then press the RETURN key.

The on-line retrieval system will now respond with another prompt to enter the listing number.

```
                    LISTING NUMBER(S)?
```

Although the on-line retrieval system will allow you to key multiple listing numbers for other functions, you should enter only one
listing for the PHO function.

For example, if the listing number of a listed
property is 16664, key the number following
the LISTING NUMBER prompt as shown in the
following screen.

```
           LISTING NUMBERS(S)? 16664
```

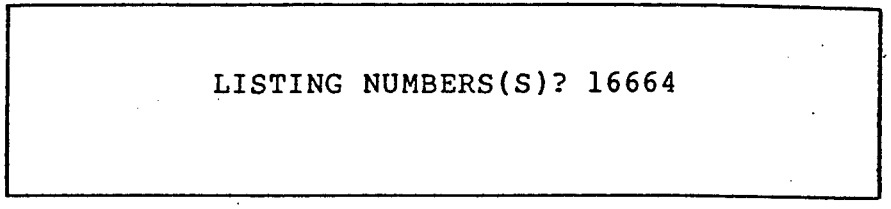

Then press the RETURN key.

At this point, the computer screen will switch
to a graphic display. There may be a long
pause as the host computer searches for the
information files for the property listing.
As soon as the information is found, the host
computer sends both the text and picture to
your computer terminal.

Upon switching to the color graphic display,
the text, in large letters, will be displayed
first. This is a shortened or abbreviated
version of the detailed text stored on-line.
This abbreviated text appears in nine lines on
the lower half of the display screen. (You
also have access to the longer, more detailed
text. The procedure for accessing this
information is explained later in this
chapter.)

Next, the picture of the property appears in
the upper left quadrant of the display
screen. The picture will be assembled in four
phases of construction.

In the first phase, Photo-Term paints the
largest elements, or pixels, on the screen.

In phase two, the number of elements are
doubled.

In phase three, clarity improves as the detail
of the photograph becomes highly visible.

With the completion of the fourth phase, the picture is now complete with nearly as much detail as a camera photograph (shown below).

All four phases are completed within forty to sixty seconds of time.

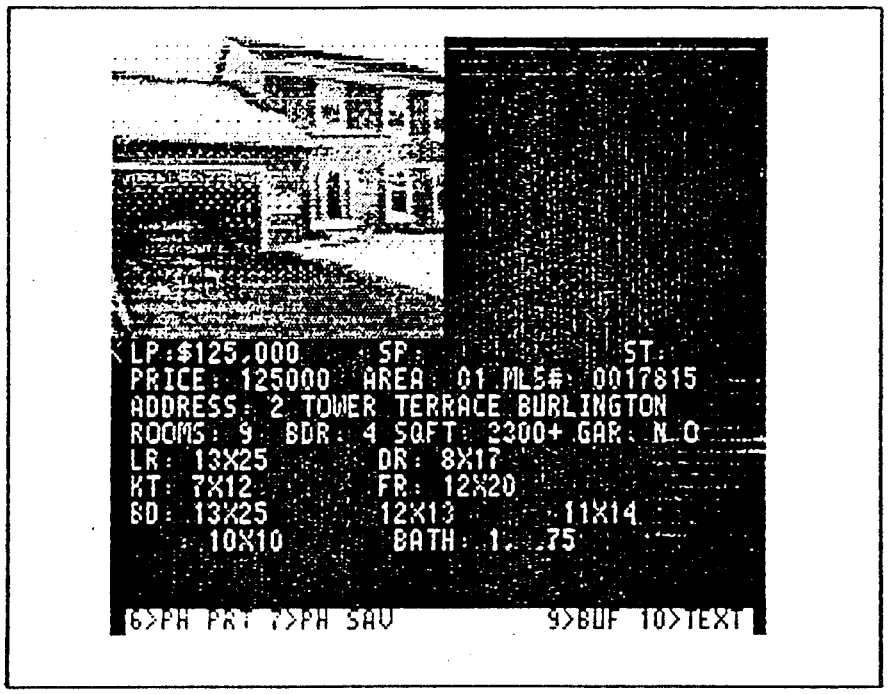

Once the picture is displayed, you can change "pages" between the full, detailed text which has also been received, but is not initially visible on the screen, and the Photo-Term abbreviated text and photograph.

This is easily accomplished by pressing the F10 key to change pages.

If you are observing the photograph, press F10 to obtain the Real-Trieve detailed text of the listed property.

If you are observing the Real-Trieve detailed text of the listed property, press F10 to return to the photograph.

Once you have observed the text and photograph of the listed property, you may wish to obtain a listing and photograph of another property. In this case, you will need to press F10 if you are viewing the photograph to observe the Real-Trieve text.

```
Add: WILDWOOD WEST, CHARLOTTE          Area 02  $ 73500    Sign Y   MLS#0017773
Directions:RTE 7 SOUTH, 1ST R AFTER WILDFLOWER FARM, 1ST LEFT, 2ND HOUSE ON
LEFT                                House size 28X46        Style:RANCH
Lot sz.F 175 1A+-      Deed V. 41 P. 528 Apx. Sq.Ft. 1300  Color GREEN
Rms Appx.Sz.   B 1 2 Rms Appx.Sz.   B 1 2 Fin.Bsmt UNFIN    Flrs HW/INLAID
LR  15X18       X    Ba  1,1/2MBR    X    Est.Age 10+-      Walls SR
DR  12.5X10.7   X    BdR 15.5X11.9   X    Constr. WF        Pch/Deck 4X10.4
Kit 13.3X8.6    X    BdR 11.5X12.9JO X    Fnd.Wls PC        St.Win THERMAL
Kit w/ ROHF,DW,DSS,RE BdR 11.6X10.6  X    Siding MASONITE   Fpl LR  W/S BSMT
Fr                                        Roof AS           Typ Heat ELEC/WD
Gar: 2 Att/Det/Und ATT Tot.Rms 5 Tot.BdR 3 Water COMM       HtWtr ELEC O/R
Remarks: RANGE,RED, NEW. WS, WOOD, TV ANT Sewer SEPTIC      Gas/Oil Co
,DRAPES ALL STAY. BSMT GOOD HGT FOR FINISH DrvWy GRAVEL     Elect.Co GMP
ING,BUILT IN CHINA, HW FLRS, APPX. $100*  Zoning RES
Occ. VACANT                        Ph     Occupancy NEGO
How Show LB,PLC                           Typ Mtg NONE      Bank
Owner J. SMITH                       Ph        Taxes 1272   Yr 84/85
LO C21 GOLDSMITH & MARTIN            Ph  878-8176 Owner w/Finan SMALL AMT
L/A .KATIE LAUN SPAULDING            Ph  658-5005  *YR. FEE FOR WATER/PLOW
S-A-O 3%         Code 160   Exp. 11/06/84 at Midnite ,CARPETS ALSO STAY ==========
LISTING NUMBER(S)?
1>EXIT 2>HOLD 3>TX PRT 4>TX SAV 5>TX NAM 6>PH PRT 7>PH SAV 8>PH NAM 9>BUF 10>PHO
```

At the bottom of the display screen shown above, another prompt (LISTING NUMBER(S)?) is displayed. Simply key another number for another listed property, and once again Photo-Term will construct a new photograph in four phases for the particular listed property requested.

The Photo-Term photographs and abbreviated text are being provided by the Real-Trieve System.

Some properties may not have been photographed. If this is the case, Real-Trieve will inform you of this, and you will not obtain text or photographs for that listing.

Remember that anytime you press the ESC (Escape) key, you will return to the Real-Trieve on-line information system display and receive the prompt for FUNCTION?___.

If you wish, then, to continue displaying photos for listed properties, once again type the Real-Trieve command: PHO.

```
                    FUNCTION?PHO
```

To disconnect your computer terminal from Real-Trieve, type the command: BYE.

```
                    FUNCTION?BYE
```

Remember, press F1 (CANCEL) to return to the Photo-Term main menu.

While you are in communication with Real-Trieve, you have two functions which produce text displays for you. Those functions include the following:

- Displaying listing text by typing a listing number.

- Displaying the text buffer (previous pages).

When you type a listing number, Real-Trieve sends both text and photo to your computer. As soon as you press the RETURN key after typing a valid listing number, Photo-Term switches to the photo display and builds the photo on your monitor screen. At any time that you press the F10 function key from the photo display, you switch to the text display immediately. If you are quick enough, you will see the text lines moving up the screen, with each new line of text appearing at the bottom. When the last line of text has been received, the text will cease movement on the monitor screen.

Unfortunately, many listings will have more text than can be displayed on your monitor screen at one time. Because of this, Real-Trieve displays only the last twenty-four lines of text (the last page) when all the text has been received, and the text movement stops. The lines which have disappeared at the top of the screen can no longer be seen.

Fortunately, Photo-Term is busy remembering the text that moved off the top of your monitor screen. Photo-Term contains a four-page buffer (memory storage) which remembers the current page and the three previous pages of text. While communicating with Real-Trieve, you only have to press F9 (BUF) to switch to viewing the buffer area as shown in the following screen.

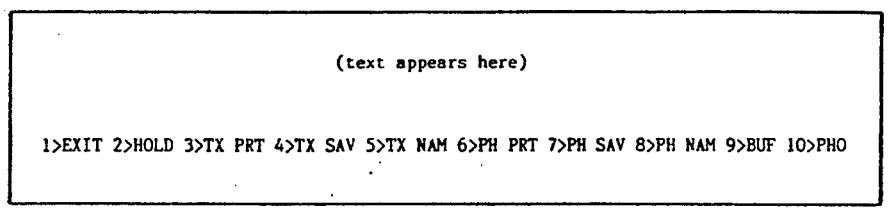

As soon as you press F9 (BUF), the menu line at the bottom of the screen changes as shown in the following illustration.

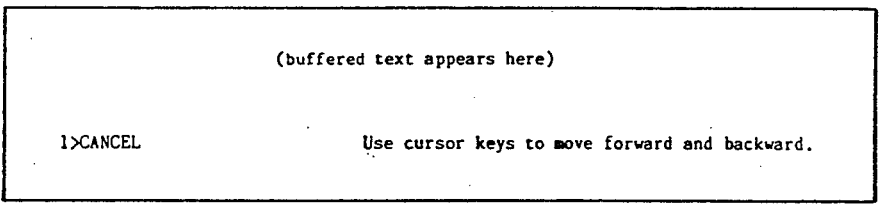

The only function key that can be used when you are viewing the buffer display is F1 (CANCEL). You will press F1 when you are through viewing the buffer display. Pressing F1 returns your display to the last twenty-four lines of text (the current page) and the menu line will appear as before.

Viewing the buffer is like moving a window up and down as shown in the following illustration.

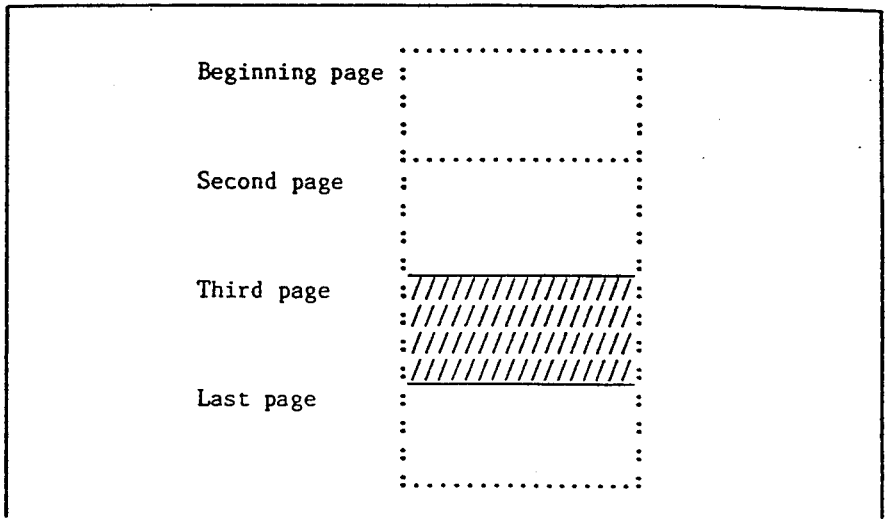

```
 Only one page is presented on monitor
 screen at one time.  Use HOME, END, PgUp,
 PgDn, or cursor arrow keys to adjust view.
```

Pressing the HOME key causes your view to jump to the first page. This takes you to the beginning of the buffer.

Pressing the END key causes your view to jump to the current page (the last twenty-four lines) in the buffer.

The PgUp key moves you backward through pages, one page (twenty-four lines) at a time toward the beginning of the buffer. Think of this as if you were turning the pages of a book backward.

The PgDn key moves you forward through the pages, one page at a time toward the end of the buffer. Think of this as if you were turning the pages of a book forward.

The cursor arrow key which points upward, when pressed once, moves the text backward one line. If you hold this key, the text moves continuously backward until you release the key.

The cursor arrow key which points downward, when pressed once, moves the text forward one line. If you hold this key, the text moves continuously forward until you release the key.

Once you have moved to the very beginning, you cannot go any further backward. Once you have moved to the end, you cannot go any further forward. Trying to do this with the HOME, END, PgUp, PgDn, or cursor arrow keys will cause the computer to "beep" in response to the attempt. This is how you will know when you have gone as far as you can toward the beginning or end of the buffered text.

Remember, when you are through viewing the four-page buffer, press F1 to cancel the display.

As text is received from Real-Trieve, it can be printed. A printer must of course be attached to your computer.

Many types of printers are available to work with Photo-Term. Printers are also available which can print in color. Basic types of printers include dot-matrix, thermal, ink-jet, spin-writer, and daisy-wheel. The speed and quality of printing is a characteristic of the printer that you use and not of your computer or the software you are using. Make sure you have selected a printer that is of the quality and speed suitable for your needs.

Also, you will need to learn how to insert new paper in your printer, advance pages (form feed), advance lines (line feed), and make it ready (on-line) for receiving data from your computer.

```
                    (text appears here)

1>EXIT 2>HOLD 3>TX PRT 4>TX SAV 5>TX NAM 6>PH PRT 7>PH SAV 8>PH NAM 9>BUF 10>PHO
```

To begin the process of printing, you will press the F3 (TX PRT) function key. On a color monitor, the phrase TX PRT will change to a green color. This indicates that the printing function is on. As soon as you type a valid listing number, text is received on your monitor screen. As this occurs, it will also be printed.

Before printing can start, you will be notified to adjust forms and make the printer ready. Your printer forms must be at the top position, and your printer must be on-line or ready. Then press any key and the printing begins.

Once you are printing, you can request as many listings as you wish. You can also display and print photos from Real-Trieve and save photos and text at the same time.

To stop printing, simply press F3 (TX PRT) again so that the green color of the phrase changes to black. This ends the text printing function.

Another function Photo-Term has is the capability of displaying multiple photos. To use this function perform the following steps:

1. Obtain "next photo (y/n)" prompt.

2. Respond to prompt (yes or no).

3. Receive photo.

4. Change photos/change pages.

5. Request a new listing number.

6. Obtain another function.

7. Disconnect from Real-Trieve.

8. Photo printing.

In some instances, there may be multiple photographs stored by Real-Trieve with a single listing number. When this occurs, there may be up to a maximum of sixteen photographs of a single property. Such pictures may include exterior and interior views of the property and possibly a picture of the broker or agent who listed the property.

When multiple photos are stored with a property listing, as you display the page of detailed text obtained from Real-Trieve for a listed property, a prompt will appear at the bottom of the display <u>in place of the prompt for the listing number.</u> In its place the prompt will ask "Do you want the next photo? (y/n):__" as shown in the following screen.

```
        Do you want the next photo? (y/n):
```

You may respond with either "y" for yes or "n" for no.

Photo-Term photos are always retrieved in a specific order which cannot be changed by you. Therefore, for listed properties with multiple photos, you will always receive the same photographs first. You must view and construct the photos in the order in which they are stored.

You do not automatically change photographs when you press F10 to change pages between the detailed text provided by Real-Trieve and the photo from Photo-Term. When you change pages, the photo is redisplayed as it was viewed before. It is the same photograph, and it is stored in the memory of the computer so there is no need to rebuild the picture in four phases.

When you respond with "y" (yes) to the prompt "Do you want the next photo? (y/n):___," you will receive the next photograph; the display, as before, will switch to the graphic display and build a new photograph in four phases.

All photographs after the first photo are displayed in the upper right quadrant of the Photo-Term display, with abbreviated text and photo. The first photo from the listing remains as before, in the upper left quadrant. <u>Thus, with multiple photos, you will observe two photos simultaneously for a single listed property, except for the very first time you display the first stored photo of the listed property</u>.

As you display still another photo, the photo last displayed in the upper right quadrant will be replaced by the next photo to be displayed.

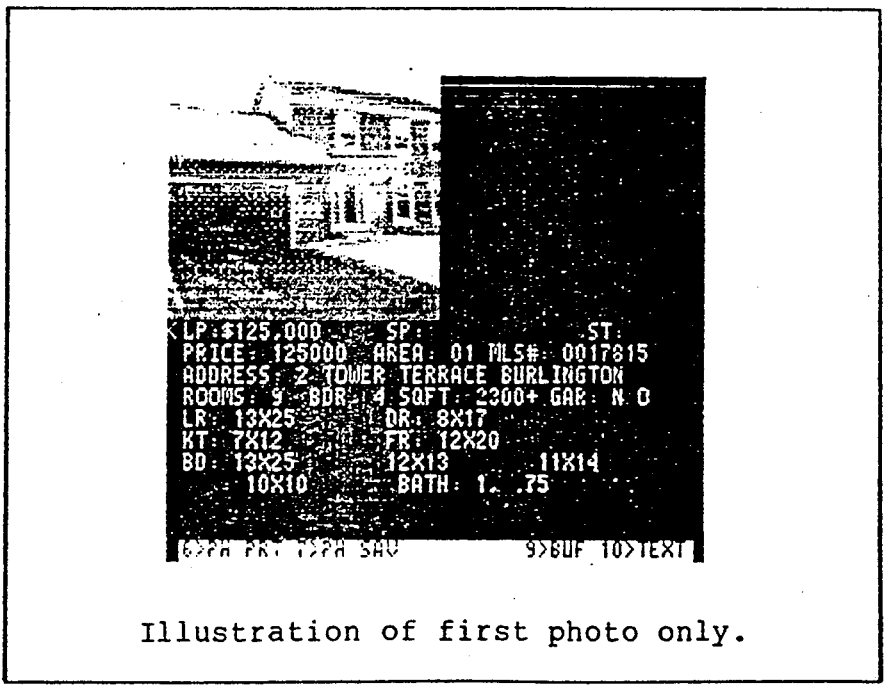

Illustration of first photo only.

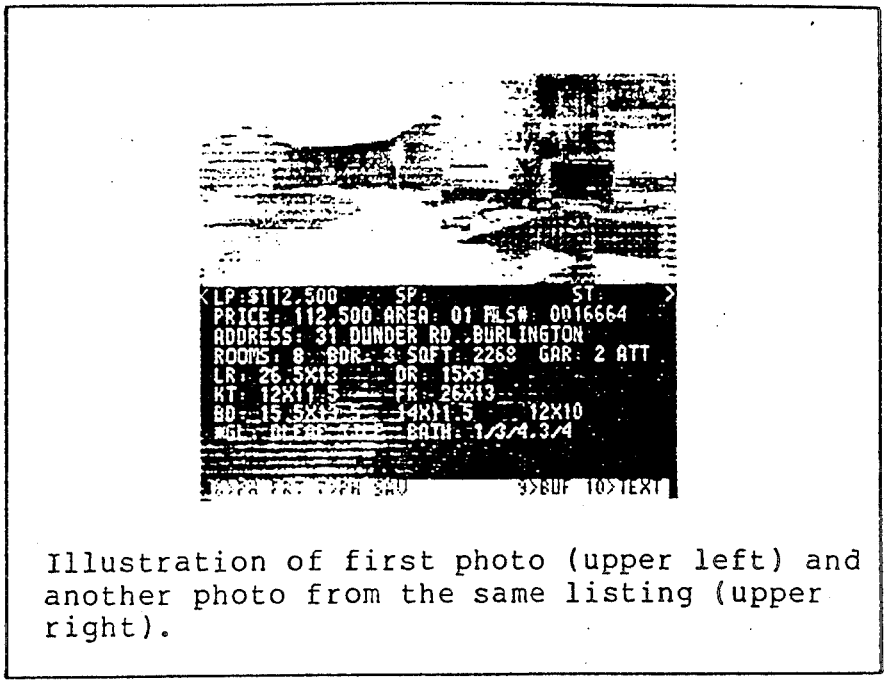

Illustration of first photo (upper left) and another photo from the same listing (upper right).

Any time you wish the next photo, remember to press F10 to change back to Real-Trieve's detailed text and respond to the prompt for the next photo with "y" for yes.

You need never have to see all stored photographs if more than one is stored. Whenever you respond with "n" to the prompt "Do you want to see the next photo? (y/n):___," you immediately get a prompt for another listing number.

Although there may be a maximum of sixteen photos for a listed property, it is likely that there will be just a few for most properties. When you have consecutively responded with "y" for yes, so that the last stored photo has been retrieved and displayed by Photo-Term, you return to the detailed listing by F10. The prompt LISTING NUMBER(S)?__ will appear.

```
              LISTING NUMBER(S)?
```

You may then request a new listed property by entering a different listing number, or you can reenter the same listing number as before and see the same photographs again. They will be in the same order as before.

Remember that to obtain another function, any time you press the ESC (Escape) key, you will return to the Real-Trieve on-line information display and receive a prompt for FUNCTION?__ .

If you wish to continue displaying photos for the listed properties, once again type the Real-Trieve command: PHO.

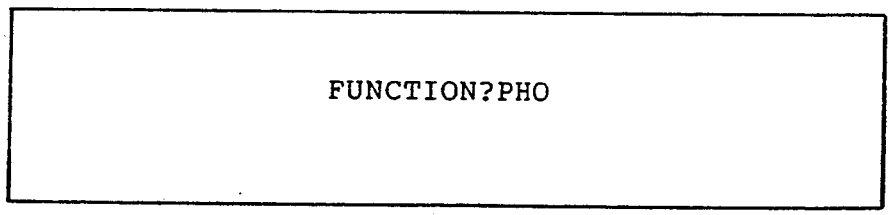

```
FUNCTION?PHO
```

To disconnect your computer terminal from Real-Trieve, type the command: BYE and press RETURN. Your screen will look like the following illustration.

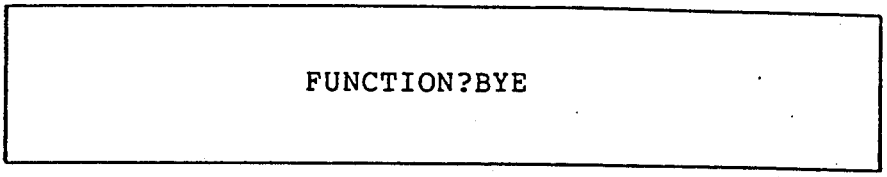

```
FUNCTION?BYE
```

Remember, press F1 (CANCEL) to return to the Photo-Term main menu.

After a photo is received from Real-Trieve, it can be printed. A printer must of course be attached to your computer.

Many types of printers are available to work with Photo-Term. Printers are also available which can print in color. Basic types of printers include dot-matrix, thermal, ink-jet, spin-writer, and daisy-wheel. The speed and quality of printing is a characteristic of the printer that you use and not of your computer or the software you are using. Make sure that
you have selected a printer that is of the
quality and speed suitable for your needs. It
is extremely important that the printer be
able to print pictures or, as more commonly
said, graphics. Only graphic-capable printers
will be able to print a photo image produced
by Photo-Term.

Also, you will need to learn how to insert new
paper in your printer, advance pages (form
feed), advance lines (line feed), and make it
ready (on-line) for receiving data from your
computer.

```
1>EXIT 2>HOLD 3>TX PRT 4>TX SAV 5>TX NAM 6>PH PRT 7>PH SAV 8>PH NAM 9>BUF 10>PHO
```

To begin the process of photo printing, you
will press the F6 (PH PRT) function key. This
causes a message to be displayed which asks
you to adjust forms and make your printer
ready.

Your printer forms must be at the top
position, and your printer must be on-line or
ready. Then press any key and the printing
begins.

When printing photos, you also print text. In
fact, you will print two kinds of text: the
full detailed text and the brief text. Both
forms of text are obtained from Real-Trieve
when you enter a listing number.

The order of printing depends on how your
terminal setup was established. The order of
printing can be changed, but only by the
individual who is authorized to do this.

Only one Real-Trieve listing's photo and text
can be printed with each press of the F6
(PH PRT) function key. Once you have
displayed the text for another listing number,
press F6 again to request a printed photo.
The F6 (PH PRT) function is available from
both the photo display and the Real-Trieve
on-line communications display.

For listings with multiple photos, the last
photo displayed from Real-Trieve will be the
one which is printed. You will have to press
F6 (PH PRT) several times to print all photos
from a single Real-Trieve listing.

When displaying photos retrieved from Moore's Real-Trieve on-line information system, you also have an opportunity to save the displayed photo in a named photo file. Also saved in a photo file are the brief text which appears beneath a displayed photo and the full text for the listing from which the photo was obtained. All of these are stored together with a named photo in a photo file on your fixed or floppy disk.

Descriptive text can also be stored in a Photo-Term text file on your fixed or floppy disk. A discussion of text files is provided in Chapter 10: Copying Text from On-line Information System to PC File.

When saving photos, you save only one photo at a time. Each photo when saved is assigned a name. For listed properties with multiple photos, each photo can be constructed on the display screen in succession.

The process of saving a photo will always select the most recent photo constructed for saving into the photo file. For instructions on displaying multiple photos, see Chapter 8: Displaying Multiple Photos.

When a photo is retrieved from a Real-Trieve listing, the first photo associated with the listing is always displayed in the upper left quadrant of your monitor screen. Second and successive photos, up to a maximum of sixteen, will be displayed one at a time in the upper right quadrant of your monitor screen.

As soon as you have displayed any one photo on your monitor screen, you will be able to save it in a photo file. Only the last photo constructed is eligible to be saved.

This process consists of the following procedure:

1. Request the Real-Trieve function PHO.

2. Type a listing number after the prompt for LISTING NUMBER(S)?___ and press the RETURN key.

3. Select the function key F8 from the on-line display. This permits you to obtain a menu and display of existing photo files.

4. From the menu, either select an existing photo file name or name and use a new photo file. You then immediately return to the on-line display.

5. Select the function key F7 from the on-line display. You obtain a display which prompts you to name the photo. You type in a photo name and press the RETURN key. The photo is saved. (The destination for the saved photo is in the file you selected or created. Photos are always added to the file.)

6. Optionally, you can print the photo last displayed and saved by selecting function F6 from the on-line display.

To begin the process of saving photos and text from Real-Trieve listings, your first step is to obtain the Real-Trieve prompt for a FUNCTION?__.

(If you are not familiar with establishing your link to the host computer and to Real-Trieve, follow the procedure in Chapter 6: Establishing Your Link to Moore's On-line Information System Real-Trieve.)

You should observe on your monitor screen the on-line display. The prompt for a function should appear near the bottom of the screen.

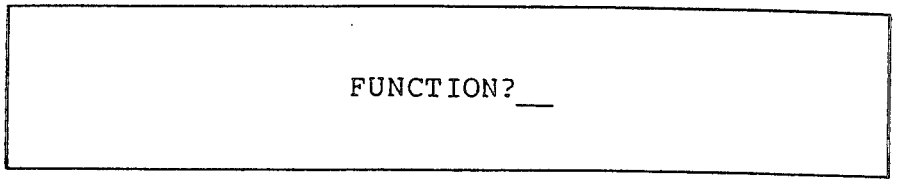
FUNCTION?__

Type the command PHO after the prompt. Then, your screen should appear as follows:

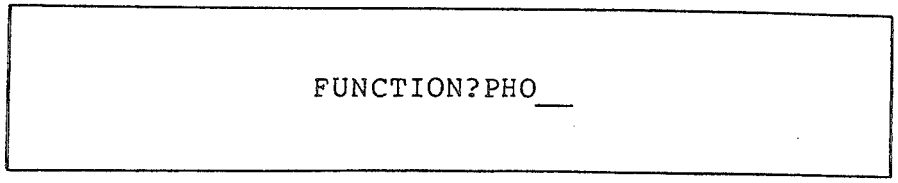
FUNCTION?PHO__

After you have typed the letters PHO, press the RETURN key. The computer will then prompt you for a listing number as shown in the following screen.

```
┌─────────────────────────────────────────────────┐
│                                                 │
│            LISTING NUMBER(S)?__                 │
│                                                 │
└─────────────────────────────────────────────────┘

Type the listing number for a Real-Trieve
listing that contains a photo, then press the
RETURN key. If there are no photos stored for
the listing, you will obtain the following
error message:

┌─────────────────────────────────────────────────┐
│                                                 │
│              No photos on file                  │
│                                                 │
└─────────────────────────────────────────────────┘

If this happens, you will simply be prompted
for another listing number. You cannot save
photos if there are no photos associated with
the listing. You may wish to make use of
other Real-Trieve commands to aid you in
locating listings with photos. Consult the
Real-Trieve User's Guide for further
information.

Again, you must type the listing number for a
Real-Trieve listing that contains a photo. If
the listing is correct, then a display similar
to the following will be presented on your
monitor:

┌─────────────────────────────────────────────────┐
│                                                 │
│     FUNCTION? PHO                               │
│     Display Photo                               │
│                                                 │
│     LISTING NUMBER(S)? 16664                    │
│     Photos currently on file: 1, 2, 3, 4, 5     │
│                                                 │
└─────────────────────────────────────────────────┘

Photos associated with a listing are assigned
numbers. These numbers are not necessarily
consecutive. However, these photo numbers
will always be one or greater and sixteen or
less.
```

The first listed photo for a Real-Trieve listing is automatically constructed, in four phases, on your computer display screen. The image of the photo becomes more clear in detail as the phases progress. The first photo so displayed appears in the upper left quadrant of your monitor display.

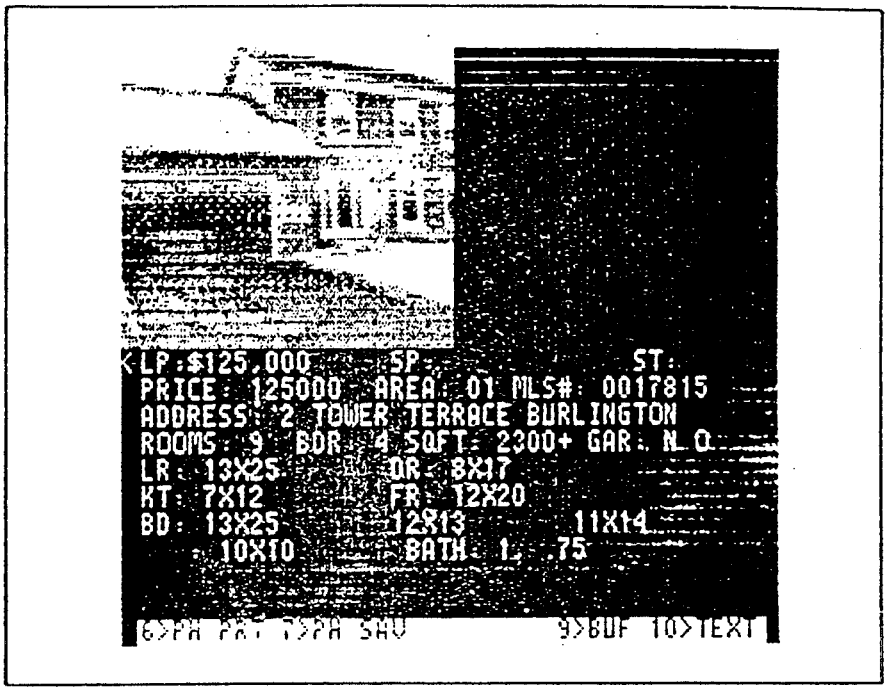

As soon as the photo is completely displayed, press the F10 function key. This causes you to immediately return to the on-line display. This is the first photo you will be able to save.

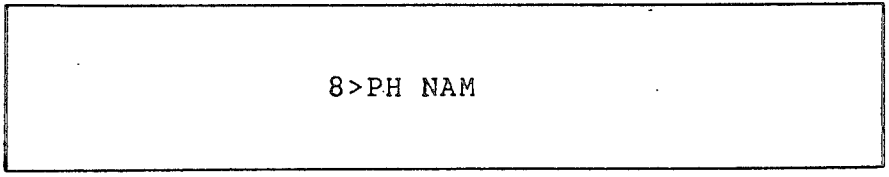

By pressing the function key F8, you obtain a display of existing photo files. The current photo file is highlighted on your screen. (It appears brighter and in dark letters surrounded by a bright box.) If this is the photo file that you intend to use, then you only have to select function F10 from this menu to accept this name for the photo file and use it in the steps that follow.

```
┌─────────────────────────────────────────────────────────────┐
│  ┌───────┐                                                  │
│  │ PTERM │                                                  │
│  └───────┘                                                  │
│                                                             │
│                                                             │
│                                                             │
│       Use cursor keys to choose an existing photo file.     │
│                                                             │
│       <F1>  Cancel                                          │
│                                                             │
│       <F9>  Name and use new photo file                     │
│       <F10> Use highlighted photo file                      │
│     Press the appropriate function key to make your selection│
│                                                             │
│                                                             │
└─────────────────────────────────────────────────────────────┘
```

Photo-Term provides you with a default
filename. This file will always exist
any time you use Photo-Term in the process of
saving photos from the Real-Trieve system.
This default photo filename has been
established as PTERM. It will be empty of
photos unless you decide to store photos
there. Should the file PTERM at any time be
deleted, Photo-Term will create it again.

If you decide to create a new photo file at
this time, you must remember the following:

- Filenames can consist of one to eight
  characters, including numbers, blanks, and
  other characters.

- The filename cannot be the name of a file
  which already exists. For example, you
  cannot use the filename PTERM.

To name and create a new photo file, select
function key F9 as your choice from the menu
which displays the photo filenames. As soon
as you have pressed the F9 function key, your
monitor screen will display an input screen
where you may type the name of a new photo
file as shown in the following illustration.

```
┌─────────────────────────────────────────────────────────────┐
│                                                             │
│                                         <F1>  Cancel        │
│       Use BackSpace to correct your input                   │
│       Enter the name of the photo file to use.              │
│       LARSEN_                                               │
│                                                             │
└─────────────────────────────────────────────────────────────┘
```

Type carefully your choice of a name for a new photo file. Then press the RETURN key. As soon as you do this, Photo-Term creates the photo file with the name you have typed. It is initially empty of any photos. You are then immediately returned to the on-line display.

```
|PTERM|

Use cursor keys to choose an existing photo file.

<F1>  Cancel

<F9>  Name and use new photo file
    <F10> Use highlighted photo file
 Press the appropriate function key to make your selection
```

While observing the display of existing photo filenames, observe that one is already highlighted (brighter than the other filenames and appearing in dark letters surrounded by a bright box). This is the current choice for a photo filename. Your display can show you up to a maximum of 144 photo filenames. At fewest, it will show you only one name, the photo file named PTERM. The photo filenames are listed in a column format, with up to eight vertical columns of eighteen filenames per column.

To select a photo filename other than the one currently highlighted, you use the cursor arrow keys on the numeric keypad to reposition the highlighted box. The box will always move in the direction of the arrow labeled on the key that you press. (If the computer should "beep" when an arrow key is pressed, you have the NUM LOCK key shifted. If this happens, press NUM LOCK and you will be able to use the arrow keys.)

As soon as the highlighted box surrounds the existing photo filename of your choice, simply press the F10 function key to confirm your choice. Photo-Term will now use this selected photo file in the steps which follow to save a photo.

> Should you press the F1 function key from the menu and display of photo filenames, no change in selection is made and no new photo file is created. The photo file that was current when you arrived at the menu and display of photo filenames will remain as the current photo file to be used.

After selecting an existing photo file or creating a new photo file, you will return to the on-line display.

```
7>PH SAV
```

The saving of a photo into the file you have selected or created is accomplished by a two-part process which begins by your pressing the F7 function key from the on-line display. As soon as you have done this, a display appears which asks you to enter the name of a photo. The photo name that you enter must not match the name of any other photo in the photo file.

```
JOHNS1
JOHNS2
[RUSSELL]
WILLOWRD

<F1>  Cancel

Use BackSpace to correct your input
        Enter a name for the photo.
        JOHNS3
```

Type the name for the photo you are about to save. Observe that you have spelled the name exactly as you wish. Then press the RETURN key.

Photo-Term saves the photo that was last displayed into the photo file selected or created by you.

If the photo name you selected already exists in the file, a message will be displayed and you will be allowed to try again.

```
JOHNS1
JOHNS2
RUSSELL
WILLOWRD

<F1>  Cancel

Use BackSpace to correct your input
A photo with this name exists; enter a new name for photo.
JOHNS2
```

A photo file has a maximum capacity of 48 photos. If you have attempted to use a file which already contains 48 photos, you will receive a message indicating that the file is full of photos.

If the file is full, you must back up to step 4 and either create a new file or select a different one.

YOU CANNOT DELETE PHOTOS OR PHOTO FILES WHILE COMMUNICATING WITH THE HOST COMPUTER AND REAL-TRIEVE.

Assuming no errors, the named photograph is then saved and you immediately return to the on-line display.

```
┌─────────────────────────────────────────────┐
│                                             │
│               6>PH PRT                      │
│                                             │
└─────────────────────────────────────────────┘
```

If you choose to print the photo last displayed, this is a good time to do it. You simply press the F6 function key from the on-line display. The phrase PH PRT brightens in green until the printing is completed. You will receive a prompt to align the forms in your printer, make it ready, and press any key to continue. Photo printing is discussed in detail in Chapter 8: Displaying Multiple Photos.

If the Real-Trieve listing has multiple photos, you will be able to respond to the prompt for the next photo at this time (unless this was the last or only photo for the listing).

If you wish to continue to save another photo in the same photo file as last used, you simply follow these steps:

1. From the on-line display press the F7 function key. Type a new name for the photo you wish to save. Then press the RETURN key.

At this point, the photo has been saved in the current photo file and you have returned to the on-line display.

2. Optionally, press function key F6 if you wish to print the photo.

You can continue to repeat these three steps until one of the following occurs:

- You finish putting photos into the current photo file.

- The file becomes full with photos.

Remember, at any time that you wish to create a new photo file or select a different existing photo file, you can press the F6 function key from the on-line display.

Photo names and photo filenames must be unique. Choose names that will be easy for you to identify at a later time, perhaps when you decide to confer with a client. Filenames consist of from one to eight characters. Photonames consist of from one to twenty-five characters. This includes any blanks or punctuation.

It is suggested that you choose names that will have the strongest meaning for you. For example, you might use the following:

- The client's name.

- The property address in abbreviated form.

- The listing number of the Real-Trieve listing from which the photo was taken.

- Your name or initials (particularly if you are sharing the use of Photo-Term with others).

Whether you display photos from Real-T. listings or not, you have an opportunity save the complete text associated with a Real-Trieve listing. When saved, the text from a Real-Trieve listing is stored in a Photo-Term text file. The text file can be stored on your fixed or floppy disk.

Photos and the "brief" text of a Real-Trieve listing are stored in a photo file, not a text file. The procedure to save photos and brief text are discussed in Chapter 9: Copying Photos from On-line Information System to PC Photo File.

When saving text from a Real-Trieve listing, you add the text to the text file. In this way, if any text was previously stored in a given text file, that text remains as you simply add to the text that is already there. There can be as much text as you wish in a text file and from as many Real-Trieve listings as you wish. The only limit depends on the amount of unused space on the fixed or floppy disk that you are using to store the text file.

The process of saving text consists of the following steps:

1. Press the ESC (Escape) key at any time to obtain a Real-Trieve prompt for a function. Do not type a function yet.

2. Select the function key F5 from the on-line display. This permits you to obtain a menu and display of existing text files.

3. From the menu, either select an existing text file to which you intend to add text or name and use a new and empty text file. You then immediately return to the on-line display.

4. Select the function key F4 from the on-line display. The phrase "TX SAV" turns a green color. Any text displayed will be automatically added to the file that you selected or created.

5. Now type a Real-Trieve command in response to the FUNCTION?__ prompt and press the RETURN key. The text will automatically be added to the text file. You can repeat this step for additional functions if you wish.

6. Optionally, if you wish to print text even as you display it and save it, you can do so at any time by pressing the F3 function key from the on-line display. When you later press F3 again, the printing will stop.

7. When you have saved all the text you desire, press F4 again from the on-line display. The phrase "TX SAV" will change from green to black. You will have stopped saving text.

To begin the process of saving text from Real-Trieve listings, your first step is to obtain the Real-Trieve prompt for a FUNCTION?__.

(If you are not familiar with establishing your link to the host computer and to Real-Trieve, follow the procedure in Chapter 6: Establishing Your Link to Moore's On-line Information System Real-Trieve.)

Upon your monitor screen you should observe the on-line display. The prompt for a function should appear near the bottom as shown in the following screen. In Real-Trieve, you may press the ESC (Escape) key at any time to display this prompt.

```
┌─────────────────────────────────────────────┐
│                                             │
│                 FUNCTION?__                 │
│                                             │
└─────────────────────────────────────────────┘

┌─────────────────────────────────────────────┐
│                                             │
│                                             │
│                  5>TX NAM                   │
│                                             │
│                                             │
└─────────────────────────────────────────────┘

By pressing the function key F5, you obtain a
display of existing text files. The current
text file is highlighted on your screen. If
this is the text file that you intend to use,
you only have to select function key F10 from
this menu to accept this name for the text
file and use it in the steps to follow.

┌─────────────────────────────────────────────┐
│ PTERM                                       │
│                                             │
│                                             │
│                                             │
│                                             │
│                                             │
│                                             │
│                                             │
│      Use cursor keys to choose an existing text file. │
│                                             │
│      <F1> Cancel                            │
│                                             │
│      <F9>  Name and use new text file       │
│      <F10> Use highlighted text file        │
│    Press the appropriate function key to make your selection │
└─────────────────────────────────────────────┘

Photo-Term provides you with a default
filename. This file will always exist any
time you use Photo-Term in the process of
saving text from the Real-Trieve system.
This default text filename has been
established as PTERM. It will be empty of
text unless you decide to add text to it.
Should the file PTERM at any time be
deleted, Photo-Term will create it again.
```

If you decide to create a new text file at this time, the following two things should be remembered:

- Filenames can consist of one to eight characters, including numbers, blanks, and other characters.

- The filename cannot be the name of a file which already exists. For example, you cannot use the filename PTERM.

To name and create a new file, select function key F9 as your choice from the menu which displays the text filenames. As soon as you have pressed the F9 function key, your monitor screen will display an input screen where you may type the name of a new text file.

```
                                    <F1>  Cancel

Use BackSpace to correct your input
    Enter the name of the text file to use.
    THOMAS_
```

Type carefully your choice of a name for a new photo file. Then press the RETURN key. As soon as you do this, Photo-Term creates the text file with the name you have typed. It is initially empty of any text. You are then immediately returned to the on-line display.

While observing the display of existing text filenames, observe that one is already highlighted. This is the current choice for a text filename. Your display can show you up to a maximum of 144 text filenames. At fewest, it will show you only one name, the text filename of PTERM. The text filenames are listed in a column format, with up to eight vertical columns of eighteen filenames per column.

```
PTERM

Use cursor keys to choose an existing text file.

<F1>  Cancel

<F9>  Name and use new text file
                <F10> Use highlighted text file
              Press the appropriate function key to make your selection
```

To select a text filename other than the one currently highlighted, you use the cursor arrow keys on the numeric keypad to reposition the highlighted box. The box will always move in the direction of the arrow labeled on the key that you press. (If the computer should "beep" when an arrow key is pressed, then you have the NUM LOCK key shifted. If this happens, press NUM LOCK and you will be able to use the arrow keys.)

As soon as the highlighted box surrounds the existing text filename of your choice, simply press the F10 function key to confirm your choice. Photo-Term will now use the selected text file in the steps which follow to add text to a text file.

> Should you press the F1 function key from the menu and display of text filenames, no change in selection is made and no new text file is created. The text file that was current when you arrived at the menu and display of text filenames will remain as the current text file to be used.

After selecting an existing text file or creating a new text file, you will return to the on-line display.

```
4>TX SAV
```

The adding of text to the text file that you selected or created is authorized by your pressing the function key F4 from the on-line display. (This causes the phrase TX SAV to brighten in a green color.) As soon as text is displayed that text will also be added to the text file.

All the while, the FUNCTION?__ prompt has remained on the on-line display. Type a Real-Trieve command following the prompt and then press the RETURN key. As text appears on your monitor screen, it is also added to the text file. If you have another command for which you wish to add text to the text file, just type the command for each FUNCTION?__ prompt that appears.

You can continue to do this indefinitely or until you have added all the text that you wish to add.

YOU CANNOT DELETE ADDED TEXT OR TEXT FILES WHILE COMMUNICATING WITH THE HOST COMPUTER AND REAL-TRIEVE.

Assuming no errors, you have completed adding text and are looking at another prompt for FUNCTION?__, all the while viewing the on-line display.

```
3>TX PRT
```

If you choose to print text as you display it and add it to the text file, this is a good time to do it. You simply press the function key F3 from the on-line display. The phrase TX PRT brightens in a green color when you do this. You will receive a prompt to align the forms in your printer and make it ready.

As you perform the text saving function as described previously, the text is displayed on your monitor and printed at the same time.

To cease printing at any time, simply press the function key F3 from the on-line display again. The bright green color of the phrase TX PRT disappears and printing ceases. (You can still display text on your monitor.)

More information on text printing is provided in Chapter 7: Getting a Listing and Displaying a Photo.
While adding text to a text file, the phrase TX SAV remains in a bright green color on the on-line display. One more press of the function key F4 removes the bright green color from the phrase and discontinues the adding of text to the current text file.

```
4>TX SAV
```

As text is displayed on your monitor screen, you can print text displayed even though you are not adding it to the text file. Before typing a listing number, press the function key F3 once so that the phrase TX PRT is brightened in a green color. Then type a listing number and press the RETURN key. The text will be both displayed and printed. To discontinue printing, press the function key F3 again so that the bright green color disappears.

```
3>TX PRT
```

At any time while you are typing typing Real-Trieve commands and responses to prompts and displaying text on your monitor while adding text to the text file, you can stop and change text files or create a new and empty text file.

If you have been adding text, pressing the function key F5 from the on-line display will take you to the menu and display of existing text filenames. The text file to which you are adding text is closed; no more text is added. From the menu you can then select a different existing text filename or create a new text file. Or, if you change your mind, you can select the same text file again. Whether you create a new file or use an existing file, the file you use is the one to which text is added. The procedure for using this menu has been described previously.

When you return to the on-line display, you will need to once again press the function key F4 to resume text addition, but this time to the newly selected or created file.

Text filenames must be unique. Choose names that will be easy for you to identify with at a later time, perhaps when you decide to confer with a client. The name can consist of from one to eight characters. This includes any blanks or punctuation.

It is suggested that you choose names that will have the strongest meaning for you. For example, you might use the following:

- The client's name.

- The property address in abbreviated form.

- The listing number.

- Your name or initials (particularly if you are sharing the use of Photo-Term with others).

One of the most useful features of Photo-Term is the ability to save photos and associated brief text in a photo file stored on your computer.

When saving photos (see Chapter 9: Copying Photos from On-line Information System to PC Photo File), each photo file is given a unique name. This name is added to a directory of names which can later be displayed from a menu. At a later time, you can select from the menu a named photo file from which you can retrieve one or more photos.

Each photo file has the capacity to store up to forty-eight individual photos. Only the amount of disk storage limits the number of photo files you may store.

Because photos are stored locally in your own computer's photo files, you will be able to display and print the photos and brief text even though you are not in communication with the host computer system. With this capability of Photo-Term you can build a portfolio of selected Real-Trieve listings for a client to see in advance of the client's visit to your office.

By using a printer, you can print the portfolio of photographs and text, repeatedly if desired. You can take these with you to an open house or to a meeting with a client. In this way, you can assemble customized brochures of specific Real-Trieve listings.

To display and print photos from a PC photo file, perform the following steps:

1. Type the command: PTERM to display the main menu.

2. Press the F8 function key.

3. Obtain the photo display and menu and select a function.

4. Obtain the photo file menu and select a photo file.

5. Press F7 to display the first photo and select a function.

6. Display more photos if desired.

```
A>PTERM
```

To display photos from a previously saved PC photo file, first start the computer from DOS. Then as soon as the DOS prompt appears, type the command PTERM and press the RETURN key. (This procedure was discussed in detail in Chapter 5: Getting Started with Photo-Term.)

This will take you to the Photo-Term main menu as shown on the following page.

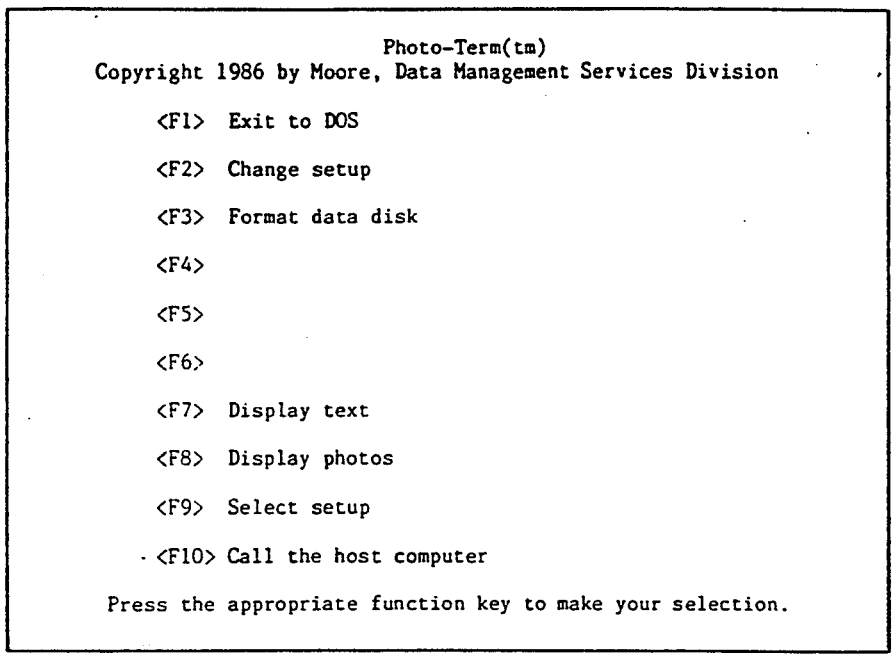

```
                    Photo-Term(tm)
    Copyright 1986 by Moore, Data Management Services Division <F1>  Exit to DOS <F2>  Change setup <F3>  Format data disk

<F4>

<F5>

<F6>

<F7>  Display text

<F8>  Display photos

<F9>  Select setup

<F10>  Call the host computer

Press the appropriate function key to make your selection.
```

Once you have obtained the main menu, you prepare to display and print photos from your local PC photo files by pressing the function key F8.

By pressing the function key F8 from the Photo-Term main menu, you obtain a menu and display of existing photo names--these are the photos which exist in the photo file PTERM.

If there is no photo file PTERM, then it is created. When a photo file is created, it is empty of photo names. No photo names will appear on the display if the photo file PTERM is empty.

```
    ADA
    ADAMS2
    ADAMS4
    SMITH
    TAYLOR
    SWANSON

Use cursor keys to choose a photo.
                    <F1>  Cancel
                    <F2>  Erase highlighted photo.
                    <F3>  Mark highlighted photo for moving.
                    <F6>  Photo print
                    <F7>  Display highlighted photo
                    <F8>  Select another photo file
                    <F9>  View buffer with full listing
                    <F10> Switch to photo
```

The names of photos are listed in up to eight columns of as many as eighteen filenames in each column. As soon as you have obtained this menu, you can do the following:

- Return to the main menu.

- Erase a photo from the file.

- Move a photo.

- Print a photo.

- Display a highlighted photo.

- Select another photo file.

- View the text buffer with full listing.

- Switch to viewing a photo.

The menu allows you to choose from several functions as indicated by the following function keys:

F1 - When the function key F1 is pressed, you are immediately returned to the main menu. Use this function whenever you have completed the tasks of displaying and printing photos.

F2 — The function key F2 is the means by which you eliminate photos you no longer need. BE CAREFUL WHEN USING THIS FUNCTION! The photo which is deleted is the current photo for which the name is highlighted with a bright box. You must be certain that you have chosen the correct photo name, because a photo, once deleted, is <u>permanently</u> deleted.

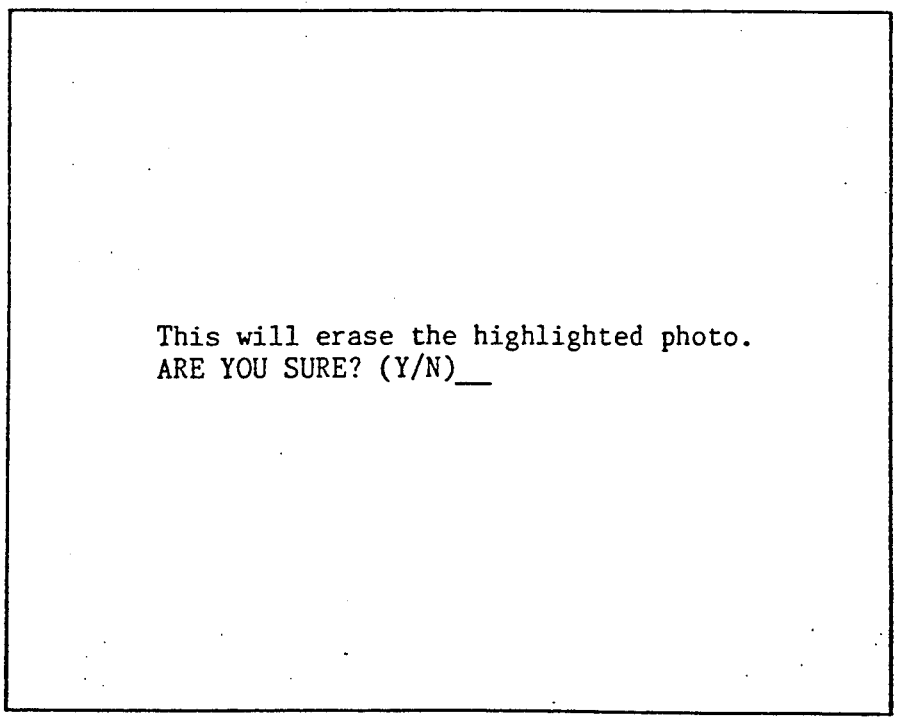

A message: "ARE YOU SURE? (Y/N)__" appears to confirm your request to delete a photo. Respond with "y" (yes) to complete the deletion of the photo. Respond with "n" (no) to cancel the deletion.

F3 — This function allows you to mark a highlighted photo in order to move it to a new position in the sequence of photos in the photo file. Press F3 once to mark the photo. Move the highlighted box using the cursor arrow keys to another photo name before which the marked photo is to be added. When the highlighted box is positioned, press F3 again.

F6 — This function prints a photo and brief and full text listings. A message prompts you to adjust the forms and make the printer ready. The sequence of printing is determined in the terminal setup for your computer.

F7 - F7 displays the photo that is currently
     highlighted from the photo file at the
     time you press this key.  Before pressing
     F7 to construct a photo, be sure to
     position the highlighted box on the photo
     name of your choice.  Use the cursor
     arrow keys to accomplish this.

F8 - Pressing F8 takes you to another menu
     from which you can select another photo
     filename.  Above the menu appears a
     display of up to 144 photo filenames.  A
     more detailed discussion of selecting a
     different photo file follows.

F9 - Pressing F9 switches you to a view of a
     four-page buffer display which contains
     the full text associated with the listing
     from which the photo was taken.  Once you
     view the buffer, you can use the HOME,
     END, PgUp, PgDn, and cursor arrow keys to
     alter your view of the text within the
     buffer.  Pressing F1 cancels viewing the
     buffer to return to the photo name menu.

F10 - Once you have displayed a highlighted
      photo, you can switch to the photo
      quickly by pressing F10.  This is because
      the photo last displayed is still
      remembered in computer memory.

From the menu obtained by pressing F10,
you are given a display, in up to three
columns, of the photo filenames assigned to
the photo file that you previously selected.
Each photo filename represents a photo that
you can select, display, and print.

```
JAMES
POLK
PTERM
RILEY
TORRENS

Use cursor keys to choose an existing photo file.
       <F1> Cancel

<F9>  Erase highlighted photo file
       <F10> Use highlighted photo file
     Press the appropriate function key to make your selection.
```

From this menu, you can request several different functions by choosing from the following function keys:

F1 - The function key F1 when pressed returns you immediately to the main menu. Use this function when you are through displaying and printing photos from the current photo file you are using.

F9 - This function erases the currently highlighted photo file. BE CAREFUL WHEN USING THIS FUNCTION! When you erase a photo file, you erase all of the photos in the file. The photo file to be deleted when the F9 function key is pressed is represented by the photo name which is highlighted by the bright box. If you wish to move the highlighted box to a different photo filename, use the arrow keys located on the numeric keypad of your keyboard.

```
This will erase the highlighted photo file.
ARE YOU SURE? (Y/N)__
```

A message: "ARE YOU SURE? (Y/N)__" appears to confirm your request to delete the photo file. Press "y" (yes) to complete the deletion of the photo file. Respond with "n" (no) to cancel your request to delete the photo file.

F10 - This function uses the photo file for which the photo filename is highlighted. Before pressing the F10 function key, position the highlighted box to the correct name by using the arrow keys from the numeric keypad of your keyboard. When F10 is pressed, you return to the photo name menu, and the photo names displayed will be from the file you use there.

From the photo name menu press the F7 function key to display the selected photo on your monitor as shown in the following screen.

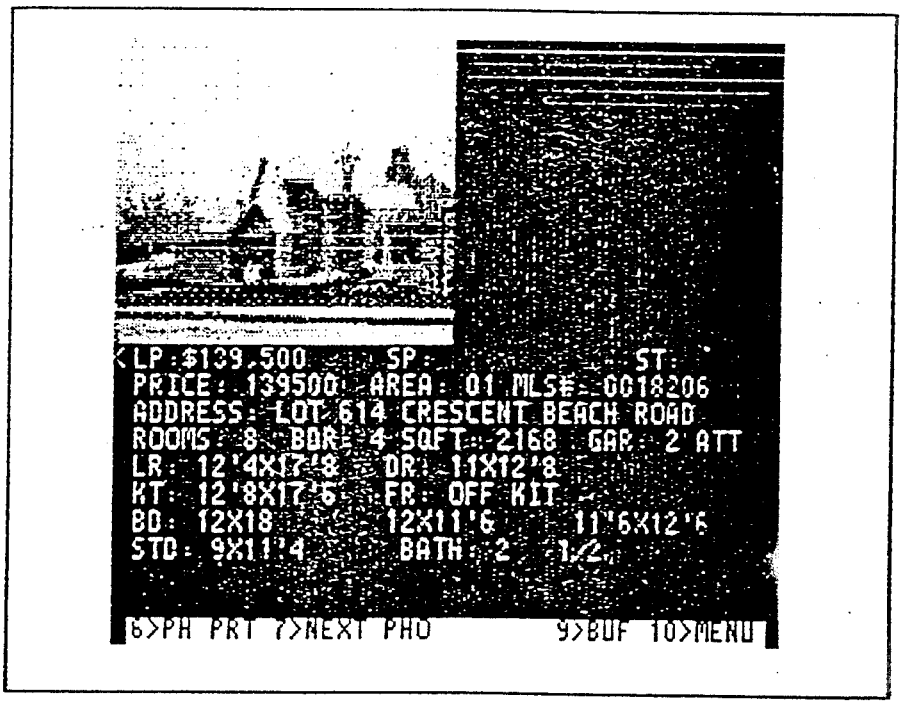

Once a photo is displayed in the upper left quadrant of the monitor screen, you have four functions available to you using the following function keys:

6>PRT PHO   Selecting this function by pressing the F6 function key prints the last photo displayed, along with the brief text that appears on the monitor screen.

7>NEXT PHO  Selecting this function by pressing the F7 function key displays the next photo from the current photo file you are using. This saves you the trouble of returning to the menu to select another photo name.

9>BUF       Selecting this function by pressing the F9 function key switches your display to a view of the four-page buffer of text (which was stored with the photo).

10>MENU     Pressing the F10 function key immediately returns you to the menu and display of photo names.

A photo file may contain a maximum of forty-eight photos. After selecting and displaying one photo, you can choose to select additional photos via the function key F7.

Each additional photo will appear in the upper right quadrant of your monitor screen. Any last photo displayed in the upper right quadrant is replaced by the next one displayed. The first photo displayed always remains in the upper left quadrant.

A useful feature of Photo-Term is the ability to add the full text associated with a Real-Trieve listing to a text file stored on your computer.

When adding text from a Real-Trieve listing to a text file (this procedure was discussed in Chapter 10: Copying Text from On-line Information System to PC Text File), each text file is given a unique name. This name is added to a directory of names which can later be displayed from a menu. At a later time, you can select from the menu a named text file and print the text contained in the file.

Because the text files are stored locally in your own computer's disk storage, you will be able to print all the text stored in any text file even though you are not in communication with the host computer system.

To print text from a PC text file, perform the following steps:

1. Type the command: PTERM to display the main menu.

2. Press the F7 function key.

3. Obtain the text display and menu line.

4. Select a different text file.

```
A>PTERM
```

To prepare for the printing of text from a text file, first start the computer from DOS. As soon as the DOS prompt appears, type the command PTERM and press the RETURN key. (This procedure was discussed in Chapter 5: Getting Started with Photo-Term.)

This will take you to the Photo-Term main menu as shown in the following screen.

```
              Photo-Term(tm)
   Copyright 1986 by Moore, Data Management Services Division <F1>  Exit to DOS <F2>  Change setup <F3>  Format data disk

<F4>

<F5>

<F6>

<F7>  Display text

<F8>  Display photos

<F9>  Select setup

<F10> Call the host computer

Press the appropriate function key to make your selection.
```

Once you have obtained the main menu, you display text from your local PC text files by pressing the function key F7.

By pressing the F7 function key from the main menu, you obtain a display of the first twenty-four lines of text from the text file PTERM. If the file does not exist it can be created. However, if the file PTERM is just created, it would contain no text and the screen would be blank.

On even a blank text display a menu line appears at the bottom of the display as shown in the following illustration.

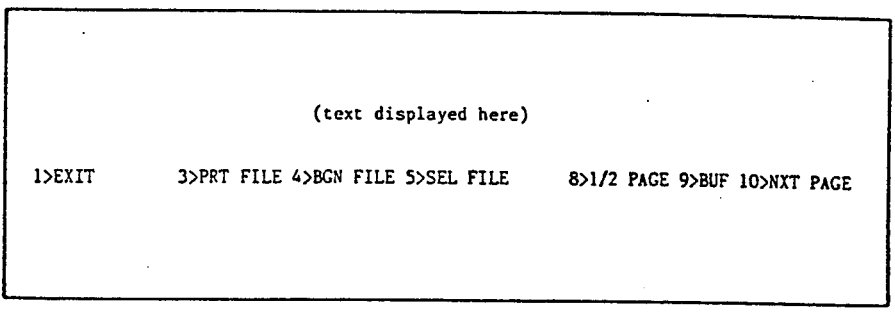

The following functions are available from the text display:

F3 — Pressing this key begins a process which prints all of the text contained in the current text file. Make sure you have selected the correct file (using F5) before you begin this process. Once F3 is pressed, a message will prompt you to adjust the forms in your printer and make it ready.

Using this function can cause a lot of printing as it prints all the text in the file, not just that which is displayed.

F4 — If you wish to reset the display to the beginning of the text in the text file, press F4. Functions F8 and F10 advance the text forward on your display. Pressing F4 when you are at the beginning of a file will cause the computer to "beep."

F5 — Use this function to select a different text file to display. Initially, any text in the default file PTERM is displayed. If this is not the file you wish to display or print text from, then press F5 to select a different file. More discussion on this follows.

F8 – Pressing F8 advances the text on your display one-half page (twelve lines) forward. If you have reached the end of the text file, the computer will "beep."

F9 – The F9 function key switches you to a four-page buffer (memory storage) display. This is the only way to look backward through the text in the file, except to return to the very beginning using the F4 key. When you press F9, the menu line changes.

Use HOME, END, PgUp, PgDn, and the cursor arrow keys to adjust your view of the buffered text.

When you are through viewing the buffered text, press F1 (Cancel) to return to the original menu line.

F10 – The F10 key advances the text one full page (twenty-four lines). When the end of the text file has been reached, pressing F10 causes the computer to "beep."

From the text display, press F5 (SEL FILE) to obtain the text file display and menu. The names of text files are listed in up to eight columns of as many as eighteen filenames in each column. As soon as you have obtained this menu, you can do the following:

- Return to the main menu.

- Erase a text file and all text stored within.

- Use a text file and display the text.

```
MPLS
STPL
|PTERM|
BLOOM
RICHFLD

Use cursor keys to choose an existing text file.
        <F1>  Cancel

<F9>  Erase highlighted text file
        <F10> Use highlighted text file
      Press the appropriate function key to make your selection.
```

The menu allows you to choose from three functions as indicated by the following function keys:

F1 – When the function key F1 is pressed, you are immediately returned to the main menu. Use this function whenever you have completed the task of printing text.

F9 – The function key F9 is the means by which you eliminate text files that you no longer need. BE CAREFUL WHEN USING THIS FUNCTION! When you delete a text file, YOU DELETE ALL OF THE TEXT STORED WITHIN IT. The file which is deleted, along with all of its text, is the current text file for which the name is highlighted. You must be certain that you have chosen the correct filename because a file, once deleted, is <u>permanently</u> deleted.

A message: "ARE YOU SURE? (Y/N)__" appears to confirm your request to erase a text file. Respond with "y" (yes) to complete the deletion of the text file. Respond with "n" (no) to cancel the request to delete the text file.

F10 – The function represented by F10 uses the text from the text file. The text is displayed from that file for which the filename is highlighted. Before pressing the F10 function key, position the highlighted box to the correct name by using the arrow keys from the numeric keypad of your keyboard. This becomes the file you use to display text from as you return to the text display.

The proper use of Photo-Term depends upon the proper installation of the Photo-Term files on the fixed or floppy disk of your computer.

If you are installing Photo-Term for the first time, follow the instructions for installation provided with the Photo-Term software disk.

To configure the Photo-Term files for your installation, first start the computer from the DOS.

When the DOS prompt appears, type the command: PTERM to obtain the main menu as shown below.

```
                    Photo-Term(tm)
    Copyright 1986 by Moore, Data Management Services Division <F1>  Exit to DOS <F2>  Change setup <F3>  Format data disk

<F4>

<F5>

<F6>

<F7>  Display text

<F8>  Display photos

<F9>  Select setup

<F10> Call the host computer

Press the appropriate function key to make your selection.
```

To configure your Photo-Term communications
and terminal setup, perform the following
steps:

1. Create a configuration setup and obtain the
   main menu.

2. Select change setup (F2).

3. Type your password.

4. Select change terminal setup (F2).

5. Determine values for terminal setup (F2
   through F8).

6. Change password, if desired (F9).

7. Save terminal setup and exit (F10).

8. Determine values for communications setup
   (F3 through F8).

9. Save communications setup (F10).

When you configure the software, you create
what is called a "configuration setup." The
characteristics of a setup are saved in a file
named PTERM.CFG on your fixed disk. This file
is provided as part of your Photo-Term
software.

You can actually create multiple setups.
There can be a maximum of fifteen different
setups that can be configured. To distinguish
one setup from another, each is assigned a
name. All setups are then placed in the
configuration file--PTERM.CFG.

You most likely will have need of only one
setup, so configuration will be relatively
simple. You would need a multiple setup if
you change the type of hardware devices which
are connected to the computer or access more
than one host computer.

Now obtain the main menu by typing the command:

PTERM and pressing the RETURN key.

After you have obtained the main menu (as
shown on the following screen), press F2
(change setup).

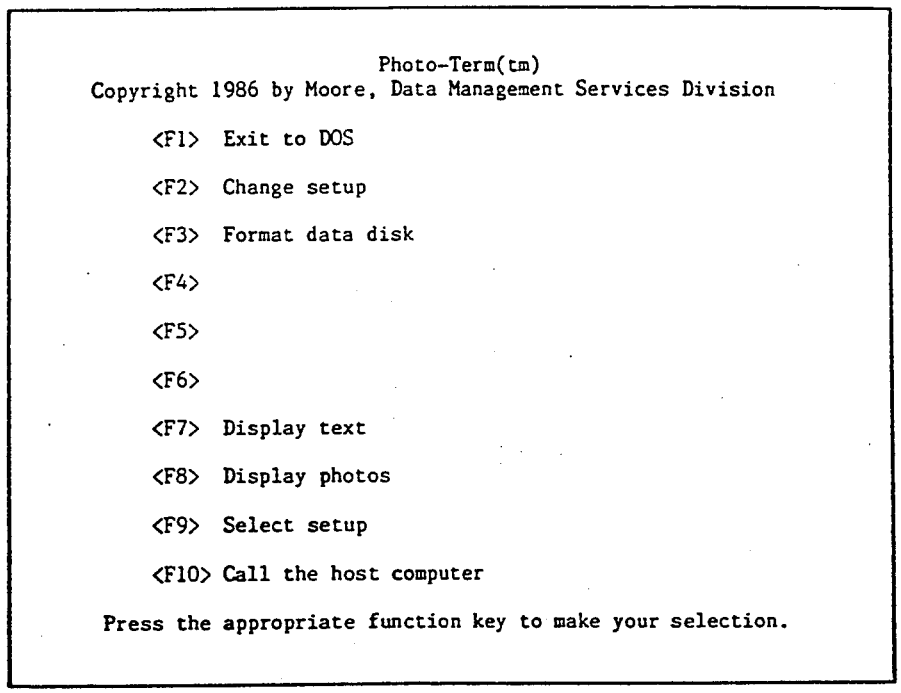

```
                       Photo-Term(tm)
       Copyright 1986 by Moore, Data Management Services Division <F1>  Exit to DOS <F2>  Change setup <F3>  Format data disk

<F4>

<F5>

<F6>

<F7>  Display text

<F8>  Display photos

<F9>  Select setup

<F10> Call the host computer

Press the appropriate function key to make your selection.
```

As soon as you have pressed F2 from the main
menu, you will proceed to a screen which
prompts you to type a password.

The password feature is designed to protect
system terminal and communications setups from being created or changed except by an authorized person.

The original password provided with Photo-Term is blank. It is up to the original user to change it.

IF YOU DO NOT KNOW THE PASSWORD, your only alternative is to press the F1 function key to "cancel" and return to the main menu.

The password is typed as shown in the following display:

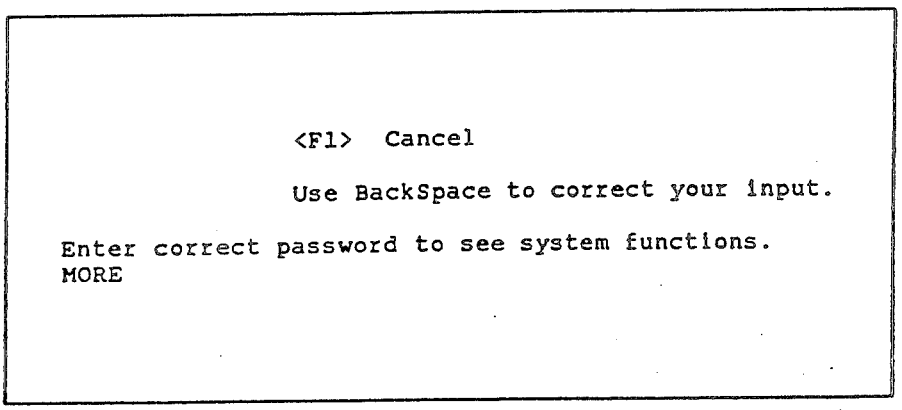

You then press the RETURN key.

If you type an incorrect password, the following message is displayed.

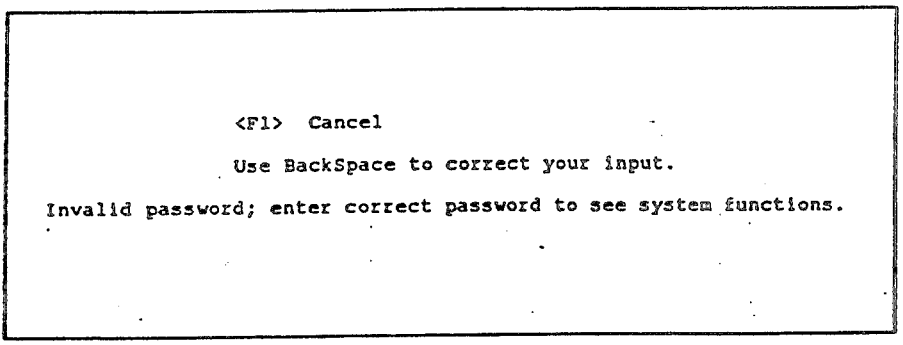

If your password is the correct one for your system, you then obtain the System Communications & Terminal Setup menu as shown in the following screen.

```
              System Communications & Terminal Setup

<F1>  Exit to main menu

<F2>  Change terminal setup

<F3>  Prefix string for autodial _____

<F4>  Phone number string for autodial _____

<F5>  Hangup string for autodial _____

<F6>  Answerback string ** HIDDEN **

<F7>  Com port number (serial port) _

<F8>  Speed (baud rate) _____

<F9>  Select setup _____

<F10> Save communications setup

Press the appropriate function key to make you selection.
```

Next, press the F2 function key from the
System Communications & Terminal Setup menu
(shown above). This produces another
menu--the System Terminal Setup menu as shown
in the following screen.

```
                    System Terminal Setup

<F1>  Exit to communications menu

<F2>  Separate photo monitor _

<F3>  Printer port _

<F4>  Printer type _____

<F5>  Printed photo size _

<F6>  Photo print sequence _____

<F7>  Data drive _

<F8>  Data path _____

<F9>  Set password _____

<F10> Save terminal setup and exit

Press the appropriate function key to make your selection.
```

Your next step is to determine several
variables which involve your attached
devices: specifically, the monitor, printer,
and fixed disk and floppy disk drives.
However, if you do not wish to change your
terminal setup, you can press the F1 function
key to return to the previous System
Communications & Terminal Setup menu.

You make the changes discussed in the
following text by remaining with
the System Terminal Setup menu and
using function keys F2 through F8.

Pressing F2 alternates between a "y" (yes) and
an "n" (no) response. The value "y" or "n" is
displayed on the setup menu.

Most likely you will have only one monitor
attached to your system. Because of this, you
will have to change pages between photograph
and text whenever you retrieve information from
the on-line system for a given listed property.

It could be that you will want to have a
second auxiliary monitor attached to the
processor in order to simultaneously display
both photographs and complete text listings.
If you are attached to an auxiliary display,
set the value "y" for yes.

Printer devices are attached by cable to the
processor unit. In some instances, multiple
ports may be available on the processor to
which you can attach a printer device. A port
is a point of attachment for the cable from
the printer to be secured to the processor
unit. Such ports are numbered, even if only
one port is available. Photo-Term needs to
know to which port you will attach the printer
for the printing of text or photos. Common
port numbers are 1 or 2. With each press of
the function key F2 the number appearing to
the right of the phrase "Printer port" on the
menu will change. Press the F2 key as many
times as necessary until the correct port
number appears on the display.

The type of printer you are using must be one of the types that appear on the System Termina Setup menu adjacent to the phrase "Printer type." Other printers are acceptable only if they are compatible with the types provided or the terminal setup, otherwise Photo-Term will not be able to print correctly. With each press of the F4 key, you change the printer type value which is displayed. Press the F4 key as many times as necessary until the correct printer type appears on the display.

When Photo-Term prints photos, the photos are printed in dimensions (height and width) which can be varied depending upon the type of printer you have selected. A number appears to the right of the phrase "Printed photo size." To change this number, press the F5 function key as many times as necessary until the desired number is displayed.

There are three types of information which can be printed using Photo-Term. This information is detailed in the following chart:

| CODE | Type of information to print |
|------|------------------------------|
| P    | photo                        |
| B    | brief text                   |
| L    | Real-Trieve listing text (full detail) |

During the operation of Photo-Term at times when you are communicating with the host computer and the Real-Trieve information system, a single request for printing can result in a printed report containing all three types of information in the sequence that you specify here.

Each type of information is represented by a code (see the above table).

For example: If you specify "PBL," the photo prints first, the brief text next, and the Real-Trieve listing text last.

If you specify "BLP", the brief text prints first, the Real-Trieve listing text next, and the photo last.

In addition, the code of "F" will cause a form feed (causing your forms to advance to the top of the next page) at any point you wish. You can specify a form feed more than once.

For example, if you specify "PBFLF," the photo prints first, followed by the brief text, then a form feed occurs. The Real-Trieve text then prints on the next page and another form feed occurs.

To type the sequence for printing in your choice, first press the F6 function key. You will obtain the following display.

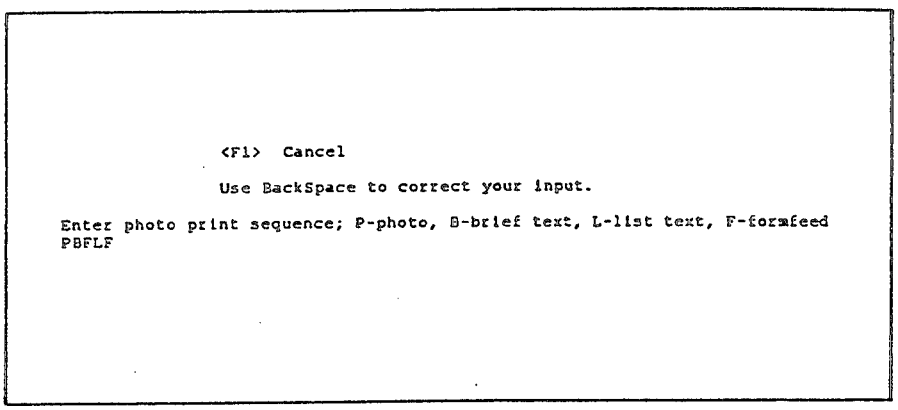

Carefully type the sequence for printing using only the codes P, B, L, and F. As soon as you have completed your entry, press the RETURN key to save the sequence that you have typed. The sequenced codes appear opposite the phrase "Photo print sequence" as you automatically return to the System Terminal Setup menu by pressing the RETURN key.

Your computer system may have from one to several floppy disk drives, also called diskette drives, and a fixed disk which may be divided into partitions. Every floppy disk drive has a lettered designation. Typically the first floppy disk drive is designated as drive A. The second floppy disk drive is designated as drive B. Partitions of the fixed disk are typically designated as C, D, E, and F.

With each press of the F7 function key, you change the letter designation for which floppy disk drive or fixed disk partition you intend to use as the place to store Photo-Term's photo files and text files.

Press F7 until the letter you wish to designate as the destination for the Photo-Term files is displayed opposite the phrase "Data drive."

A pathname is a means for files to be located on a fixed disk. When you specify the location of a file on a fixed disk, the file may be a member of a directory or a member of a subdirectory.

In the following example, an office has three salespersons. One salesperson is named SALLY. Sally's Photo-Term files will be located in a directory named SALLY.

Pressing F8 will take you to a screen where the pathname can be typed.

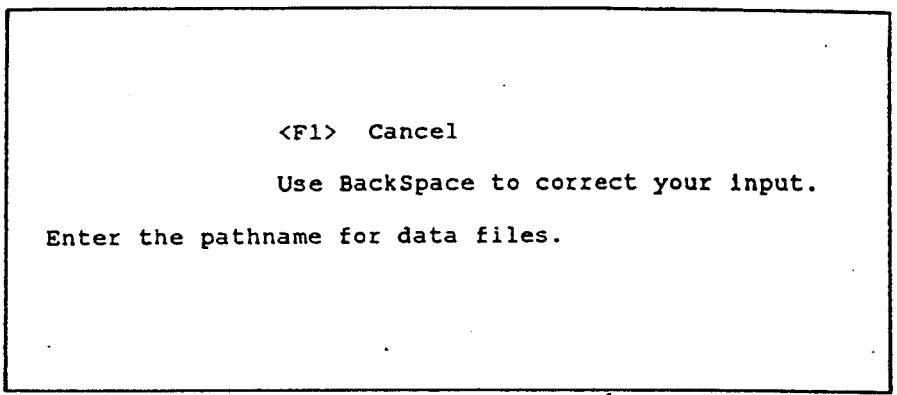

Carefully type the pathname you desire. Then press the RETURN key to accept the pathname and return to the System Terminal Setup menu. The pathname you have typed will be displayed adjacent to the phrase "Data path."

If you are recording Photo-Term files to a floppy disk, no pathname is ever required.

Since you have reached this point, it is assumed you have been informed of the correct password for being able to obtain the setup menus. If you do not know the correct password, you can skip this section.

The F9 function key takes you to an input screen where, if you desire, you can change the password to something else.

This is a step that you choose ONLY when you wish to alter the password.

First, by pressing F9, you obtain the following display.

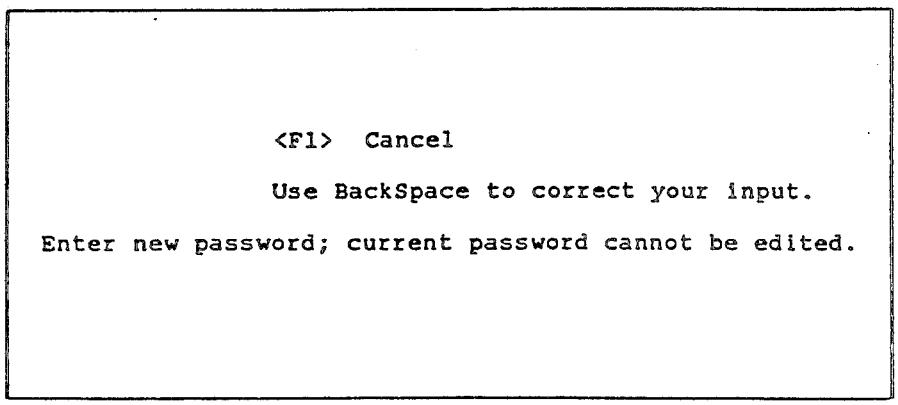

You type carefully the new password on the display. You then press the RETURN key and return to the System Terminal Setup menu.

With the password logically determined, you are returned to the System Terminal Setup menu. Now, you need to press F10 to save the terminal setup and exit.

Pressing F10 causes the following three things to happen:

- You are given a message to check your password.

- When you respond to the message the terminal setup is saved.

- You exit to the System Communications & Terminal Setup menu.

The message, when displayed, appears as shown in the following screen.

```
                        System Terminal Setup
            <F1>  Exit to communications menu
            <F2>  Separate photo monitor N
            <F3>  Printer port 0
            <F4>  Printer type EPSON B&W 80 COL
            <F5>  Printed photo size 1
            <F6>  Photo print sequence PBFLF
            <F7>  Data drive A
           ·<F8>  Data path
            <F9>  Set password leo
            <F10> Save terminal setup and exit
          Press the appropriate function key to make your selection.
Please make a note of the password you are saving.
Press any key to continue...
```

```
                              Photo-Term(tm)
       Copyright 1986 by Moore, Data Management Services Division <F1>  Exit to DOS <F2>  Change setup <F3>  Format data disk

<F4>

<F5>

<F6>

<F7>  Display text

<F8>  Display photos

<F9>  Select setup

<F10> Call the host computer

Press the appropriate function key to make your selection.
```

Your next task is to proceed through items represented by function keys F3 through F8.

These are items which determine values which affect your communications with the host computer.

A prefix string is a series of characters sent to the modem whenever you perform an autodial function when connecting to the host computer system. The value of this prefix depends upon the manufacturer's modem to which the processor is attached. See your modem user's guide or reference manual for information about this prefix.

A default value of ATDT will appear on your
menu, initially for F3. This value can be
changed by pressing the F3 key to obtain the
following input menu.

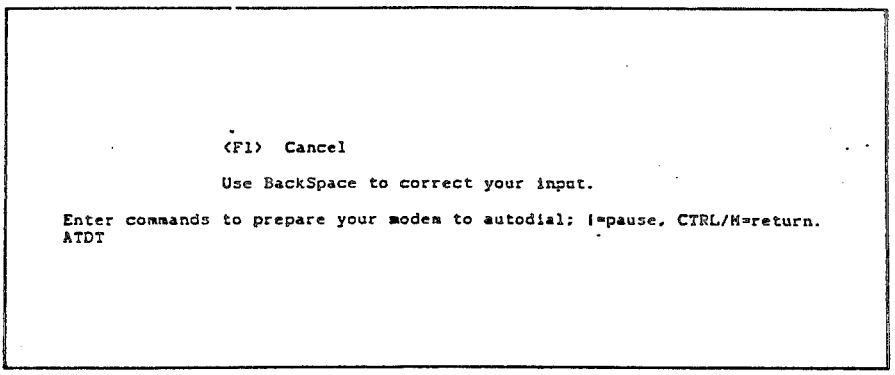

Enter the new prefix value for your modem on
the input menu area. Then press the RETURN
key on the input menu to accept the new prefix
value. Upon returning to the setup menu, the
new prefix value will be displayed.

If you do not plan on using the modem autodial
feature, type over the characters ATDT with
spaces and press RETURN.

This item is used only if you plan to use the
autodial function to connect to the host
computer.

The value to be stored is the phone number
string (a series of characters) to be
autodialed by the computer. The phone number
string of characters is sent to the modem
whenever you autodial the host computer. This
is illustrated in the following screen.

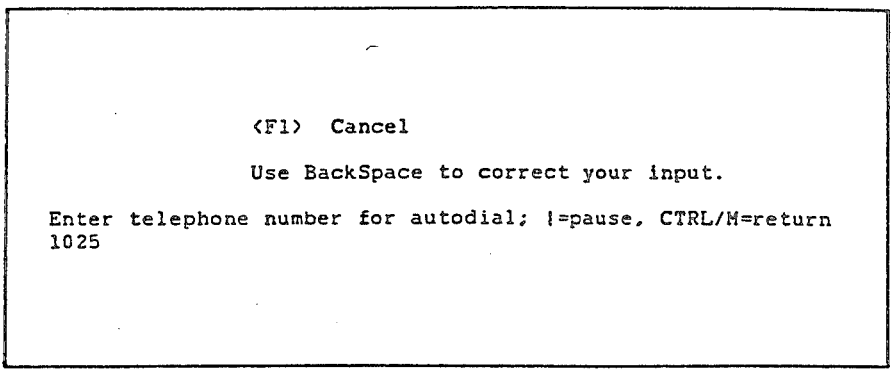

To establish the phone number for autodial in
the setup, press F4 to obtain the input menu.

Enter the telephone number string in the input field.

Then press the RETURN key on the input menu to return to the setup menu. The telephone number string will then be displayed on the setup menu.

The hangup string is used for autodial only. It is the string of characters sent to the modem whenever you return to the main menu and thus end communication to the host computer after connecting by autodial. If you do not require the hangup string, type all spaces and press RETURN.

The hangup string signals the modem to disconnect communications with the host computer. The default value is |+++ATH|, which is used for Hayes modems.

To change this value, press F5 to obtain the input menu. Key the new value for the hangup string (see your modem user's guide or reference manual) and press the RETURN key for the computer to accept the new value. Upon returning to the setup menu, the new hangup string value will be displayed as shown at the bottom of the screen in the following illustration.

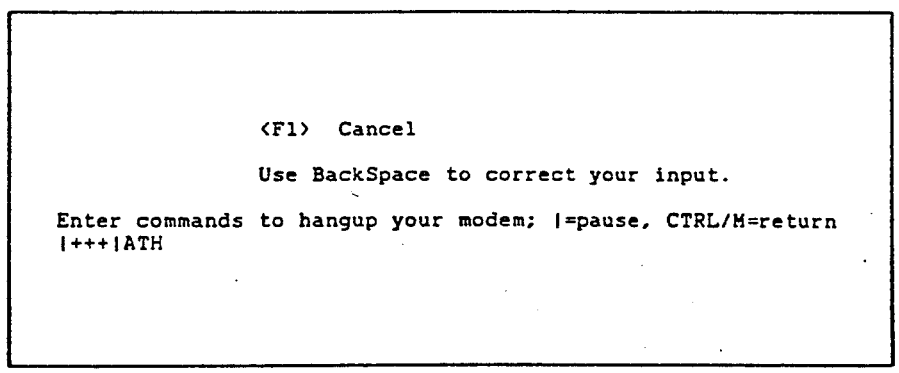

The answerback string is the string sent to the modem when the host computer makes a request for the string. It serves as a security feature so that the host computer can properly identify the user. Your host computer service representative will provide you with this value.

There is no initial default value.

To enter the answerback string, you must press
F8 to obtain the input menu. Enter the value
for the answerback string into the input field
and then press the RETURN key on the input
menu to accept the value. When you return to
the setup menu, the value  HIDDEN  will be
displayed, as the answerback field is intended
to be secure from being visually displayed.
The answerback string is keyed in the
following input screen.

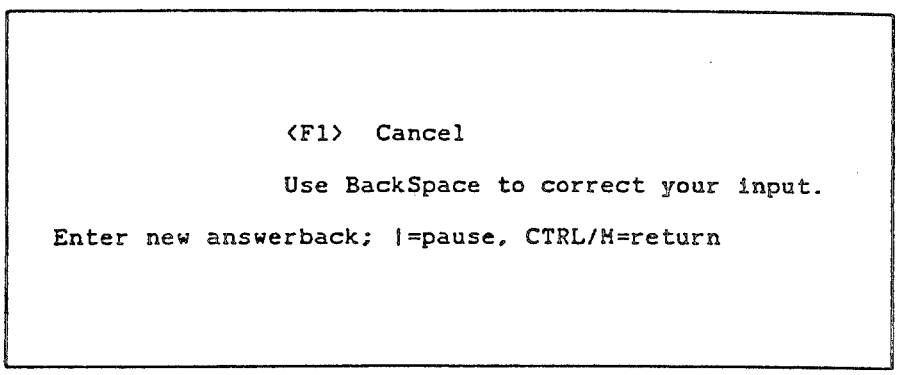

Your modem and telephone line are attached by
cable to either of two ports on the
communications adapter card located in your
processor unit. On processors with only one
port, the port is usually number 1. On
processors with two ports, the ports are
numbered 1 and 2. You must properly identify
to Photo-Term the port to which the modem and
telephone line are attached. Pressing F7
changes the number alternately between 1 and 2.

The speed or baud rate is measured in bits per
second. Common speeds are 300, 1200, 2400,
4800, and 9600 bits per second.

Your modem may be capable of receiving and
sending data at one or more of these rates.
Other modems may always send and receive data
at the same fixed rate.

Whatever rate your modem uses must be
indicated to the Photo-Term software setup.

Pressing F8 will alternate the values for the
speed. Stop at the value you wish to select.

Be sure to check your modem user's guide or
reference manual to determine the speed(s) at which your modem sends and receives data. If the modem is capable of multiple speeds, there are probably switches to be set on the modem.

The modem user's guide or reference manual will instruct you in the positioning of the switches. It is generally advisable to pick the fastest rate available that your host computer can handle.

<u>Be sure to only select speeds that can be used by the host computer system or the modem.</u>

If you have all the values on your System Communications & Terminal Setup menu exactly as you wish, you then proceed to save the terminal setup values by pressing the F10 function key.

As soon as you press F10, you obtain the following menu.

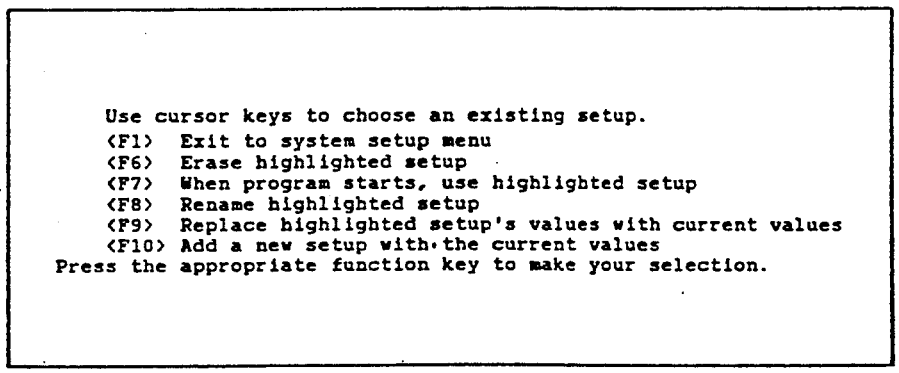

The Photo-Term file PTERM.CFG may contain up to fifteen different setups, each with its own unique name. The names of all existing setups will be displayed on this menu.

To create a new setup, the function that you require at this point is requested by the F10 function key. (The other functions will be discussed later.)

As soon as you press F10, you obtain a display where you must type a new and unique name for the setup you are about to save.

```
        <F1>  Cancel

Use BackSpace to correct your input.

Enter name for setup to be added.
```

After carefully typing the setup name of your choice, press the RETURN key. This returns you to the previous menu, and you will note the new setup name added to the list of setup names displayed.

You will also notice that the new setup name is highlighted by a bright box. The last time you started Photo-Term, a different setup (if any) was in effect. In order for you to use this setup when you start Photo-Term, press the F7 function key. This will cause Photo-Term to use the new highlighted setup the next time you start Photo-Term.

Three other functions are available from this menu and can be used when necessary. Those functions include the following:

F6 - Pressing F6 erases any of the named setups that you wish. The setup to be erased is the one highlighted at the time. You can use the cursor keys on the numeric keypad to reposition the highlight box to the setup name you wish to erase.

F8 - Pressing F8 allows you to change the name of an existing setup. You will be requested to type the new name on an input screen.

F9 - Pressing F9 replaces the highlighted communications setup using the values as currently displayed on your monitor screen. Old values stored in the setup are changed to the new values as displayed.

Once a setup is erased, it is permanently removed from the list of setup names.

When using function F7, you will be issued the message "ARE YOU SURE? (Y/N)__." This gives you a chance to confirm the removal of the setup. Respond with "y" (yes) to erase the setup. Respond with "n" (no) to retain the setup.

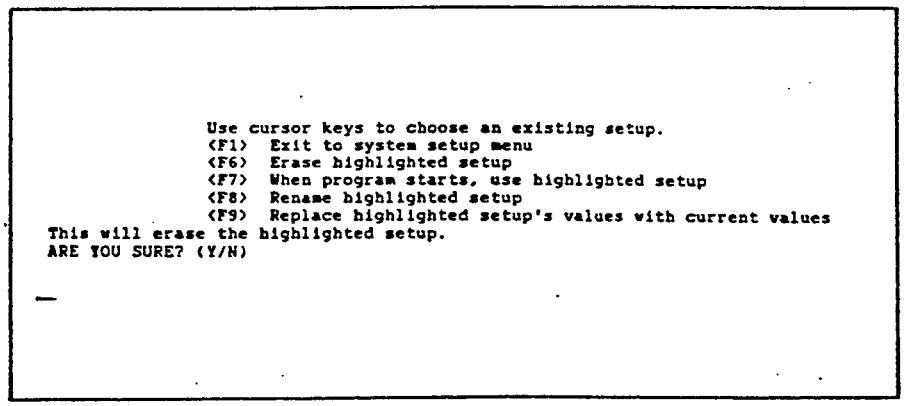

As soon as you have saved the setup, you can press the F1 key to exit to the System Communications & Terminal Setup menu.

On the main menu (shown in the following screen), the setup name will be displayed. You can alternate with other setup names by pressing F9 on the main menu. The system setup name on the main menu will be the one used with all its characteristics whenever you select F10 to connect to the host computer from the main menu.

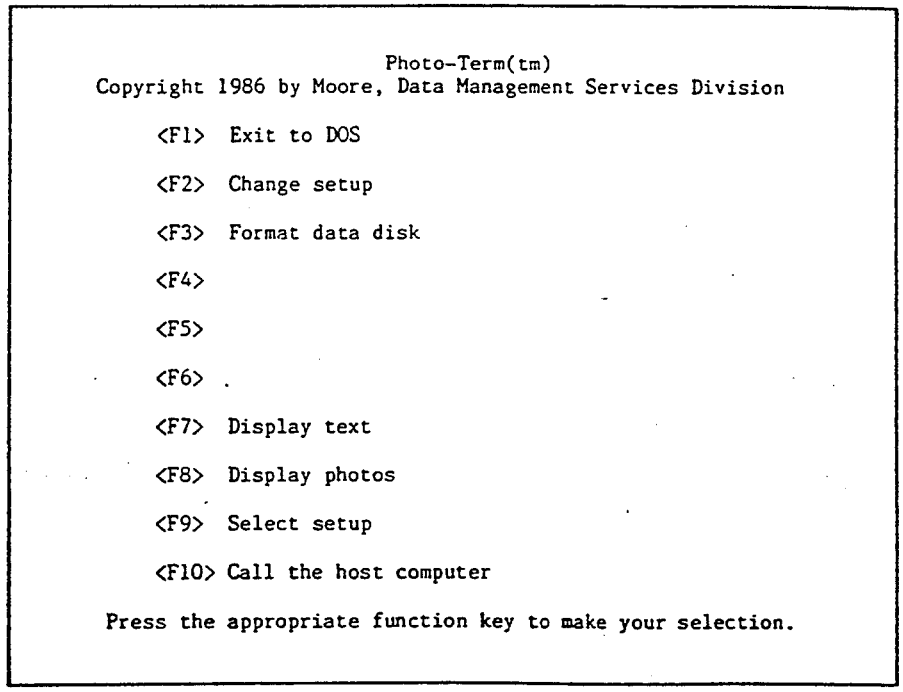

Test Your Hardware

It is generally a good idea to test your hardware and your setup immediately.

What is claimed is:

1. An automatic multi-user rapid response real estate property information exchange system for interactively acquiring, retrieving and displaying both graphical and textural information corresponding to real estate properties by a plurality of user simultaneously from separate remote locations, said system permitting images of real estate properties to be provided by plural remote data terminals to a multi-user host computer system over telephone lines for storage into a database for subsequent automatic retrieval from said database for subsequent automatic retrieval from said database by said plural remote data terminals on a real time interactive basis, said system comprising:

a multi-user host computer system for storing a data base including data representing text corresponding to real estate properties and data representing images corresponding to said properties and for permitting automatic retrieval of stored data substantially simultaneously on a real time interactive basis by plural remote data terminals; and said plural remote data terminals connectable to said host computer system via telephone lines, said plural remote data terminals accessing and retrieving said text and image data stored by said host computer system, each said remote data terminal including:

means for receiving video signals representing an image of a said property;

means coupled to said receiving means for converting said video signals to digital video signals representing said image, means for compressing said digital video signal to form compressed digital video signals, means for providing digital textural information signals corresponding to said property, means for transmitting said compressed digital video signals, said digital textural information signals, and an associated multiple-listing service number, to said host computer system over said telephone lines, means for receiving compressed digital video signals and digital textual information signals over said telephone lines from said host computer system, and means for displaying images and text in response to received digital video signals and digital textural information signals received over said telephone lines, wherein said host computer system includes:

communications means for substantially simultaneously connecting with said plural remote data terminals via said telephone lines, including database means for receiving and storing, in said database, said compressed digital video and textural information signals transmitted by said plural remote data terminals over said telephone lines, and providing means for automatically retrieving from said database, based on multiple listing service number, on a real time interactive basis, said received compressed digital video signals representing an image of said property and for efficiently providing said retrieved compressed digital video signals and said textural information signals over said telephone lines on a real time interactive basis, to said remote data terminals.

2. A multi-user system as in claim 1 wherein said database means stores said compressed digital video signals in a file indexed by a key field consisting of said real estate multiple listing service number, a photo number, and a segment number.

3. A multi-user system as in claim 1 wherein said database means stores image data in segments, each segment including up to 2048 bytes of compressed image data.

4. A multi-user system as in claim 1 wherein:

said host computer system providing means includes transmitting means connected to said telephone line for permitting later retrieval of said received image signals by said remote data terminal, said host computer system transmitting means including:

(a) means for transmitting a first predetermined escape sequence from said host computer system to one of said plural remote data terminals directing the remote data terminal to enter a blocked data transmission protocol, and (b) means for transmitting, subsequent to said first predetermined escape sequence, data packets containing compressed digital video signals from the host system to the remote data terminal;

said one remote data terminal transmitting means includes means for transmitting an acknowledge message to said host computer system in response to receipt of each of said transmitted data packets; and said host computer system transmitting means further includes means for transmitting a further predetermined escape sequence from the host system to the remote data terminal after all said compressed digital video signals representing a real estate property image have been transmitted.

5. A multi-user system as in claim 4 wherein said first predetermined escape sequence is selected from a binary coded octal value representing "ESC_SPH", indicating that the display terminal is to become the master and the host computer is to become the slave in a subsequent transfer of blocked data information from the display terminal to the host, and a binary coded octal value representing "ESC_PHO", indicating that the host computer is to become the master and the display terminal is to become the slave in a subsequent transfer of blocked data information from the host computer to the display terminal.

6. A multi-user system as in claim 4 wherein said further predetermined escape sequence, having a binary coded octal value representing "ESC_ASY—, indicates the end of blocked data protocol and a return to an asynchronous protocol.

7. A multi-user system as in claim 1 wherein:

each of said plural remote data terminals further includes a volatile image data buffer memory;

said converting means includes means for storing said digital signals representing said image in said volatile data buffer memory; and said compressing means includes means for reading said digital signals from said volatile data buffer memory.

8. A system as in claim 1 wherein said multi-user host computer system is capable of storing multiple images of each of said properties.

9. A method of interactively exchanging real estate property image data between a multi-user host computer system and a remote display terminal to permit images of real estate properties to be provided by plural remote data terminals to a multi-user host computer system over telephone lines for storage into a database and subsequent automatic retrieval on a real time interactive basis by said plural remote data terminals, said method comprising:
  (a) transmitting text from said remote display terminal to said host computer system;
  (b) interactively requesting, through a text data transmission from said remote display terminal, an image from said host computer system; and
  (c) automatically responding to said request by performing the following steps:
  (1) transmitting, in response to said request, a first predetermined escape sequence from the host system to the display terminal directing the display terminal to enter a blocked data transmission protocol;
    (2) transmitting a data packet stored in an image database maintained by the host system from the host system to the display terminal;
    (3) providing an acknowledge message from the display terminal to the host system in response to receipt of the data packet transmitted by step (2);
    (4) repeating (2) and (3) until all data representing said image has been transmitted;
    (5) transmitting a further predetermined escape sequence from the host system to the display terminal after all said data representing said image has been transmitted; and
    substantially concurrently performing said step (c) for plural said remote display terminals so as to permit said plural remote display terminals to substantially simultaneously access said host computer system.

10. The method of claim 9 wherein said first predetermined escape sequence is selected from a binary coded octal value representing "ESC_SPH", indicating that the display terminal is to become the master and the host computer is to become the slave in a subsequent transfer of blocked data information from the display terminal to the host, and a binary coded octal value representing "ESC_PHO", indicating that the host computer is to become the master and the display terminal is to become the slave in a subsequent transfer of blocked data information from the host computer to the display terminal.

11. The method of claim 9 wherein said further predetermined escape sequence, having a binary coded octal value representing "ESC_ASY", indicates the end of blocked data protocol and a return to an asynchronous protocol.

12. A method of claim 9 wherein said steps (c)(1), (c)(2), (c)(3), (c)(4) and (c)(5) are repeated for different images of corresponding multiple views of the same real estate property.

13. An automatic multi-user real estate listing information storage and retrieval system with digitized video image handling capabilities, said system capable of simultaneous access by a plurality of user from separate remote locations, so as to permit images of real estate properties to be provided by plural remote user stations to a multi-user host computer system over a telecommunications network for storage into a database and subsequent automatic retrieval in a real time interactive basis by said plural remote data terminals, said method comprising:
  a multi-user host processor for automatically responding to and interactively handling data inquiries from plural remote user substantially simultaneously over said telecommunications network, said host processor including:
    mass storage means for storing a digital information database containing plural textual real estate property listings and associated compressed digital signal images corresponding to said real estate properties, and
    host processor telecommunicating means for telecommunicating said stored digital information substantially simultaneously to said plural remote user stations over said telecommunications network;
  said plural user stations being remote from said host processor, each said remote plural user station including remote station telecommunicating means for exchanging digital signals with said host processor telecommunicating means on a real time interactive basis over said telecommunications network and display means for displaying real estate property listing information represented by said exchanged digital signals;
  at least one of said remote user stations further comprising:
    generating means, responsive to image signals provided to one said user station, said image signals representing an image of a real estate property, said generating means for generating at least one digital signal image message in a compressed form representing said image, and
    remote station telecommunicating means cooperating with said host processor telecommunicating means for transmitting said digital signal image message in a compressed form from said one remote user station to said host processor over said telecommunications network;
  said host processor further including file manager means connected to said host processor telecommunicating means for automatically receiving said transmitted compressed digital signal image message, for storing said received digital signal image message, for associating said stored compressed digital signal image message with one of said textual listings, and for permitting efficient later automatic repetitive retrieval of said compressed digital signal image message along with said associated textual listing substantially simultaneously on an interactive basis by said plural user terminals over said telecommunications network while preventing conflicting image operations on the same stored image messages.

14. A multi-user system as in claim 13 wherein said file management means included:
  means for indexing said stored listing information based on real estate multiple listing number, and
  means for retrieving stored digital signal messages based on said real estate multiple listing number and for providing said retrieved messages to said host processor telecommunicating means for communication to remote user stations over said telecommunication network.

15. A multi-user system as in claim 13 wherein said file manager means includes means for storing plural received digital signal messages corresponding to plural images of the same real estate property on said mass storage means in discrete files separate from and associated with said stored information representing said associated listing.

16. A multi-user system as in claim 13 wherein:
  said at least one remote station further includes video source means for providing video signals representing said image; and
  said generating means includes graphics means connected to receive said video signals for converting said video signals to said digital signal message.

17. A multi-user system as in claim 13 wherein said remote station telecommunicating means includes:
   control means for alternately operating in:
   (a) a master mode for sending a digital signal image message to said host processor upon receipt of a first control signal sequence from said host processor telecommunicating means, and
   (b) a slave mode for receiving a digital signal image message from said host processor upon receipt of a second control signal sequence different from said first sequence from said host processor telecommunicating means; and
   means connected to said control means for transmitting digital signal messages to said host processor telecommunicating means in said master mode and for receiving digital signal messages from said host processor telecommunicating means in said slave mode.

18. A multi-user system as in claim 13 wherein said remote station telecommunicating means telecommunicates said digital signal message substantially immediately upon generation of said digital signal message from said image signals.

19. A system as in claim 13 wherein said mass storage means is capable of storing multiple compressed digital signal images corresponding to each of said real estate properties, said multiple stored images showing different multiple views of each of said properties.

20. An interactive method of accessing and displaying both text and images corresponding to real estate property at a remote user station connected by a telecommunications network to a host processor so as to permit images of real estate properties to be provided by plural remote user stations to a multi-user host computer system over a telecommunications network for incorporation into a database and subsequent automatic retrieval from said database on a real time interactive basis by said plural remote data terminals, said method comprising the steps of:
   (a) transmitting a request for an optional image function from said remote user station to said host processor;
   (b) in response to receipt of said request by said host processor, automatically prompting a user of the remote user station for a real estate multiple listing number;
   (c) transmitting a multiple listing number from said remote user station to said host processor in response to said prompt;
   (d) providing a predefined abbreviated text in mini listing format describing a real estate property that corresponds to said transmitted multiple listing number and transmitting said abbreviated text from said host processor to said remote user station;
   (e) displaying said abbreviated mini listing text format on a display of said remote user station;
   (f) operating both said remote user station and said host processor in blocked file transfer mode while performing said displaying step (e) in response to signals generated at said host processor and transmitted to said remote user station;
   (g) is said blocked file transfer mode, transmitting data representing said real estate property image corresponding to said transmitted multiple listing number from said host processor to said remote user station and receiving said image data with said remote user station;
   (h) substantially concurrent with the reception of said image data at said remote user station displaying said real estate property image on said remote user display station in response to said received image data such that said mini listing text format and said real estate property image become simultaneously viewable on said display;
   (i) transmitting a further text listing format describing said real estate property corresponding to said multiple listing number from said host processor to said remote user station;
   (j) receiving said further text listing format with said remote user station; and
   (k) allowing said user to alternately view, on said remote user station display,:
      (1) said mini listing text format and said real estate property image; and
      (2) said further text listing format, without repeating said transmitting step (g).

21. The method of claim 20 wherein said step (g) includes successively transmitting at least first and second blocks of said image data, and said step (h) includes displaying a portion of said image represented by said first block while said step (g) transmits said second block to said remote user station.

22. A multi-user system as in claim 20 wherein said method further includes programming said remote data terminal to define a user actuated hot key means allowing a user to alternately view on a common display, via single keystroke operation:
   (a) a composite image comprising mini-listing text format and real estate property image, and
   (b) said further text listing format.

23. A method as in claim 20 further including the step of repeating said steps (c) through (g) to provides a display of multiple views of the same real estate property.

24. A multi-user system for interactively communicating image and text data representing real estate properties between a host computer and a plurality of simultaneously functioning remote user workstations over a telecommunications network including in-line components producing responses to certain data signals, so as to permit images of real estate properties to be provided by plural remote user workstations to a multi-user host computer over a telecommunications network for incorporation into a database and subsequent retrieval from said database on a real time interactive basis by said plural remote user workstation, said system including:
   data providing means at at least one remote user workstation for providing digital data signals representing an image of a real estate property;
   data transmitting means at said remote user workstation for transmitting said digital image data signals over said telecommunications network;
   data receiving means at said host for automatically receiving and storing said transmitted digital image data signals in a database for later automatic retrieval by said remote user workstation over said transmission network on an interactive basis;
   first translating means connected between said providing means and said data transmitting means for translating only certain image digital data signals from initial digital data values to other digital data values prior to transmission, said other values inhibiting said response to said in-line components; and
   second translating means connected to said data receiving means for translating received digital data image signals having said other digital data values back to said initial digital data values.

25. A multi-user system as in claim 24 wherein:
said first translating means comprises means for ORing any initial value within the range of $00_{hex}$ to $1F_{hex}$ with octal value 100.

26. A multi-user system as in claim 24 wherein said first translating means includes means for restricting the appearance of octal values within the set of 23, 21 and 05.

27. A multi-user system as in claim 24 wherein:
said data providing means comprises means responsive to inputted video signals representing said image for digitizing said video signals and providing resulting digital data signals in a volatile buffer memory for transmission by said data transmitting means; and
said data transmitting means transmits said digital data signals from said buffer memory substantially immediately after said signals have been digitized without storing said digitized data signals on a mass storage device.

28. A multi-user system for interactively communicating image and text data associated with real estate properties between a multi-user host computer and a plurality of simultaneously functioning remote user workstations over a telecommunications network to permit images of real estate properties to be provided by plural remote user workstations to a multi-user host computer over a telecommunications network for incorporation into a database and subsequent retrieval from said database on a real time interactive basis by said plural remote user workstation, said system including:
data providing means at said remote user workstation for providing data signals representing an image of a real estate property and for compressing said data signals for later decompression and display by the same or different remote workstation;
data transmitting means connected to said providing means and to said telecommunications network for transmitting said image data signals over said telecommunications network in a compressed form to said host;
data received means at said host connected to said telecommunications network for automatically receiving said compressed transmitted image data signals;
data means connected to said data receiving means for automatically storing in association with a multiple listing service number, said compressed transmitted image data signals in an image signal database substantially in the compressed form in which they are received by said data receiving means;
data access means connected to said data storing means for automatically retrieving compressed image data signals of real estate property in automatic unattended response to requests initiated by said remote user workstation, said requests including specifying a real estate multiple listing service number, said data access means capable of serving multiple remote user workstations substantially simultaneously; and
data transmitting means connected to said data access means and to said telecommunications network for automatically transmitting over said telecommunications network said retrieved data signals to said remote user workstation substantially in the compressed form in which they were previously received by said data receiving means.

29. A multi-user system as in claim 28 wherein:
said data providing means comprises means responsive to inputted video signals representing said image for digitizing said video signals and providing resulting digital data signals in a volatile buffer memory for transmission by said data transmitting means; and
said data transmitting means transmits said digital data signals from said buffer memory substantially immediately upon digitizing of said data signals without storing said digitized data signals on a mass storage device.

30. A system as in claim 28 wherein said data storing means is capable of storing multiple compressed images corresponding to a particular real estate property, each of said stored images being stored in association with a multiple listing service number and an image sequence number corresponding to said property.

* * * * *

REEXAMINATION CERTIFICATE (3789th)

United States Patent [19]
Bijnagte

[11] B1 5,235,680
[45] Certificate Issued Jun. 22, 1999

[54] APPARATUS AND METHOD FOR COMMUNICATING TEXTUAL AND IMAGE INFORMATION BETWEEN A HOST COMPUTER AND A REMOTE DISPLAY TERMINAL

[75] Inventor: Leendert M. Bijnagte, Minneapolis, Minn.

[73] Assignee: Moore Business Forms, Inc., Grand Island, N.Y.

Reexamination Request:
No. 90/004,148, Feb. 16, 1996

Reexamination Certificate for:
Patent No.: 5,235,680
Issued: Aug. 10, 1993
Appl. No.: 07/759,959
Filed: Sep. 17, 1991

Related U.S. Application Data

[63] Continuation of application No. 07/080,275, Jul. 31, 1987, abandoned.

[51] Int. Cl.$^6$ .................................................. G06F 7/00
[52] U.S. Cl. .................. 707/10; 345/302; 345/331; 348/13; 379/93.25; 395/200.49; 395/200.77
[58] Field of Search .................................. 395/147, 161, 395/201, 227, 200.01, 329, 335, 200.05, 200.49, 200.77; 364/514 A, 514 C; 382/232; 707/10, 1; 345/302, 331, 329, 335; 348/13; 379/93.25

[56] References Cited

U.S. PATENT DOCUMENTS

| | | | |
|---|---|---|---|
| 4,587,633 | 5/1986 | Wang et al. | 364/514 C |
| 4,734,769 | 3/1988 | Davis | 348/564 |
| 4,805,134 | 2/1989 | Calo et al. | 707/10 |

OTHER PUBLICATIONS

Management Information Systems Week, Jan. 2, 1985 (unadulterated).
"Boris is a hit with Realtors", Joplin Globe, Sep. 15, 1985.
Computerized Multiple Listing Service, Boris, 1986 Ed., Nov. 1985 NAR Convention.
Photo–List/Laser–List Brochure—1984 Honolulu NAR Convention.
I/Net Brochure.
"Nothing is Certain But Change", SundayHome, Honolulu, Nov. 16, 1984.
Boris—Capabilities of the System (Sched. one), Jul. 31, 1985.
Excerpts/Admissions from Inventor's deposition of Nov. 27, 1995.
Invention Development Summary by Bijnagte (Inventor).
Design Specification (PhotoTrieve Enhancement) Nov. 26, 1985.

(List continued on next page.)

*Primary Examiner*—Kee M. Tung

[57] ABSTRACT

A system and method for storing, retrieving displaying, printing and otherwise manipulating color images stored in a central "host" computer from a realtor's remote data terminal includes a host computer which stores and maintains a database containing listings of real estate properties on the market. The host computer also optionally can store image information relating to specific properties. Images can be loaded from remote terminals over telephone lines to the host system on an interactive basis. Images can then be retrieved from the host system, also on an interactive basis, for display, printing, or storage on a storage medium associated with the remote display terminals. Images may also be deleted on an interactive basis from a remote terminal. A specific communications protocol conveys image data between the host computer and remote data terminals. This protocol includes specific "time-out" limitations, CRC error checking schemes, and a specific "handshaking" signaling sequence that must be observed before the host system will permit manipulation of images files.

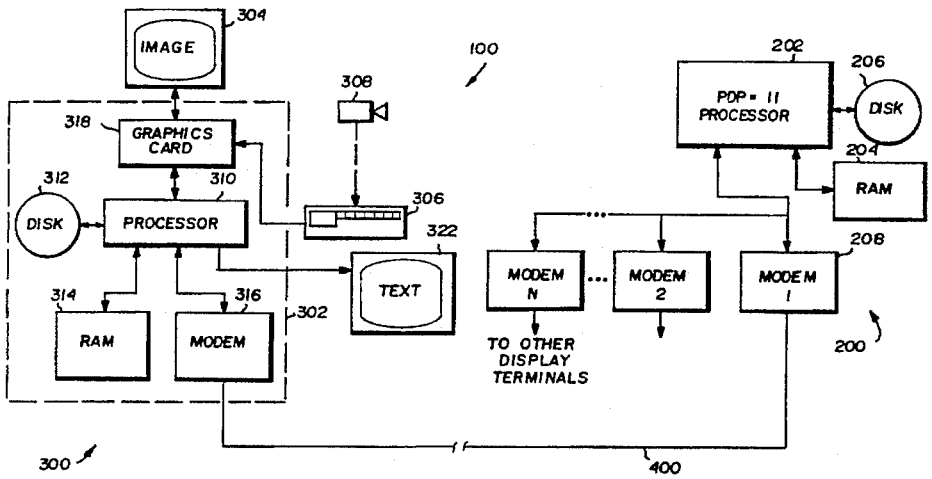

OTHER PUBLICATIONS

Affidavit of Todd A. Colthorp dating references 'AAR' and 'ZAR' cited herein.

"Getting A Colorful Look At Homes for Sale", USA Today, Jul. 19, 1984.

"Computer System for Brokers . . . ", Wall Street Journal, Jul. 18, 1984.

"House–Hunting Goint Hi–Tech", Oshkosh Daily, Jul. 23, 1984.

"Home Shopping Made Easy", Venture, Aug. 1984.

"House–Hunting Goes Hi–Tech", NJ Record, Hackensack, Jul. 27, 1984.

"Computers Impacting Homes Sales", Detroit News, Aug. 26, 1984.

"Data Communications, Networks, and distributed processing" by Uyless Black, pp. 178–183, 248–251, Reston Publishing Co. 1983.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–19 and 24–30 is confirmed.

Claim 20 is determined to be patentable as amended.

Claims 21–23, dependent on an amended claim, are determined to be patentable.

20. An interactive method of accessing and displaying both text and images corresponding to real estate property at a remote user station connected by a telecommunications network to a host processor so as to permit images of real estate properties to be provided by plural remote user stations to a multi-user host computer system over a telecommunications network for incorporation into a database and subsequent automatic retrieval from said database on a real time interactive basis by said plural remote data terminals, said method comprising the steps of:

(a) transmitting a request for an optional image function from said remote user station to said host processor;

(b) in response to receipt of said request by said host processor, automatically prompting a user of the remote user station for a real estate multiple listing number;

(c) transmitting a multiple listing number from said remote user station to said host processor in response to said prompt;

(d) providing a predefined abbreviated text in mini listing format, *comprising selected, abbreviated text from a full text listing, having a maximum of nine lines,* describing a real estate property that corresponds to said transmitted multiple listing number and transmitting said abbreviated text from said host processor to said remote user station;

(e) displaying said abbreviated mini listing text format on a display of said remote user station;

(f) operating both said remote user station and said host processor in blocked file transfer mode while performing said displaying step (c) in response to signals generated at said host processor and transmitted to said remote user station;

(g) [is] *in* said blocked file transfer mode, transmitting data representing said real estate property image corresponding to said transmitted multiple listing number from said host processor to said remote user stations and receiving said image data with said remote user station;

(h) substantially concurrent with the reception of said image data at said remote user station displaying said real estate property image on said remote user display station in response to said received image data such that said mini listing text format and said real estate property image become simultaneously viewable on said display;

(i) transmitting a further test listing format describing said real estate property corresponding to said multiple listing number from said host processor to said remote user station; and (j) receiving said further text listing format with said remote user station; and (k) allowing said user to alternately view, on said remote user station display;
  (1) said mini listing test format and said real estate property image; and
  (2) said further testing listing format, without repeating said transmitting step (g).

* * * * *